(12) United States Patent
Churilla et al.

(10) Patent No.: US 12,128,796 B2
(45) Date of Patent: Oct. 29, 2024

(54) CAR SEAT CARRIER

(71) Applicants: Nicole Lorraine Churilla, Austin, TX (US); John Eric Churilla, Austin, TX (US)

(72) Inventors: Nicole Lorraine Churilla, Austin, TX (US); John Eric Churilla, Austin, TX (US)

( * ) Notice: Subject to any disclaimer, the term of this patent is extended or adjusted under 35 U.S.C. 154(b) by 257 days.

(21) Appl. No.: 17/688,453

(22) Filed: Mar. 7, 2022

(65) Prior Publication Data
US 2022/0185154 A1 Jun. 16, 2022

Related U.S. Application Data

(63) Continuation of application No. 15/981,547, filed on May 16, 2018, now Pat. No. 11,267,376.

(51) Int. Cl.
| | |
|---|---|
| *B60N 2/00* | (2006.01) |
| *B60N 2/28* | (2006.01) |
| *B62B 7/14* | (2006.01) |
| *B62B 9/20* | (2006.01) |

(52) U.S. Cl.
CPC ......... *B60N 2/2848* (2013.01); *B60N 2/2845* (2013.01); *B62B 7/145* (2013.01); *B62B 9/20* (2013.01)

(58) Field of Classification Search
CPC .... B60N 2/2848; B60N 2/2845; B60B 7/145; B60B 9/20
USPC ................................................. 280/47.371
See application file for complete search history.

(56) References Cited

U.S. PATENT DOCUMENTS

| | | | | |
|---|---|---|---|---|
| 5,230,523 A | * | 7/1993 | Wilhelm | B62B 7/12 280/87.051 |
| 5,538,567 A | * | 7/1996 | Henry, III | C06D 5/06 149/92 |
| 6,536,796 B1 | * | 3/2003 | Solomon | B62B 3/02 280/655 |
| 7,017,937 B2 | * | 3/2006 | Williams | B62B 9/28 280/642 |
| 8,695,992 B2 | * | 4/2014 | Piaget | B62K 27/003 280/204 |
| 9,327,749 B2 | * | 5/2016 | Young | B62B 5/08 |
| 9,397,719 B1 | * | 7/2016 | Schmidt | H04B 1/3888 |
| 11,267,376 B2 | * | 3/2022 | Churilla | B60N 2/2848 |
| 2012/0235372 A1 | * | 9/2012 | Herlitz | B62B 9/20 280/47.38 |
| 2015/0084298 A1 | * | 3/2015 | Herlitz | B62B 3/007 280/87.01 |

* cited by examiner

*Primary Examiner* — Hau V Phan
(74) *Attorney, Agent, or Firm* — J. Eric Churilla

(57) ABSTRACT

A car seat carrier includes a carrier body sized and shaped to receive a complementary sized and shaped car seat. The carrier body is a car seat base for a rear facing infant car seat. The car seat carrier further includes at least one rear wheel assembly attached to the carrier body and at least one front wheel assembly attached to the carrier body. Further, the car seat carrier includes at least one handle affixed to the carrier body.

20 Claims, 23 Drawing Sheets

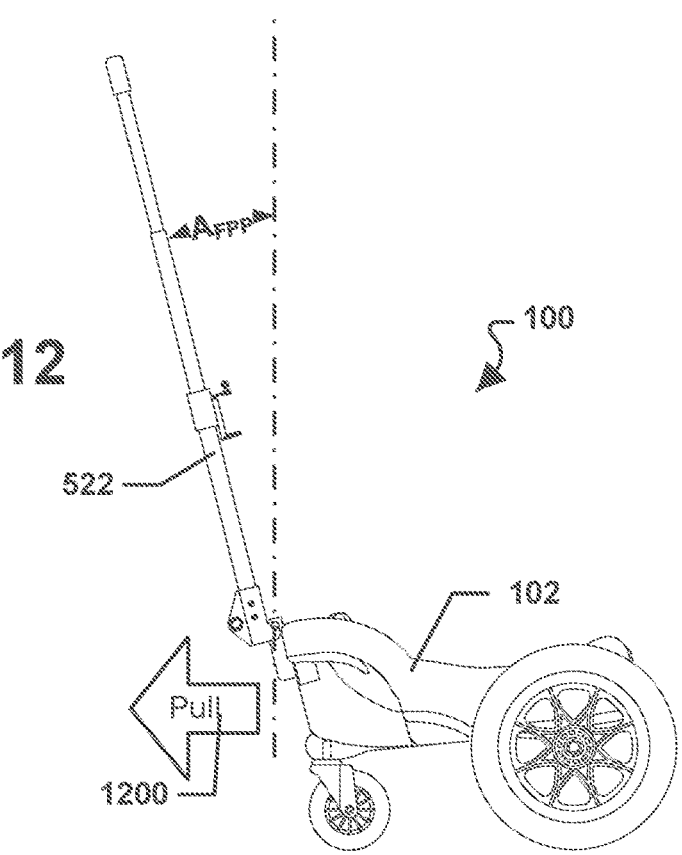
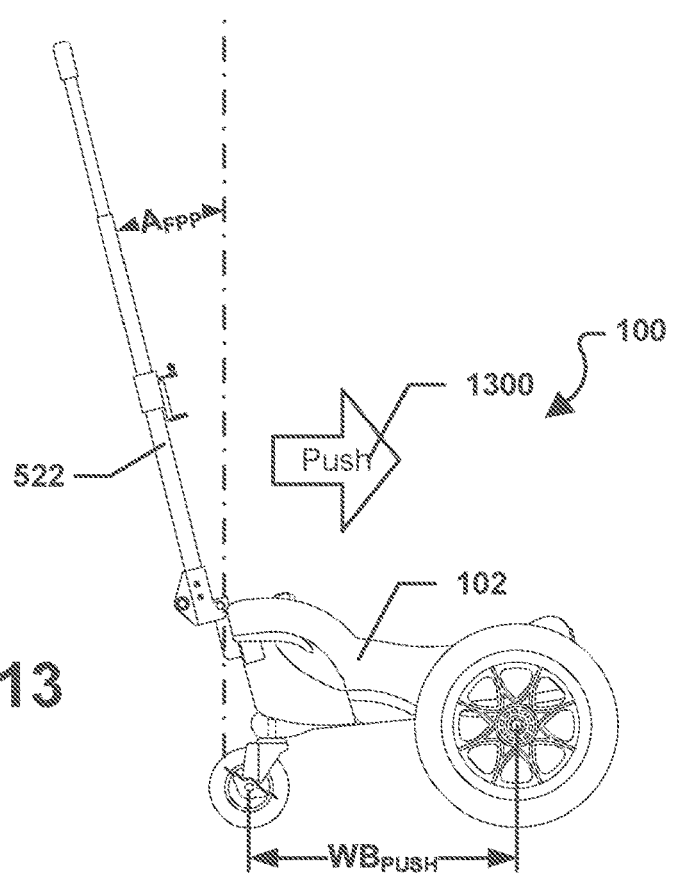

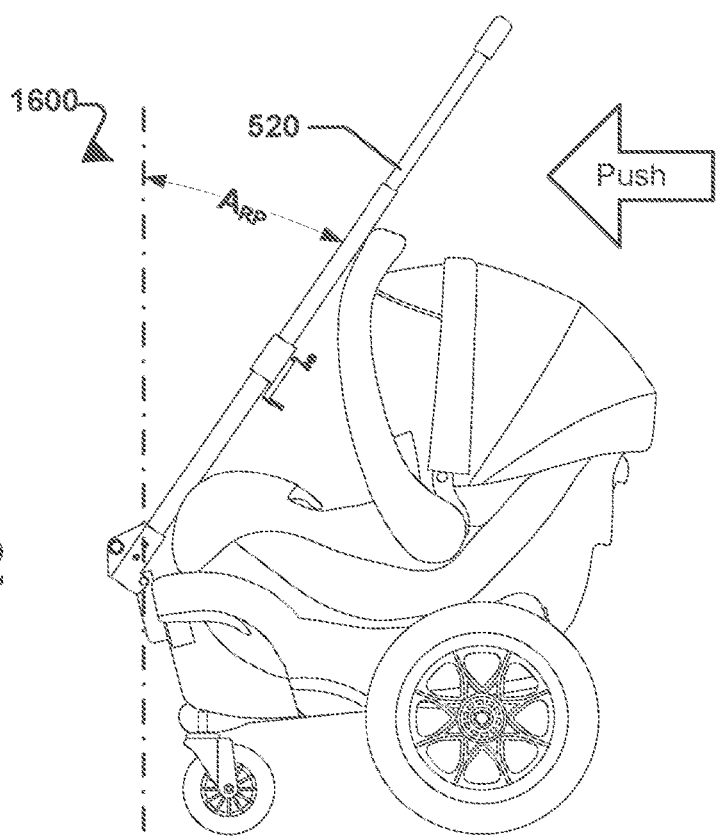
FIG. 22
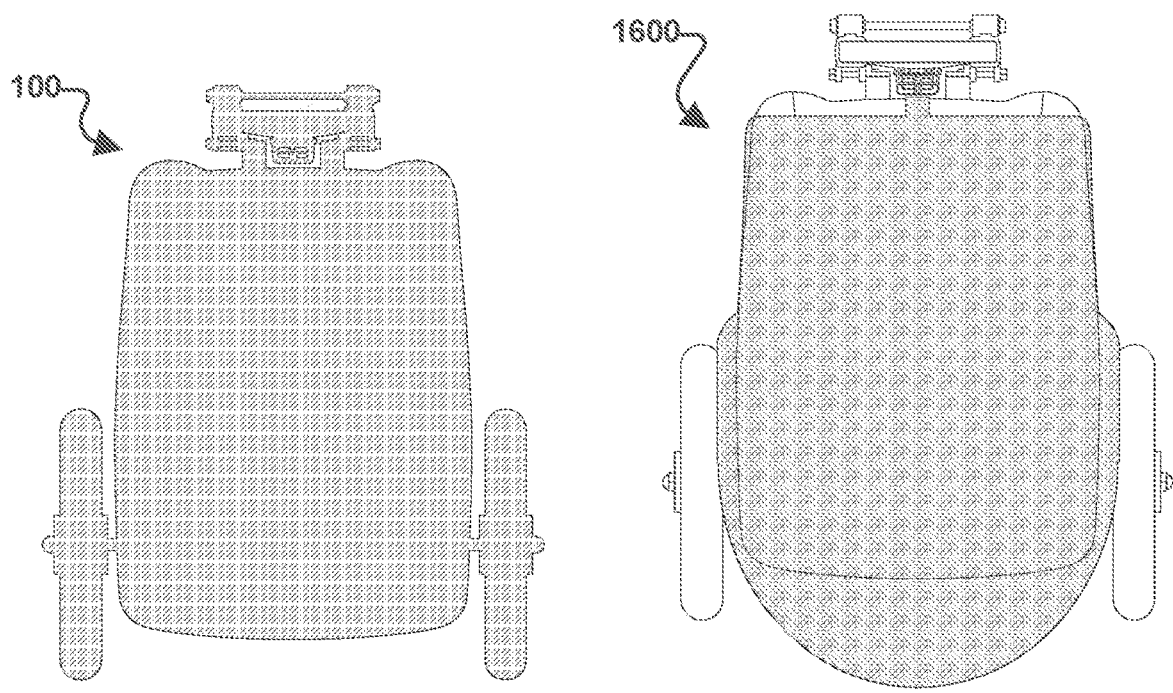
FIG. 23
FIG. 24

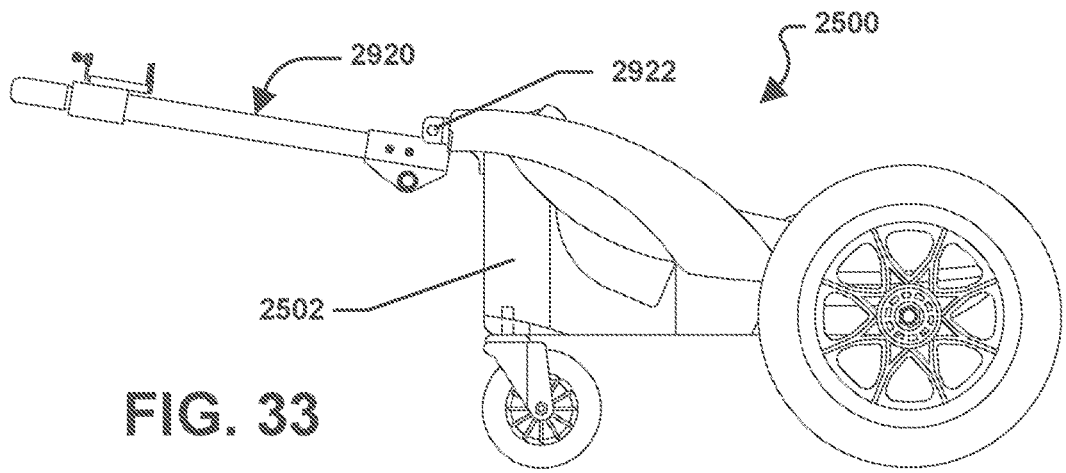
FIG. 33
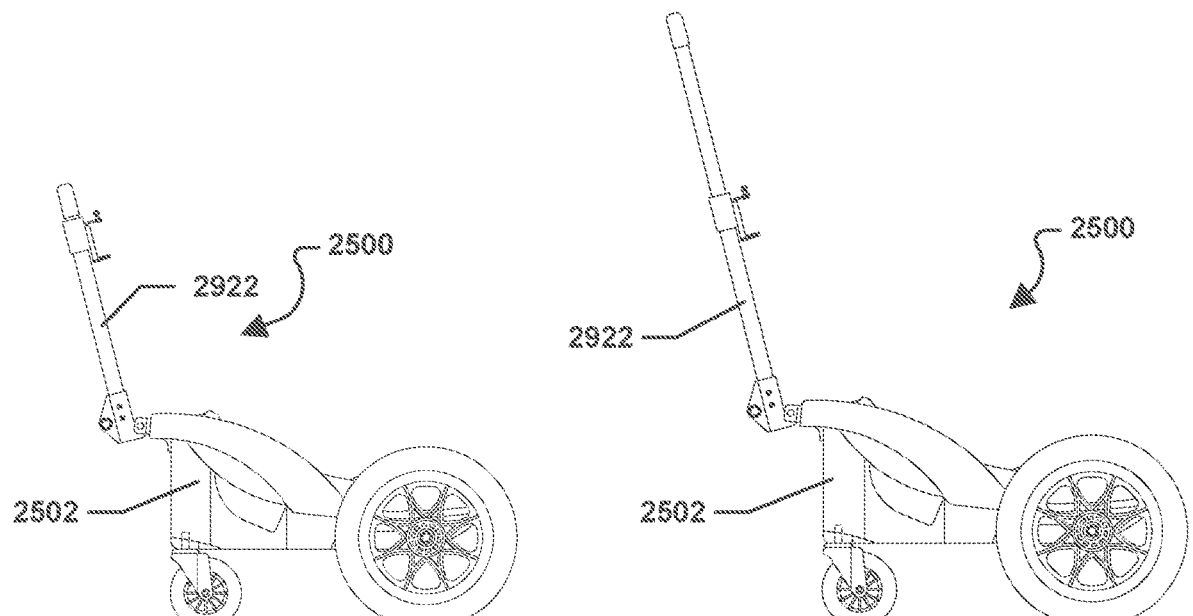
FIG. 34
FIG. 35

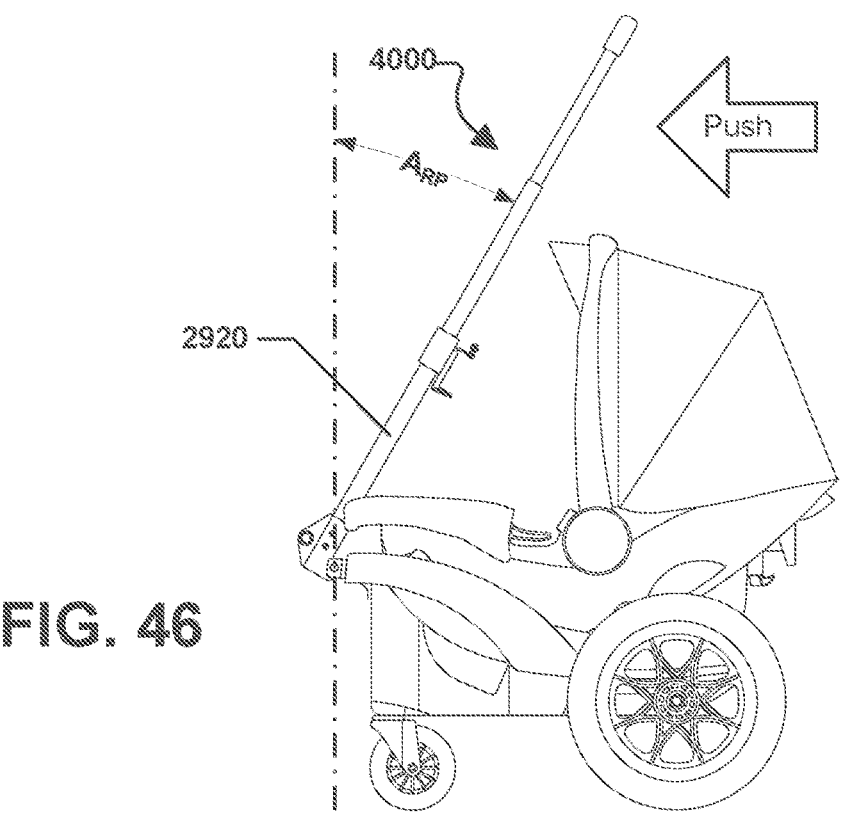
FIG. 46
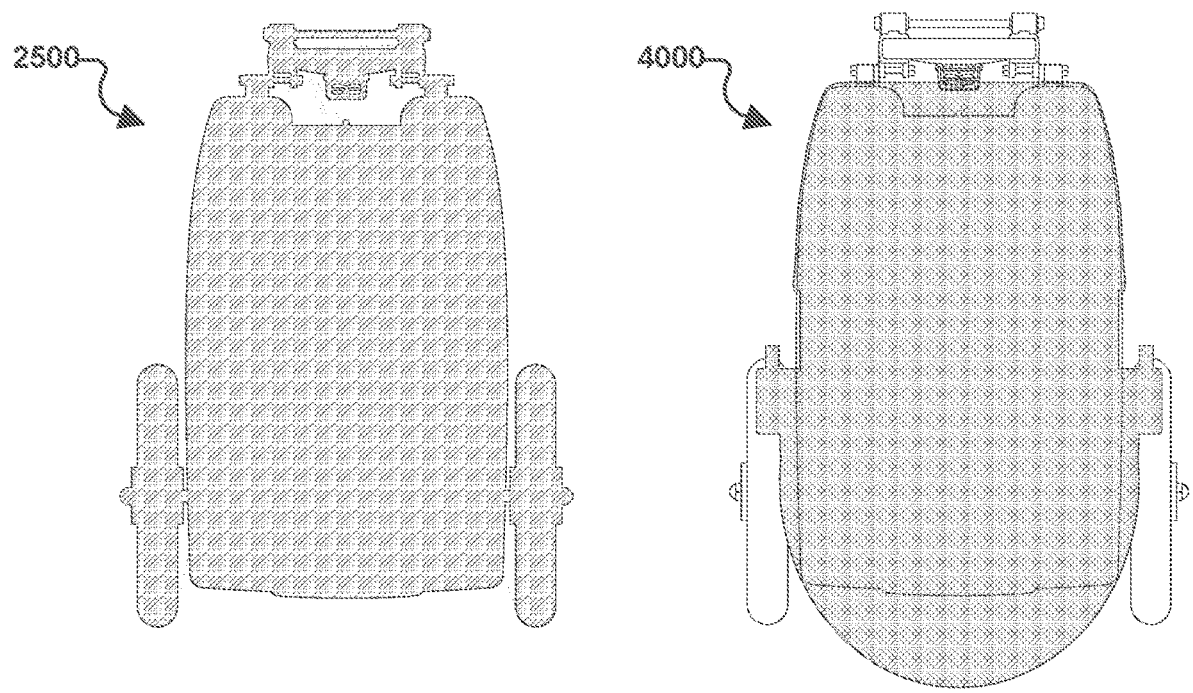
FIG. 47
FIG. 48

CAR SEAT CARRIER

RELATED APPLICATIONS

The present application is a continuation of U.S. patent application Ser. No. 15/981,547 filed May 16, 2018 and entitled "CAR SEAT CARRIER," which issued as U.S. Pat. No. 11,267,376 and claims priority to U.S. Provisional Patent Application No. 62/507,402, filed on May 17, 2017.

BACKGROUND OF THE INVENTION

Field of the Disclosure

The present invention relates in general, to wheeled devices for carrying car seats.

Description of the Related Art

In the United States, the National Highway Traffic Safety Administration sets guidelines for the use of car seats and all states have their own laws governing the use of car seats. For example. Texas requires that children under 8 years old and less than 4 feet 9 inches tall be in a car seat or a booster seat. Children under 1 year old and/or less than 35 lbs should be placed in a rear facing car seat when riding in an automobile. California law also requires that children under 8 years old and less than 4 feet 9 inches tall be in a car seat or a booster seat. Children under 2 years old that are less than 40 pounds or 40 inches tall must be restrained in a rear facing car seat.

Rear facing car seats typically can be used to carry an infant and the rear facing car seat can be engaged with a detachable car seat base that is properly tethered in a vehicle. Using such a system allows the parent to strap their small child in the rear facing car seat, carry the rear facing car seat to the car and engage the rear facing car seat with the detachable car seat base. Once the rear facing car seat is engaged with the detachable car seat base the rear facing car seat may not be disengaged without toggling, a release mechanism.

The car seat industry is always seeking improvements to car seats and the different ways in which car seats are transported when not in a motor vehicle.

BRIEF DESCRIPTION OF THE DRAWINGS

The present disclosure may be better understood, and its numerous features and advantages made apparent to those skilled in the art by referencing the accompanying drawings.

FIG. 8 through FIG. 13 include left side plan views of a car seat carrier in accordance with an embodiment.

FIG. 22 includes a side plan view of a car seat carrier and a car seat in accordance with an embodiment.

FIG. 23 includes a top plan view of a car seat carrier in accordance with an embodiment.

FIG. 24 includes a top plan view of a car seat career and a car seat in accordance with an embodiment.

FIG. 32 through FIG. 37 include left side plan views of a car seat carrier in accordance with an embodiment.

FIG. 46 includes a side plan view of a car seat carrier and a car seat in accordance with an embodiment.

FIG. 47 includes a top plan view of a car seat carrier in accordance with an embodiment.

FIG. 48 includes a top plan view of a car seat carrier and a car seat in accordance with an embodiment.

DETAILED DESCRIPTION

Figure 1:
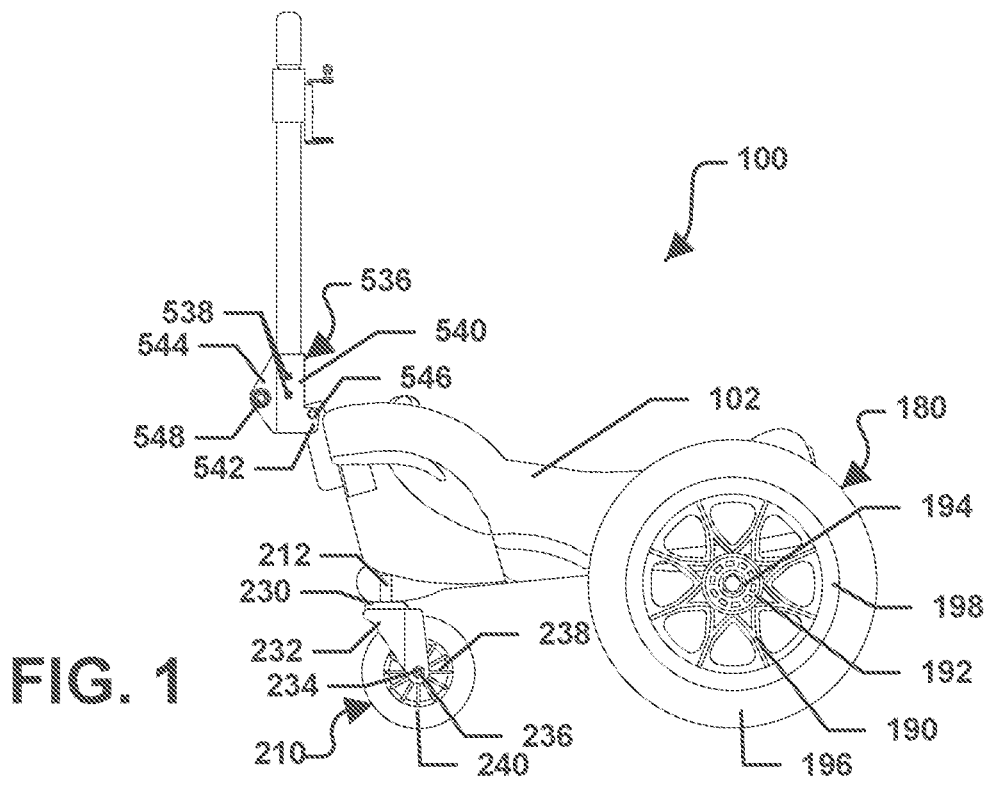
FIG. 1 and FIG. 2 include left and right side plan views of a car seat carrier in accordance with an embodiment.

The following is generally directed to a rolling car seat carrier that is suited to receive and engage a child car seat, e.g., a rear-facing infant car seat. Embodiments are directed to a car seat carrier having a carrier body that is configured to receive and lockably engage an infant car seat therein. The carrier body is further configured to retain the infant car seat in engagement with the carrier body until a release handle on the infant car seal is toggle by a user. As such, the infant car seat is securely attached to the carrier body. The carrier body can include two front wheels directly attached to the carrier body. The two front wheels can rotate around a first axis and swivel around a second axis. The carrier body can also include two rear wheels directly attached to the carrier body. The two rear wheels can rotate around a first axis. A pivoting and telescoping handle can be attached to the front of the carrier body near the front wheels. A user can grasp a handgrip on the pivoting/telescoping handle with one hand and push the car seat carrier or pull the car seat carrier. Accordingly, the car seat carrier is human powered and not powered by a motor, an engine, or other non-human power source.

The pivoting/telescoping handle is configured to be move between various positions. For example, the pivoting/telescoping handle can be moved to a first stowage position in which the pivoting/telescoping handle is in a collapsed configuration and folded back across the carrier body of the car seat carrier. Further, the pivoting/telescoping handle can be moved to a second stowage position in which the pivoting/telescoping handle is in the collapsed configuration and rotated away from the carrier body so that the hand grip on the pivoting/telescoping handle is in a position furthest from the carrier body. The pivoting/telescoping handle can also be moved to a from push/pull position in which the pivoting/telescoping handle is in an extended configuration and rotated so that the pivoting/telescoping handle, or the handgrip, is forward of the axis around which the pivoting/telescoping handle rotates, in this front push/pull position, a user can use the pivoting/telescoping handle to push the car seat carrier or pull the car seat carrier. In either case, an infant car seat, and an infant securely placed in the infant car seat, would be facing the user.

The pivoting/telescoping handle can be further moved to a rear push position in which the pivoting/telescoping handle is in the extended configuration and rotated so the pivoting/telescoping handle, or handgrip, is behind the axis about which the pivoting/telescoping handle rotates, in this position, a user can push the car seat carrier with the infant car seat engaged with the car seat carrier, and an infant therein, facing the direction in which the car seat carrier is pushed, i.e., away from the user. Finally, the pivoting/telescoping can be moved to a broadcast position in which the handle, in either the collapsed configuration or extended configuration, is rotated to a vertical position or slightly aft so that the handgrip is behind the axis of rotation. In the broadcast position, a portable electronic device, e.g., a smartphone, that is securely held within a bracket on the pivoting/telescoping handle can be located in a position to allow an infant within the infant car seat to listen to and watch content that is being broadcast by the portable electronic device.

The car seat carrier is configured to have a foot print that is nearly identical in area to the footprint of the infant car seat that can be installed therein. As such, the car seat carrier takes up relatively little floor space and is very easy to maneuver in crowded spaces, in narrow spaces, around closely placed objects, etc. Further, the car seat carrier supports the infant car seat in a manner that is relatively low to the surface on which the car seat carrier is used. This provides a relatively low center of gravity that makes is difficult to tip over the car seat carrier. Further, this allows a user to sit in a chair adjacent to the car seat carrier, e.g., at a doctor's office, and easily see and interact with the infant that is securely placed within the infant car seat attached to the car seat carrier.

FIG. 1 through FIG. 14 illustrate a car seat carrier that is generally designated 100. As shown, the car seat carrier 100 can include a carrier body 102. The carrier body 102 can be sized and shaped to receive and lockably engage a complementary shaped infant car seat, as described in detail below. In particular, the carrier body 102 can include a molded shell that can be substantially symmetrical about a central longitudinal axis 104. In one aspect, the carrier body 102 can be a one-piece molded shell. The carrier body 102 may be molded from a polymer material. In particular, the carrier body 102 may be made from a lightweight, durable plastic material. For example, the carrier body 102 may be made from polypropylene, such as impact grade polypropylene or impact copolymer polypropylene. In another aspect the carrier body 102 may be made from nylon, in still another aspect, the carrier body 102 may be made from a metal or a metal alloy. For example, the carrier body 102 may be stamped from sheet steel or aluminum. In one particular aspect, the carrier body 102 can be a detachable car seat base that is configured to receive and engage a car seat, described below.

In a particular aspect, the entire car seat carrier 100 can have a weight, $W_{CSC}$, and $W_{CSC}$ can be less than or equal to 20 pounds. Further, $W_{CSC}$ can be less than or equal to 19 pounds, such as less than or equal to 18 pounds, less than or equal to 17 pounds, less than or equal to 16 pounds less than or equal to 15 pounds, or less than or equal to 14 pounds. In another aspect, $W_{CSC}$ can be greater than or equal to 8 pounds. Moreover, $W_{CSC}$ can be greater than or equal to 9 pounds, such as greater than or equal to 10 pounds, greater than or equal to 11 pounds, greater than or equal to 12 pounds, or greater than or equal to 13 pounds. In yet another aspect, $W_{CSC}$ can be within a range between, and including, any of the maximum and minimum values of $W_{CSC}$ described herein. The relatively light weight of the car seat carrier 100 makes it easy to lift up the car seat carrier 100 and place the car seat carrier 100 in a vehicle.

Figure 3:
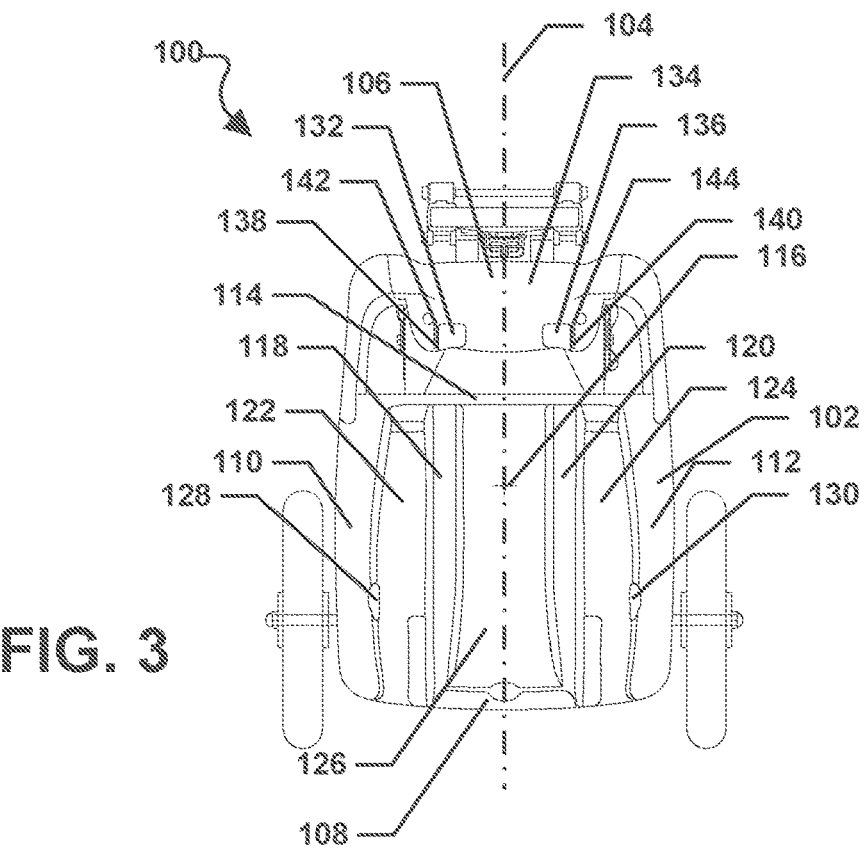
FIG. 3 and FIG. 4 include top and bottom plan views of a car seat carrier in accordance with an embodiment.

As illustrated, the carrier body 102 can include a float end 100 and a rear end 108. A first outer side wall 110 can extend between the front end 106 and the rear end 108 of the carrier body 102. Also, a second outer side wall 112 can extend between the front end 106 and the rear end 108 of the carrier body 102 opposite the first outer side wall 110 across the longitudinal axis 104. As shown in FIG. 3, the carrier body 102 can further include a transverse wall 114 that can extend between the first other side wall 110 and the second outer side wall 112 at a location between a midpoint 116 of the carrier body 102 and the front end 106 of the carrier body 102. The transverse wall 114 can be substantially perpendicular to the longitudinal axis 104 of the carrier body 102. The carrier body 102 can also include a first inner side wall 118 that can extend from the rear end 108 of the carrier body 102 to the transverse wall 114. Moreover, the carrier body 102 can include a second inner side wall 120 that can also extend from the rear end of the carrier body 102 to the transverse wall 114 opposite the first inner side wall 118 across the longitudinal axis 104.

FIG. 3 indicates that the carrier body 102 can include a first cavity 122 formed between the first inner side wall 118 and the first outer side wall 110 and a second cavity 124 formed between the second inner side wall 120 and the second outer side wall 112. The first cavity 122 and the second cavity 124 can extend from the rear end 108 of the carrier body 102 to the transverse wall 114 of the carrier body 102. Further, the cavities 122, 124 can be sized and shaped to receive a complementary shaped portion of a body of an infant car seat. A curved platform 126 can extend between the first inner side wall 118 and the second inner side wall 120 and between the rear end 108 of the carrier body 102 and the transverse wall 114. In a particular aspect, the first cavity 122, the second cavity 124, and the curved platform 126 are configured to receive and lockably engage a complementary shaped infant car seat, as shown in greater detail in FIG. 16.

Figure 15:
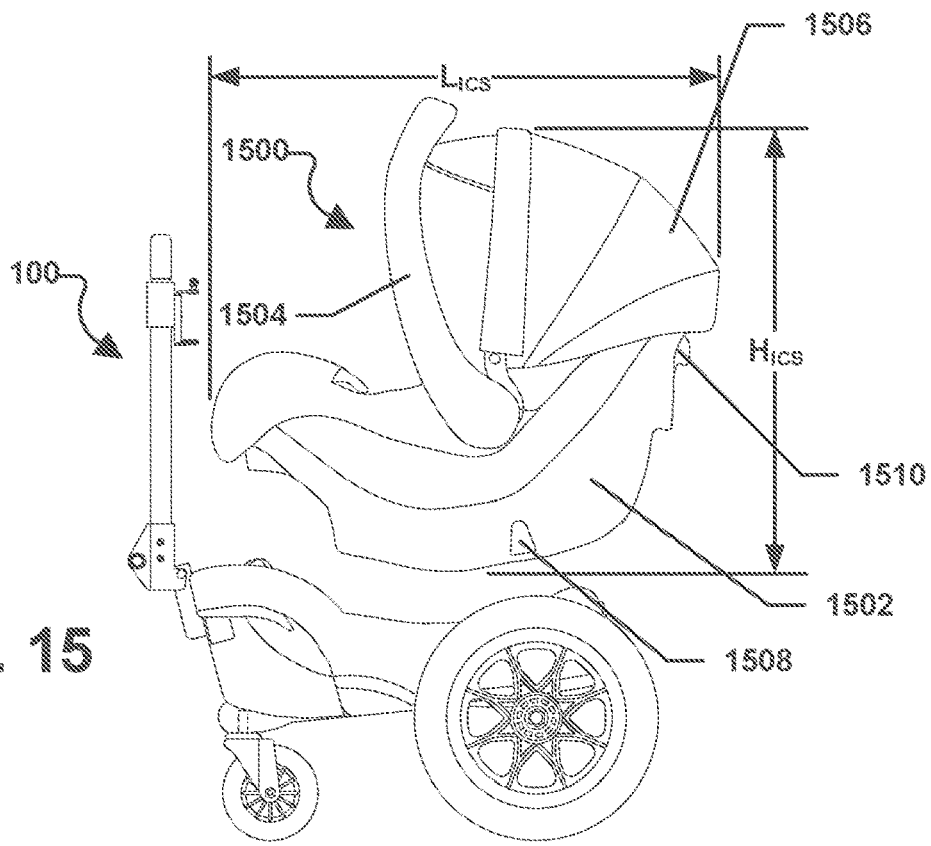
FIG. 15 through FIG. 20 include left side plan views of a car seat carrier and a car seat in accordance with an embodiment.

As illustrated in FIG. 3, the carrier body 102 can further include a first rear locking notch 128 formed in the first outer side wall 110 adjacent to the first cavity 122. Moreover, the carrier body 102 can include a second rear locking notch 130 formed in the second outer side wall 112 adjacent to the second cavity 124. The rear locking notches 128, 130 are configured to receive retractable securing projections on an infant car seat as illustrated in FIG. 15.

The carrier body 102 can further include a first front guide 132 that can extend in an upward direction from an upper surface 134 of the carrier body 102. The carrier body 102 can also include a second from guide 136 extending from the upper surface 134 of the carrier body 102 opposite from the first front guide 132 across the longitudinal axis 104. A first flout slot 138 may be formed in the upper surface 134 of the carrier body 102 adjacent to the first front guide 132. A second front slot 140 may be formed in the upper surface 134 of the carrier body 102 adjacent to the second front guide 136 and opposite the first front slot 138.

A first hook 142 may extend through the first front slot 138 so that the head of the first hook 142 faces the front end 106 of the carrier body 102. A second hook 144 may extend through the second front slot 140 so that the head of the second hook 144 faces the front end 106 of the carrier body 102. The first hook 142 and the second hock 144 on the carrier body 102 of the car seat carrier 100 are configured to engage attachment points on the underside of an infant car seat. Accordingly, the first hook 142, the second hook 144, the first rear locking notch 128, and the second rear locking notch 130 work in concert to engage and lock an infant car seat to the car seat carrier 100, as shown in FIG. 16 through FIG. 22.

Figure 4:
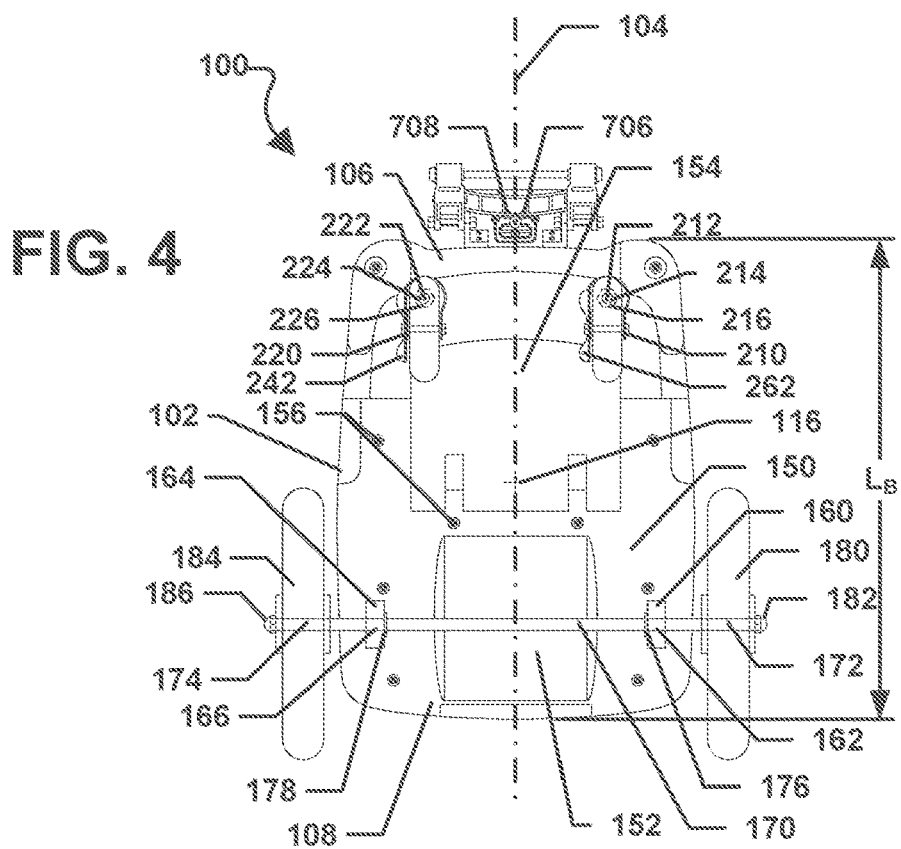

Referring now to FIG. 4, the canter body 102 of the car seat carrier 100 can further include a bottom plate 150 that can cover and enclose the underside of the carrier body of the car seat carrier 100. The bottom plate 150 can include a rear portion 152 that extends from the rear end 108 of the carrier body 102 to a point located between the midpoint 116 of the carrier body 102 and the front end 106 of the carrier body 102. The bottom plate 150 can also include a front portion 154 that can extend from the front end 106 of the carrier body 102 to a location between the midpoint 116 of the carrier body 102 and the rear end 108 of the carrier body 102. It can be appreciated that the bottom plate 150 may be a single continuous bottom plate in which the rear portion 152 and the front, portion 154 are integrally formed with each other. Further, the bottom plate 150 may be attached to the carrier body 102 via a plurality of threaded fasteners 156, e.g., screws.

FIG. 4 further indicates that the car seat carrier 100 can include a first rear axle support 160 that can extend in a generally downward direction from the bottom plate 150, e.g., the rear portion 152 of the bottom plate 150. The first rear axle support 160 can be formed with a transverse axle bore 162. A second rear axle support 164 can also extend in a generally downward direction from the bottom plate 150. e.g., the rear portion 152 of the bottom plate 150. The second rear axle support 164 can be opposite from the first rear axle support 160 across the longitudinal axis 104. The second rear axle support 164 can also be formed with a transverse axle bore 166. As shown, the real axle supports 160, 164 can be placed near the rear end 108 of the carrier body 102 between the midpoint 116 of the carrier body 102 and the rear end 108 of the carrier body 102.

A fixed i.e., non-rotating, non-steering, rear axle 170 can be installed within the rear axle supports 160, 164, e.g., through the transverse axle bores 162, 166 formed therein, so that a first end 172 of the rear axle 170 extends beyond the first rear axle support 160 and the outer periphery of the carrier body 102. Moreover, a second end 174 of the rear axle 170 extends beyond the second rear axle support 164 and the outer periphery of the carrier body 102. In a particular aspect, the rear axle 170 can be made from a metal or metal alloy. Further, the real axle 170 can be made from steel in another aspect, the rear axle 170 can be made from aluminum. Moreover, at least a portion of the ends 172, 174 of the axle 170 can be threaded.

In a particular aspect, the rear axle 170 may engage the first transverse axle bore 162 formed in the first rear axle support 160 and the second transverse axle bore 166 formed in the second rear axle support 164 in an interference fit. As such, the rear axle 170 may not rotate within the rear axle supports 160, 164. Further, the rear axle 170 may not translate linearly within the rear axle supports 160, 164. i.e., along a longitudinal axis of the rear axle 170.

FIG. 4 further indicates that the car seat carrier 100 can include a first retaining ring clip 176 fitted into a slot (not shown) machined in the rear axle 170 adjacent to the first rear axle support 160. Moreover, the car seat carrier 100 can include a second retaining ring clip 178 fined into a slot (not shown) machined in the rear axle 170 adjacent to the second rear axle support 162. The retaining ring clips 176, 178 can further prevent the tear axle 170 from translating linearly within the rear axle supports 160, 161. As illustrated, a first rear wheel assembly 180 may be installed on the first end 172 of the rear axle 172 and held in place by a first rear wheel nut 182. A second rear wheel assembly 184 may be installed on the second end 174 of the rear axle 170 and held in place by a second rear wheel nut 186. Accordingly, the rear wheel assemblies 180, 184 can be directly attached to the carrier body 102. Further, the rear wheel assemblies 180, 184 can be considered fixed wheel assemblies, i.e., wheels, that rotate about a single axis and do not steer.

As Illustrated in FIG. 1, the first rear wheel assembly 180 may include a wheel 190 having a central hub 192 in which an outer wheel bearing 194 and an inner wheel bearing (not shown) are installed. The first rear wheel assembly 180 may further include a the 196 installed around an outer rim 198 of the wheel 180. In a particular aspect, the wheel 190 may be made from a polymer material. In particular, the wheel 190 may be made from polypropylene, such as impact grade polypropylene or impact copolymer polypropylene. In another aspect, the wheel 190 may be made from nylon. The tire 196 may also be made from a polymer material. For example, the tire 196 may be a solid tire made from a polymer foam material. Further, the tire 196 may polyurethane foam material, e.g., a closed cell polyurethane foam material. Further, the tire 196 may be made from ethylene-vinyl acetate (EVA) foam. In another aspect the tire 196 may be made from rubber and filled with air.

Figure 2:
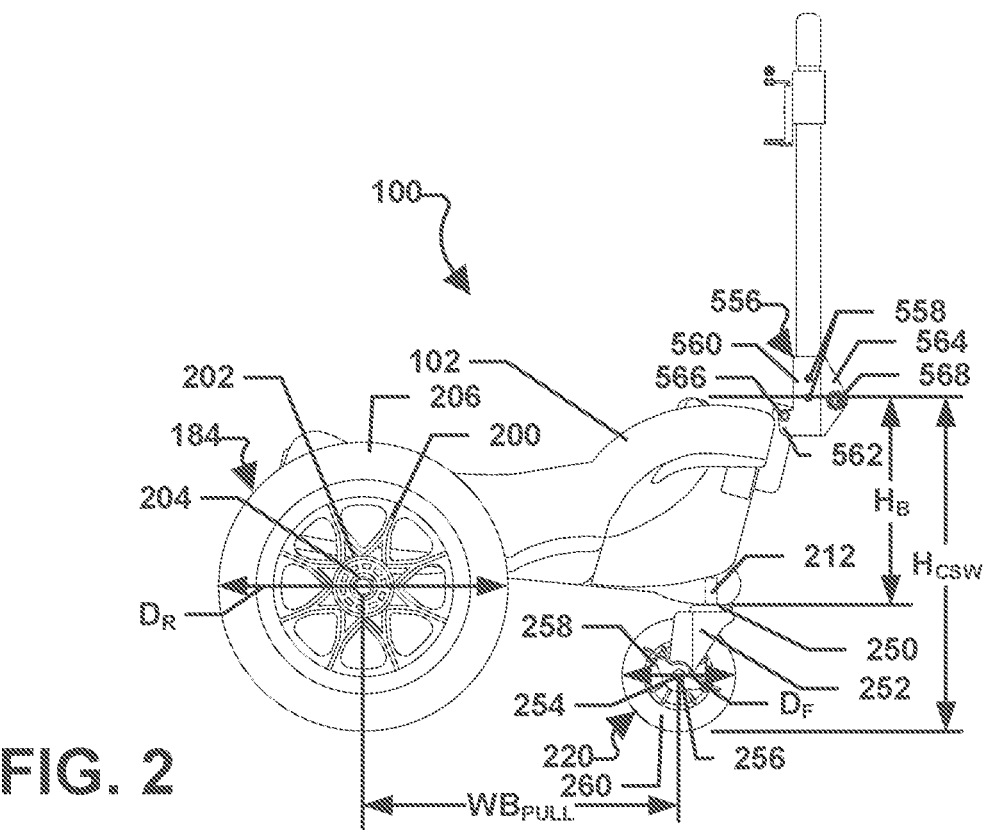

As illustrated in FIG. 2, the second rear wheel assembly 184 may include a wheel 200 having a central hub 202 in which an outer wheel bearing 204 and an inner wheel bearing (not shown) are installed. The second rear wheel assembly 184 may further include a the 206 installed around an outer rim 208 of the wheel 200. In a particular aspect, the wheel 200 may be made from a polymer material. In particular, the wheel 200 may be made from polypropylene, such as impact grade polypropylene or poly propylene impact copolymer. In another aspect, the wheel 200 may be made from nylon. The tire 206 may also be made from a polymer foam material. Further, the tire 196 may polyurethane foam material, e.g., a closed cell polyurethane foam material. For example, the tire 206 may be a solid the made from a polyurethane foam material. Further, the tire 206 may be made from ethylene-vinyl acetate (EVA) foam. In another aspect, the tire 196 may be made from robber and filled with air. In another aspect, the tire 206 may be made from rubber and filled with air.

Returning to FIG. 4, the car seat carrier 100 can further include a first front wheel assembly 210 installed in the bottom plate 150 of the carrier body 102, e.g., the second portion 154 of the bottom plate 150. In particular, the first front wheel assembly 210 can include a threaded stem 212 that extends through a bore 214 formed in the bottom plate 150 near the front end 106 of the carrier body 102. A threaded nut 216 can engage the threaded stem 202 and hold the first front wheel assembly 200 firmly in place.

The car seat carrier 100 can also include a second front wheel assembly 220 installed in the bottom plate 150 of the carrier body 102, e.g., the second portion 154 of the bottom plate 150. In particular, the second front wheel assembly 220 can include a threaded stem 222 that can extend through a bore 224 formed in the bottom plate 150 near the front end 106 of the carrier body 102. A threaded nut 226 can engage the threaded stem 222 and hold the second front wheel assembly 220 firmly in place. The front wheel assemblies 210, 220 can be swiveled wheels assemblies e.g., wheel assemblies that rotate about two axes and provide steering.

FIG. 1 shows that the first front wheel assembly 210 can include a base plate 230 from which the threaded stem 212 can extend up into carrier body 102 through the bottom plate 150. A wheel support frame 232 can be coupled to the base plate 230 via a bearing assembly and an internal post (not shown). The wheel support frame 232 can rotate three-hundred and sixty degrees (360°) relative to the base plate 230 around an axis centered on the threaded stem 202. Further, the wheel support frame 232 can rotate around the axis centered on the threaded stem 202 three-hundred and sixty degases (360°) relative to the carrier body 102.

The first front wheel assembly 210 also includes an axle 234 mounted in the wheel support frame 232. The axle 234 can include an at least partially threaded bolt held in place within the wheel support frame 232 by a threaded nut 226. A wheel 238 can be mounted on the axle 234 and rotate thereon. Further, a tire 240 can be mounted on the wheel 238. In a particular aspect, the wheel 238 may be made from a polymer material. In particular, the wheel 238 may be made from polypropylene, such as impact grade polypropylene or impact copolymer polypropylene. In another aspect, the wheel 238 may be made from nylon. The tire 240 may also be made from a polymer material. For example, the tire 240 may be a solid tire made from polymer foam material. Further, the tire 196 may polyurethane foam material, e.g., a closed cell polyurethane foam material. In another aspect the tire 240 may be made from rubber and filled with air in still another aspect, the tire 240 may be a solid polymer tire. e.g., a solid polyurethane tire or a solid rubber tire. Since the wheel 238 is mounted on the axle 234 of the wheel support frame 232, the wheel 238 and the tire 240 may also rotate three-hundred and sixty degrees (360°) relative to the carrier body 102 with the first front wheel assembly 210.

FIG. 4 indicates that the first front wheel assembly 210 may also include a wheel lock 242 that may be toggled between an "ON" position and an "OFF" position. When the wheel lock 242 is in the "ON" position, the wheel 238 and the tire 240 may not easily rotate within the first front wheel assembly 210 on the axle 234. When the wheel lock 242 is in the "OFF" position, the wheel 238 and the tire 240 may freely rotate within the first front wheel assembly 210 on the axle 234. Accordingly, a user can lock the wheel 238 of the first wheel assembly 210 in order to prevent the car seat carrier 100 from freely moving relative to a surface on which the car seat carrier 100 is placed.

FIG. 2 show that the second front wheel assembly 220 can include a base plate 250 from which the threaded stem 222 can extend up into carrier body 102 through the bottom plate 150. A wheel support frame 252 can be coupled to the base plate 250 via a bearing assembly and an internal post (not shown). The wheel support frame 252 can rotate three-hundred and sixty degrees (360°) relative to the base plate 250 around an axis centered on the threaded stem 222. Further, the wheel support frame 252 can rotate around the axis centered on the threaded stem 222 three-hundred and sixty degrees (360°) relative to the carrier body 102.

The second front wheel assembly 220 also includes an axle 254 mounted in the wheel support frame 252. The axle 254 can be an at least partially threaded bolt held in place within the wheel support frame 252 by a threaded nut 256. A wheel 258 can be mounted on the axle 254 and rotate thereon. Further, a tire 260 can be mounted on the first front wheel 258. In a particular aspect, the wheel 258 may be made from a polymer material. In particular, the wheel 258 may be made from polypropylene, such as impact grade polypropylene or impact copolymer polypropylene. In another aspect, the wheel 258 may be made from nylon. The tire 260 may also be made from a polymer material. For example, the tire 260 may be a solid tire made from a polymer foam material. Further, the tire 196 may polyurethane foam material, e.g., a closed cell polyurethane foam material. In another aspect, the tire 260 may be made from rubber and filled with air. In still another aspect, the tire 260 may be a solid polymer tire, e.g., a solid polyurethane tire or a solid rubber tire. Since the wheel 258 is mounted on the axle 254 of the wheel support frame 252, the wheel 258 and the tire 260 may also rotate three-hundred and sixty degrees (360°) relative to the carrier body 102 with the second front wheel assembly 220.

FIG. 4 indicates that the second front wheel assembly 220 may also include a wheel lock 262 that may be toggled between an "ON" position and an "OFF" position. When the wheel lock 262 is in the "ON" position, the wheel 258 and the tire 260 may not easily rotate within the second front wheel assembly 220 on the axle 254. When the wheel lock 262 is in the "OFF" position, the wheel 258 and the tire 260 may freely rotate within the second front wheel assembly 220 on the axle 254. Accordingly, a user can lock the wheel 258 of the second front wheel assembly 220 in order to prevent the car seat carrier 100 from freely moving relative to a surface on which the car seat carrier 100 is placed. It can be appreciated that the wheels 238, 258 of both front wheel assemblies 210, 220 may be locked at the same time to prevent the car seat carrier 100 from rolling on a surface.

It can be appreciated that the front wheels 238, 258 and from tires 240, 260 can swivel around the stems 232, 222 in unison with each other, but also independent from each other. Further, the front wheels 238, 258 and front tires 240, 260 can swivel around the stems 212, 222 in response to steering inputs provided to the front 106 of the carrier body 102 via handle affixed thereto as described in detail below. However, the front wheels assemblies 210, 220 are not directly connected to the handle.

As shown in FIG. 2, the rear wheel assemblies 180, 184 can have a diameter, $D_R$. The front wheel assemblies 210, 220 can have a diameter, $D_F$. Further, the car seat carrier 100 can have a first wheelbase when it is pulled, $WB_{PULL}$, and a second wheelbase when if is pushed, $WB_{PUSH}$, as illustrated in FIG. 13. $WB_{PULL}$ can be measured from the center of the rear wheel assemblies 180, 184 to the center of the axles 234, 254 of the front wheel assemblies 210, 220 when the front wheel assemblies 210, 220 are in position for the car seat carrier 100 to be pulled by a user, as shown in FIG. 2. $WB_{PUSH}$ can be measured from the center of the rear wheel assemblies 180, 184 to the center of the axles 234, 254 of the of the front wheel assemblies 210, 220 when the front wheel assemblies 210, 220 are in position for the car seat carrier 100 to be pushed by a user, as shown in FIG. 3.

In a particular aspect, $D_R$ can be greater than or equal to 3.5 inches. Further, $D_R$ may be greater than or equal to 4.0 inches, such as greater than or equal to 4.5 inches, greater than or equal to 5.0 inches, greater than or equal to 5.5 inches, greater than or equal to 6.0 inches, greater than or equal to 6.5 inches, greater than or equal to 2.0 inches, greater than or equal to 7.5 inches, greater than or equal to 8.0 inches, greater than or equal to 8.5 inches, greater than or equal to 9.0 inches, greater than or equal to 9.5 inches, greater than or equal to 10.0 inches, greater than or equal to 10.5 inches, greater than or equal to 11.0 inches, of greater than or equal to 11.50 inches. In another aspect, $D_R$, may be less than or equal to 17.00 inches. Further $D_R$, may be less than or equal to 16.5 inches, such as less than or equal to 56.0 inches, less than or equal to 15.5 inches, less than or equal to 15.0 inches, less than or equal to 14.5 inches, less than or equal to 14.0 inches, less than or equal to 13.5 inches, less than or equal to 13.0 inches, less than or equal to 12.5 inches, or less than or equal to 12.0 inches. In another aspect, $D_R$ may be within a range between, an including, any of the minimum and maximum values of $D_R$ detailed above.

In a particular aspect $D_F$ can be greater than or equal to 1.0 inches. Further, $D_F$ may be greater than or equal to 1.5 inches, such as greater than or equal to 2.0 inches, greater than or equal to 2.5 inches, greater than of equal to 3.0 inches, greater than or equal to 3.5 inches greater than or equal to 4.0 inches, greater than or equal to 4.50 inches. In another aspect, $D_F$, may be less than or equal to 8.00 inches. Further, $D_R$, may be less than or equal to 7.5 inches, such as less than or equal to 7.0 inches, less than or equal to 6.5 inches, less than or equal to 6.0 inches, less than or equal to 5.5 inches or less than or equal to 5.0 inches. In another aspect, $D_F$ may be within a range between, an including, any of the minimum and maximum values of $D_F$ detailed above.

In another aspect $D_F$ can be less than $D_R$. Further, the ratio of $D_F$ to $D_R$, $D_F/D_R$, can be greater than or equal to 0.20. Further, $D_F/D_R$ can be greater than or equal to 0.250, such as greater than or equal to 0.275, greater than or equal to 0.300, greater than or equal to 0.325, greater than or equal to 0.350, or greater than or equal to 0.375. In still another aspect, $D_F/D_R$ can be less than or equal to 0.500. Moreover, $D_F/D_R$ less than or equal to 0.475, less than or equal to 0.450, less than or equal to 0.425, or less than or equal to 0.400. In another aspect, the values of $D_F/D_R$ can be within a range between, and including, any of the minimum or maximum values of $D_F/D_R$, described above.

In still another aspect, $WB_{PULL}$, may be greater than or equal to 10.0 inches. Moreover, $WB_{PULL}$ may be greater than or equal to 10.5 inches, such as greater than or equal to 11.0 inches, greater than or equal to 11.5 inches, greater than of equal to 12.0 inches greater than or equal to 12.5 inches, greater than or equal to 13.0 inches, greater than or equal to 13.5 inches, or greater than or equal to 14.0 inches. In another aspect, $WB_{PULL}$, may be less than of equal to 19.0 inches. Further, $WB_{PULL}$ may be less than or equal to 18.5 inches, such as less than or equal to 18.0 inches, less than of equal to 17.5 inches, less than or equal to 17.0 inches, less than or equal to 16.5 inches, less than or equal to 16.0 inches, less than or equal to 15.5 inches, less than of equal to 15.0 inches, or less than or equal to 14.5 inches. In yet another aspect, $WB_{PULL}$ may be within a range between, and including, any of the minimum and maximum values of $WB_{PULL}$ detailed herein.

In still another aspect, $WB_{PUSH}$, may be greater than or equal to 12.5 inches. Moreover, $WB_{PUSH}$ may be greater than or equal to 13.0 inches, such as greater than or equal to 13.5 inches, greater than or equal to 14.0 inches, greater than or equal to 14.5 inches, greater than or equal to 15.0 inches, greater than or equal to 15.5 inches, greater than or equal to 16.0 inches, greater than or equal to 16.5 inches. In another aspect, $WB_{PULL}$ may be less than or equal to 21.5 inches. Further, $WB_{PULL}$ may be less than or equal to 21.0 inches, such as less than or equal to 20.5 inches, less than or equal to 20.0 inches, less than or equal to 19.5 inches, less than or equal to 19.0 inches, less than or equal to 18.5 inches less than or equal to 18.0 inches, less than or equal to 17.5 inches, or less than or equal to 17.0 inches. In yet another aspect, $WB_{PUSH}$ may be within a range between and including, any of the minimum and maximum values of $WB_{PUSH}$ detailed herein.

Returning to FIG. 2 the carrier body 102 of the car seat carrier 100 can include a carrier body height $H_{CB}$, measured between the lowest part of the carrier body 102 and the highest part of the carrier body 102. It is to be understood that $H_{CB}$ does not include the wheel assemblies 180, 184, 210, 220 and the pivoting/telescoping handle, described in detail below. Further, as shown in FIG. 2, the carrier body 102 of the car seat carrier 100 can include an overall carrier body height $H_{OCB}$, measured from a surface on which the car seat carrier 100 is placed to the highest part of the carrier body 102, not including the pivoting/telescoping handle, described in detail below.

In a particular aspect $H_{CB}$, may be greater than or equal to 7.00 inches. Moreover $H_{CB}$ may be greater than or equal to 7.25 inches, such as greater than or equal to 7.50 inches, greater than or equal to 7.75 inches, greater than or equal to 8.00 inches, greater than or equal to 8.25 inches, greater than or equal to 8.50 inches, or greater than or equal to 8.75 inches. In another aspect, $H_{CB}$, may be less than or equal to 10.00 inches. Further $H_{CB}$ may be less than or equal to 9.75 inches, such as less than or equal to 9.50 inches, less than or equal to 9.25 inches, or less than or equal to 9.00 inches. In yet another aspect, $H_{CB}$ may be within a range between, and including, any of the minimum and maximum values of $H_{CB}$ detailed herein.

In another aspect, $H_{OCB}$, may be greater than or equal to 9.0 inches. Moreover, $H_{OCB}$ may be greater than or equal to 9.5 inches, such as greater than or equal to 10.0 inches, greater than or equal to 10.5 inches, greater than or equal to 11.0 inches, greater than or equal to 11.5 inches, greater than or equal to 12.0 inches, greaser than or equal to 12.5 inches, or greater than equal to 13.0 inches. In another aspect, $H_{OCB}$, may be less than or equal to 17.0 inches. Further, $H_{OCB}$ may be less than or equal to 16.5 inches, such as less than or equal to 16.0 inches, less than or equal to 15.5 inches, less than or equal to 15.0 inches, less than or equal to 14.5 inches, less than or equal to 14.0 inches, or less than or equal to 13.5 inches. In yet another aspect, $H_{OCB}$ may be within a range between, and including, any of the minimum and maximum values of $H_{OCB}$ detailed herein.

In a particular aspect a ratio of $D_R$ to $H_{CB}$, $D_R/H_{CB}$ can be greater than or equal to 0.65. Additionally, $D_R/H_{CB}$ can be greater than or equal to 0.70, such as greater than or equal to 0.75, greater than or equal to 0.80, greater than or equal to 0.85, greater than or equal to 0.90, greater than or equal to 0.95, greater than or equal to 1.00, greater than or equal to 1.10, greater than or equal to 1.15, greater than or equal to 1.20, greater than or equal to 1.25, or greater than or equal to 1.30. In another aspect, $D_R/H_{CB}$ can be less than or equal to 2.00. Moreover $D_R/H_{CB}$ can be less than or equal to 1.95, such as less than or equal to 1.90, less than or equal to 1.85, less than or equal to 1.80, less than or equal to 1.75, less than or equal to 1.70, less than or equal to 1.65, less than or equal to 1.60, less than or equal to 1.55, less than or equal to 1.50, less than or equal to 1.45, less than or equal to 1.40, less than or equal to 1.35. Further, $D_R/H_{CB}$ can be within a range between, and Including, any of the minimum and maximum values of $D_R/H_{CB}$ described herein.

In another aspect, a ratio of $D_F$ to $H_{CB}$, $D_F/H_{CB}$ can be greater than to equal to 0.10. Additionally, $D_F/H_{CB}$ can be greater than or equal to 0.15, such as greater than or equal to 0.20, greater than or equal to 0.25, greater than or equal to 0.30, greater than or equal to 0.35, greater than or equal to 0.40, greater than or equal to 0.45, greater than or equal to 0.50, or greater than or equal to 0.55. In another aspect, $D_F/H_{CB}$ can be less than or equal to 0.90. Moreover, $D_F/H_{CB}$ can be less than or equal to 0.85, such as less than or equal to 0.80, less than or equal to 0.75, less than or equal to 0.70, less than or equal to 0.65, or less than or equal to 0.60. Further, $D_F/H_{CB}$ can be within a range between, and including, any of the minimum and maximum values of $D_F/H_{CB}$ described herein.

Figure 5:
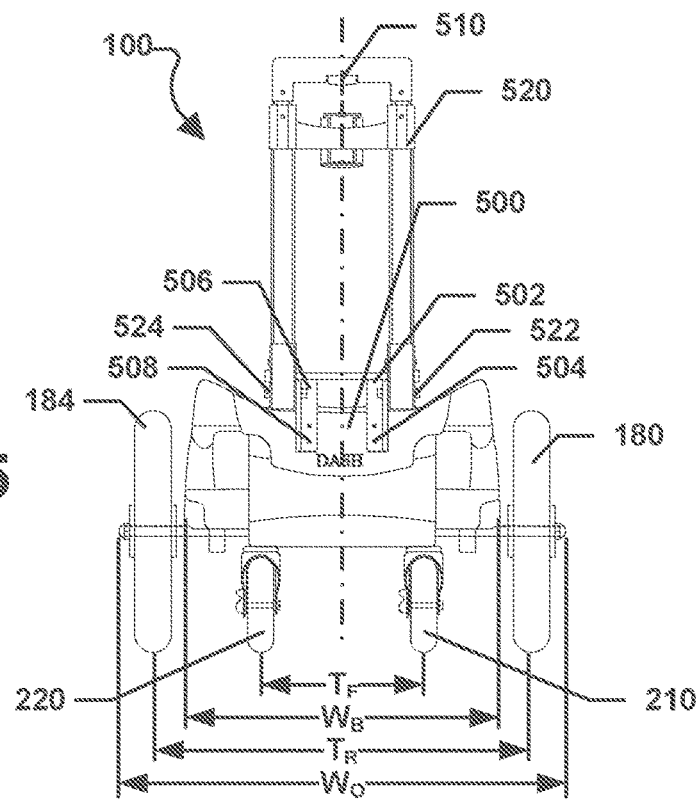
FIG. 5 and FIG. 6 include front plan views of a car seat carrier in accordance with an embodiment.

FIG. 5 shows that the carrier body 102 of the car seat carrier 100 can include an overall body width, $W_{CB}$, measured through the widest point of the carrier body 102, but not including the rear wheel assemblies 180, 184, FIG. 4 indicates that the carrier body 102 of the car seat carrier 100 can include an overall body length, $L_{CB}$, measured through the longest portion of the carrier body 102, but not including the handle brackets 502, 206, the pivoting/telescoping handle 520, the front wheel assemblies 210, 220 (in the push position), and the rear wheel assemblies 180, 184. Further, as indicated in FIG. 5, the car seat carrier 100 can include an overall car seat carrier width, $W_O$, measured through the widest portion of the car seat carrier 100, i.e., from the outer periphery of the first wheel nut 182 to the outer periphery of the second wheel nut 186.

In a particular aspect, $W_{CB}$, may be greater than or equal to 11.0 inches. Moreover, $W_{CB}$ may be greater than or equal to 11.5 inches, such as greater than or equal to 12.0 inches, greater than or equal to 12.5 inches, greater than or equal to 13.0 inches, greater than or equal to 13.5 inches, greater than or equal to 14.0 inches, greater than or equal to 14.5 inches, greater than or equal to 15.0 inches, greater than or equal to 15.5 inches, or greater than or equal to 16.0 inches. In another aspect, $W_{CB}$, may be less than or equal to 20.0 inches. Further, $W_{CB}$ may be less than or equal to 19.5 inches, such as less than or equal to 19.0 inches, less than or equal to 18.5 inches, less than or equal to 18.0 inches, less than or equal to 17.5 inches, less than or equal to 17.0 inches, or less than or equal to 16.5 inches. In yet another aspect, $W_{CB}$ may be within a range between, and including, any of the minimum and maximum values of $W_{CB}$ detailed herein.

In another aspect, $L_{CB}$, may be greater than or equal to 16.0 inches. Moreover, $L_{CB}$ may be greater than or equal to 16.5 inches, such as greater than or equal to 17.0 inches, greater than or equal to 17.5 inches, such as greater than or equal to 18.0 inches, greater than or equal to 18.5 inches, greater than or equal to 19.0 inches, greater than or equal to 1.9.5 inches, greater than or equal to 20.0 inches greater than or equal to 20.5 inches, greater than or equal to 21.0 inches greater than or equal to 21.5 inches, or greater than or equal to 22.0 inches. In another aspect, $L_{CB}$, may be less than or equal to 24.0 inches. Further, $L_{CB}$ may be less than or equal to 23.5 inches, such as less than or equal to 23.0 inches, or less than or equal to 22.5 inches. In yet another aspect, $L_{CB}$ may be within a range between, and including, any of the minimum and maximum values of $L_{CB}$ detailed herein.

In a particular aspect, $WB_{PULL}$ and $WB_{PUSH}$ can be less than $L_{CB}$. Further, a ratio of $WB_{PULL}$ to $L_{CB}$, $WB_{PULL}/L_{CB}$ can be greater than or equal to 0.500. Moreover, $WB_{PULL}/L_{CB}$ can be greater than or equal to 0.525, such as greater than or equal to 0.550, greater than or equal to 0.575, greater than or equal to 0.600, or greater than or equal to 0.625. $WB_{PULL}/L_{CB}$ can be less than or equal to 0.750. Further, $WB_{PULL}/L_{CB}$ can be less than or equal to 0.725, such as less than or equal to 0.700, less than or equal to 0.675, or less than or equal to 0.650. Moreover, $WB_{PULL}/L_{CB}$ can be within a range between, and including any of the minimum and maximum values of $WB_{PULL}/L_{CB}$ detailed herein.

A ratio of $WB_{PUSH}$ to $L_{CB}$, $WB_{PUSH}/L_{CB}$ can be greater than or equal to 0.625. Also, can be greater than or equal to 0.650, such as greater than or equal to 0.675, greater than or equal to 0.700, greater than or equal to 0.725, or greater than or equal to 0.750. $WB_{PUSH}/L_{CB}$ can be less than or equal to 0.875, such as less than or equal to 0.850, less than or equal to 0.825, less than or equal to 0.800, or less than or equal to 0.775. Moreover, $WB_{PUSH}/L_{CB}$ can be within a range between, and including, any of the minimum and maximum values of $WB_{PUSH}/L_{CB}$ detailed herein.

In another particular aspect, $W_O$, may be greater than or equal to 13.5 inches. Moreover. $W_O$ may be greater than or equal to 14.0 inches, such as greater than or equal to 14.5 inches, greater than or equal to 15.0 inches greater than or equal to 15.5 inches, greater than or equal to 16.0 inches, greater than or equal to 16.5 inches, greater than or equal to 17.0 inches, greater than or equal to 17.5 inches, greater than or equal to 18.0 inches, greater than or equal to 18.5 inches, or greater than or equal to 19.0 inches. In another aspect $W_O$, may be less than or equal to 22.0 inches. Further $W_O$ may be less than or equal to 21.5 inches, such as less than or equal to 21.0 inches less; than or equal to 20.5 inches, less than or equal to 20.0 inches, or less than or equal to 19.5 inches, in yet another aspect $W_O$ may be within a range between and including, any of the minimum and maximum values of $W_O$ detailed herein. Further, it is to be understood that in certain embodiments in which the rear wheel assemblies 180, 184 are placed inboard to the carrier body 102, i.e., within the outer periphery of the carrier body 102, $W_O$ may be equal to $W_{CB}$.

Referring now to FIG. 5, the car seat carrier 100 can include a rear track. $T_R$, i.e., the distance from an axis passing through the center of the first rear wheel assembly 182 and an axis passing through the center of the second rear wheel assembly 184. Further, the car seat carrier 100 can include a from track, $T_F$, i.e., the distance from an axis, passing through the center of the first front wheel assembly 210 and an axis passing through the center of the second from wheel assembly 220.

In a particular aspect, $T_F$ may be greater than or equal to 5.00 inches. Further, $T_F$ may be greater than or equal to 5.25 inches, such as greater than or equal to 5.50 inches, greater than or equal to 5.75 inches, greater than or equal to 6.00 inches, greater than or equal to 6.25 inches, greater than or equal to 6.50 inches, greater than or equal to 6.75 inches, greater than or equal to 7.00 inches, greater than or equal 7.25 inches, or greater than or equal to 7.50 inches, in another aspect, $T_F$, may be less than or equal to 9.00 inches. Further, $T_F$, may be less than or equal to 8.75 inches, such as less than or equal to 8.50 inches, less than or equal to 8.25 inches, less than or equal to 8.00 inches, or less than or equal to 7.75 inches. In another aspect, $T_F$ may be within a range between, an including, any of the minimum and maximum values of $T_F$ detailed above.

In still another aspect, $T_R$, may be greater than or equal to 11.0 inches. Moreover, $T_R$ may be greater than or equal to 11.5 inches, such as greater than or equal to 12.0 inches, greater than or equal to 12.5 inches, greater than or equal to 13.0 inches, greater than or equal to 13.5 inches, greater than or equal to 14.0 inches, greater than or equal to 14.5 inches, greater than or equal to 15.0 inches, greater than or equal to 15.5 inches, or greater than or equal to 16.0 inches. In another aspect $T_R$, may be less than or equal to 20.0 inches. Further, $T_R$ may be less than or equal to 19.5 inches, such as less than or equal to 19.0 inches, less than or equal to 18.5 inches, less than or equal to 18.0 inches, less than or equal to 17.5 inches, less than or equal to 17.0 inches, or less than or equal to 16.5 inches, in yet another aspect, $T_R$ may be within a range between, and including, any of the minimum and maximum values of $T_R$ detailed herein.

In another aspect, $T_F$ can be less than $T_R$. Further, a ratio of the front track to the rear track of the car seat carrier 100 $T_F/T_R$ can be greater than or equal to 0.25. Further, $T_F/T_R$ can be greater than or equal 0.30, such as greater than or equal to 0.55, or greater than 0.40. In still another particular aspect $T_F/T_R$ can be less than or equal to 0.85. Moreover. $T_F/T_R$ can be less than or equal to 0.80, such as less than or equal to 0.75, less than or equal to 0.70, less than or equal to 0.65, less than or equal to 0.60, less than or equal to 0.55, less than or equal to 0.50, or less than or equal to 0.45, it is to be understood that $T_F/T_R$ can be within a range between, and including, any of the minimum and maximum values of $T_F/T_R$ detailed herein.

Further, $T_F$ can be less than $W_{CB}$. Moreover, a ratio of the front track to the overall width of the carrier body 102 of the car seat earlier 100, $T_F/W_{CB}$, can be greater than or equal to 0.25. Further, $T_F/W_{CB}$ can be greater than or equal 0.30, such as greater than or equal to 0.35, or greater than 0.40. In still another particular aspect, $T_F/W_{CB}$ can be less than or equal to 0.85. Moreover, $T_F/W_{CB}$ can be less than or equal to 0.80, such as less than or equal to 0.75, less than or equal to 0.70, less than or equal to 0.65, less than or equal to 0.60, less than or equal to 0.55, less than or equal to 0.50, or less than or equal to 0.45. It is to be understood that $T_F/W_{CB}$ can be within a range between, and including, any of the minimum and maximum values of $T_F/W_{CB}$ detailed herein.

In another aspect, as illustrated in FIG. 5, $T_R$ can be greater than $W_{CB}$. However, in other instances, $T_R$ may also be less than $W_{CB}$. Further, a ratio of the rear tract to the overall width of the carrier body 102 of the car seat carrier 100, $T_R/W_{CB}$, can be greater than or equal to 0.50. Further, $T_R/W_{CB}$ can be greater than or equal 0.75, such as greater than or equal to 1.00, or greater than 1.10. In still another particular aspect, $T_R/W_{CB}$ can be less than or equal to 1.80. Moreover, $T_F/W_{CB}$ can be less than or equal to 1.70, such as less than or equal to 1.60, less than or equal to 1.50, less than or equal to 1.40, less than or equal to 1.30, or less than or equal to 1.20. It is to be understood that $T_R/W_{CB}$ can be within a range between, and including, any of the minimum and maximum values of $T_R/W_{CB}$ detailed herein.

Referring now to FIG. 5, the car seat carrier 100 can include a front face 500 at the front end 100 of the carrier body 102. As illustrated, a first handle bracket 502 can be attached to the front face 500 of the carrier body 102 via a pair of fasteners 504. In a particular aspect, each of the fasteners 504 includes a threaded bolt and a nut. As shown, the car seat carrier 100 can further include a second handle bracket 506 also attached to the front face 500 of the carrier body 102 via a pair of fasteners 508. In a particular aspect, each of the fasteners 508 includes a threaded bolt and a nut. The second handle bracket 506 may be spaced from and opposite to the first handle bracket 500 across a central vertical axis 510. A pivoting/telescoping handle 520 may be rotatably affixed to the handle brackets 500, 506 via a first handle fastener 522 and a second handle fastener 524. In a particular aspect, each of the handle fasteners 522, 524 comprises a threaded bolt and a nut.

Figure 6:
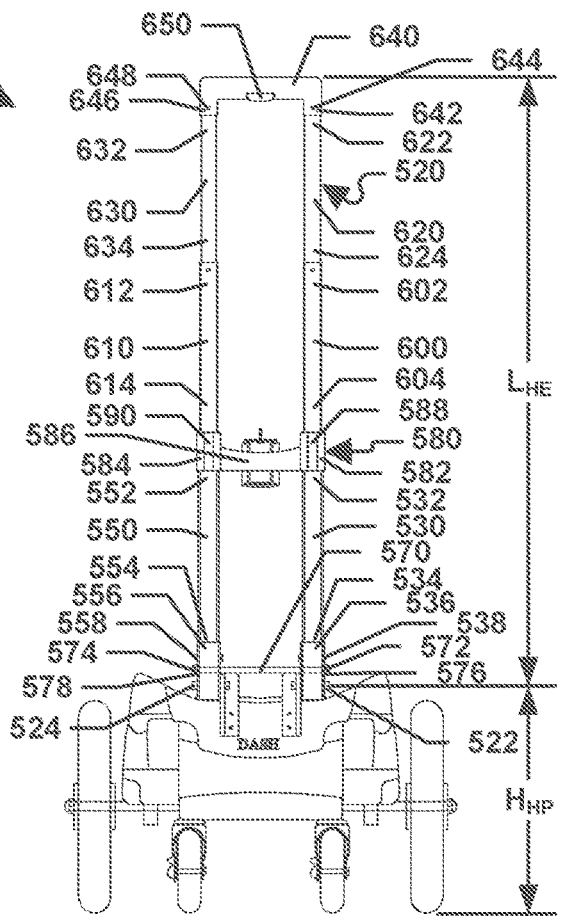

FIG. 6 shows that the pivoting/telescoping handle 520 can include a first lower handle portion 530 having a proximal end 532 and a distal end 534. A first lower bracket 556 may be connected, or otherwise coupled, to the distal end 534 of the first lower handle portion 530 by at least one fastener 538. As depicted in FIG. 1, the first lower bracket 536 is generally L shaped and can include a stem 540 and a lower arm 542 that can extend from the stem 540 toward the rear end 108 of the carrier body 102. The first lower bracket 536 may also include a protrusion 544 near a midpoint of the stem 540 that can extend in a direction opposite the lower arm 542. FIG. 1 also shows that the arm 542 may be formed with a lateral bore 546 that can be sized to receive the first handle fastener 522 in a slip fit arrangement. The protrusion 544 may also be formed with a lateral bore 548.

Returning to FIG. 6, the pivoting/telescoping handle 520 can also include a second lower handle portion 554 having a proximal end 552 and a distal end 554. A second lower bracket 556 may be connected, or otherwise coupled, to the distal end 554 of the second lower handle portion 550 by at least one fastener 558. As depicted in FIG. 2, the second lower bracket 556 is generally L shaped and can include a stem 560 and a lower arm 562 that can extend from the stem 560 toward the rear end 108 of the carrier body 102. The second lower bracket 556 may also include a protrusion 564 near a midpoint of the stem 560 that, can extend in a direction opposite the lower arm 562. FIG. 2 also shows that, the arm 562 may be formed with a lateral bore 566 that can be sized to receive the second handle fastener 524 in a slip fit arrangement, f be protrusion 564 may also be formed with a lateral bore 568.

FIG. 6 further indicates that the pivoting/telescoping handle 520 can further include a cross bar 570 that can extend between the lower brackets 536, 556. In particular, the cross bar 570 can be a cylindrical rod and the cross bar 570 can be installed in the lateral bores 546, 566 formed in the protrusion 544, 546 of each lower brackets 536, 556 so that a first end 572 of the cross bar 570 can extend beyond another side wall of the first, lower bracket 536 and a second end 574 of the cross bar 570 can extend beyond an outer side wall of the second lower bracket 556. The cross bar 570 can be held in place within the lower brackets 536, 556 by a first end cap 576 and a second end cap 576 that fit over the first end 572 and second end 574 of the crossbar 570, respectively.

Figure 8:
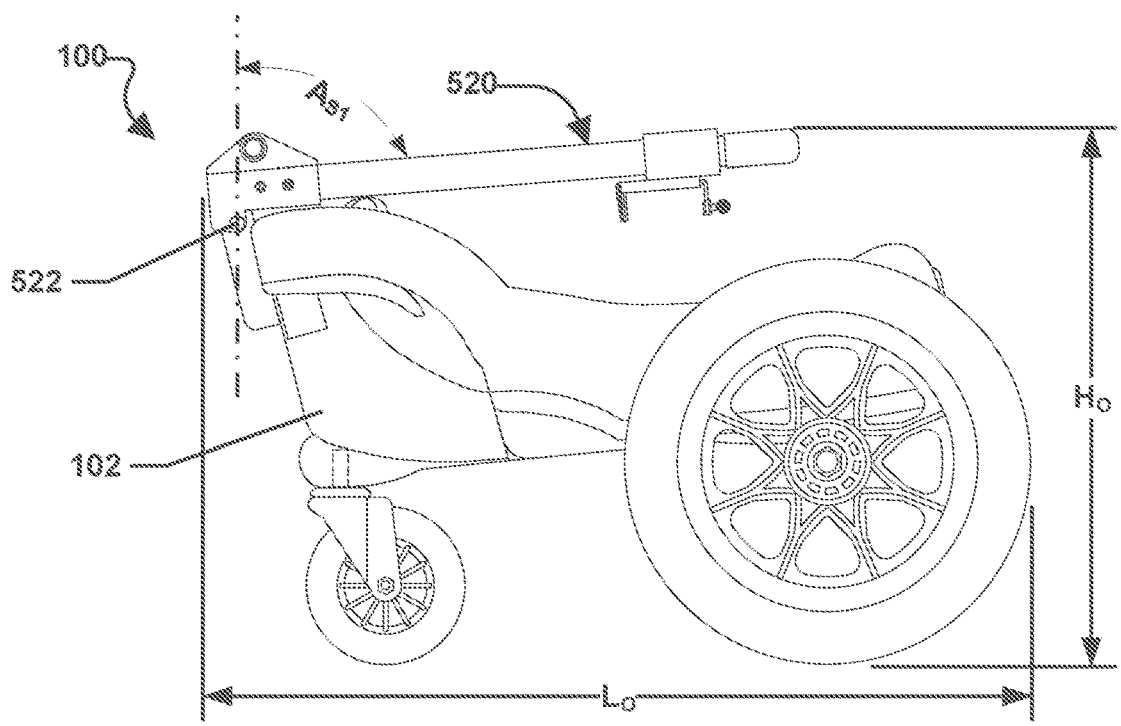

In a particular aspect, the cross bar 570 can act as a lower handgrip that can be used to facilitate picking the car seat carrier 100 up to place it in a car when the pivoting/telescoping handle 520 is rotated so that it lays across the carrier body 102 as illustrated in FIG. 8. In another aspect, the cross bar 570 can be used as an attachment point fora name plate, a storage pouch, a leash, or some other attachment.

As shown in FIG. 6, the pivoting/telescoping handle 520 can further include an intermediate support structure 580 installed on the proximal ends 532, 552 of the lower handle portions 530, 550 of the pivoting/telescoping handle 520. Specifically, the intermediate support structure 580 can include a first collar 582 that fits over the proximal end 532 of the first lower handle portion 530. Moreover, the intermediate support structure 580 can include a second collar 584 that fits over the proximal end 552 of the second lower handle portion 550. A transverse member 586 can extend between the first and second collars 582, 584. The intermediate support structure 580 can be held in place by a first fastener 588 that is engaged with the first lower handle portion 530 and a second fastener 590 that is engaged with the second lower handle portion 550.

FIG. 6 further illustrates that the pivoting/telescoping handle 520 can include a first intermediate handle portion 600 having a proximal end 602 and a distal end 604. The first intermediate handle portion 600 can fit into, and slide within, the first lower handle portion 530. The pivoting/telescoping handle 520 can also include a second intermediate handle portion 610 having a proximal end 612 and a distal end 614. The second intermediate handle portion 610 can fit into, and slide within, the second lower handle portion 530. Additionally, the pivoting/telescoping handle 520 can include a first upper handle portion 620 having a proximal end 622 and a distal end 624. The first upper handle portion 620 can fit into, and slide within the first intermediate handle portion 600. Moreover, the pivoting/telescoping handle 520 can include a second upper handle portion 630 having a proximal end 632 and a distal end 634. The second upper handle portion 630 can fit into, and slide within, the second intermediate handle portion 610.

Figure 7:
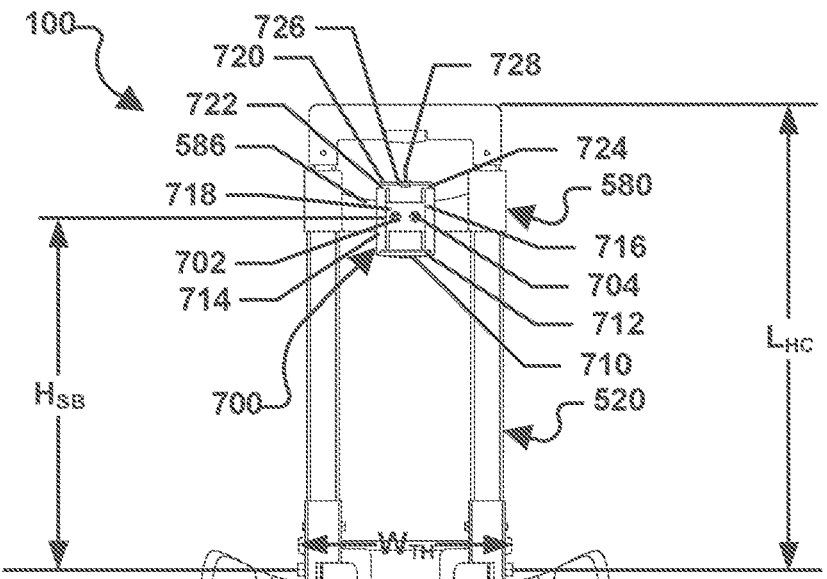
FIG. 7 includes a rear plan view of a car seat carrier in accordance with an embodiment.

As shown in FIG. 6, the pivoting/telescoping handle 520 can further include an upper handgrip 640 coupled to the proximal ends 622, 632 of the upper handle portions 626, 630. Specifically, the upper handgrip 640 can include a first collar 642 fitted over the proximal end 622 of the first upper handle portion 620 and held in place by a first fastener 644. Further, the upper handgrip 640 can include a second collar 646 fitted over the proximal end 632 of the second upper handle portion 630 and held in place by a second fastener 648. FIG. 6 also indicates that the upper handgrip 640 can include a release button 650 that is coupled to an internal locking mechanism (not shown). The pivoting/telescoping handle 520 can be locked in a collapsed configuration as illustrated in FIG. 5 and FIG. 7, and locked in an extended configuration, as illustrated in FIG. 6. By depressing the release button 650, the pivoting/telescoping handle 520 can be unlocked and moved between the collapsed configuration and the extended configuration.

For example, when the pivoting/telescoping handle 520 is fully collapsed it can automatically lock in the collapsed configuration. Pressing the release button 650 will unlock the pivoting/telescoping handle 520 and allow the user to move the pivoting/telescoping handle 520 to the extended configuration. When the pivoting/telescoping handle 520 is fully extended it will automatically lock in the extended configuration until the user presses the release button 650 to unlock the pivoting/telescoping handle 520 and return it to the collapsed configuration.

In another aspect, as illustrated in FIG. 6, the pivoting/telescoping handle 520 can have an extended length, $L_{HE}$, measured from an axis passing through the center of the handle fasteners 522, 524 to the top of the upper handgrip 640 when the pivoting/telescoping handle 520 is in the extended configuration and rotated to a vertical position. Moreover as indicated in FIG. 7, the pivoting/telescoping handle 520 can have a collapsed length, $L_{HC}$, measured from an axis passing through the center of the handle fasteners 522, 524 to the top of the upper handgrip 640 when the pivoting/telescoping handle 520 is in the collapsed configuration and rotated to a vertical position, in addition the handle fasteners 522, 524 can provide a pivot that is located a height, $H_P$, measured front the surface on which the car seat carrier 100 is placed to an axis passing through the center of the handle fasteners 522, 524. FIG. 7 also indicates that the pivoting/telescoping handle 520 can have an overall width, $W_H$, that is measured through the widest portion of the pivoting/telescoping handle 520.

In particular aspect, $L_{HE}$, may be greater than or equal to 24.0 inches. Moreover, $L_{HR}$ may be greater than or equal to 24.5 inches, such as greater than or equal to 25.0 inches, greater than or equal to 25.5 inches, such as greater than or equal to 26.0 inches, greater than or equal to 26.5 inches, greater than of equal to 27.0 inches, greater than or equal to 27.5 inches, greater than or equal to 28.0 inches, greater than or equal to 28.5 inches, greater than or equal to 29.0 inches, greater than or equal to 29.5 inches, greater than or equal to 30.0 inches, greater than or equal to 30.5 incites, greater than or equal to 31.0 inches, greater than or equal to 31.5 inches, greater than or equal to 22.0 inches, greater than or equal to 32.5 inches, greater than or equal to 33.0 inches, greater than or equal to 33.5 inches, greater than or equal to 14.0 inches greater than, or equal to 34.5 inches, or greater than or equal to 35.0 inches.

In another aspect, $L_{HE}$, may be less than or equal to 48.0 inches. Further, $L_{HE}$ may be less than or equal to 47.5 inches, such as less than or equal to 47.0 inches, less than or equal to 46.5 inches, less than or equal to 46.0 inches, less than or equal to 45.5 inches, less than or equal to 45.0 inches, less than or equal to 44.5 inches, less than or equal to 44.0 inches, less than or equal to 43.5 inches, less than or equal to 43.0 inches, less than or equal to 42.5 inches, less than or equal to 42.0 inches, less than or equal to 41.5 inches, less than or equal to 41.0 inches, less than or equal to 40.5 inches, less than or equal to 40.0 inches, less than or equal to 39.5 inches, less than or equal to 39.0 inches, less than or equal to 38.5 inches, less than or equal to 38.0 inches, less than or equal to 37.5 inches, less than or equal to 37.0 inches, less than or equal to 36.5 inches, less than or equal to 37.0 inches, less than or equal to 35.5 inches. In yet another aspect, $L_{HE}$ may be within a range between, and including, any of the minimum and maximum values of $L_{HE}$ detailed herein.

In particular aspect, $L_{HC}$, may be greater than or equal to 10.0 inches. Moreover, $L_{HC}$ may be greater than or equal to 10.5 inches, such as greater than or equal to 11.0 inches, greater than or equal to 11.5 inches, such as greater than or equal to 12.0 inches, greater than or equal to 12.5 inches, greater than or equal to 13.0 inches, greater than or equal to 13.5 inches, greater than or equal to 14.0 inches, greater than or equal to 14.5 inches, greater than or equal to 15.0 inches, greater than or equal to 15.5 inches, or greater than or equal to 16.0 inches. In another aspect, $L_{HC}$, may be less than or equal to 24.0 inches. Further, may be less than or equal to 23.5 inches, such as less than or equal to 23.0 inches less than or equal to 22.5 inches, less than or equal to 22.0 inches, less than or equal to 21.5 inches, less than or equal to 21.0 inches, less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, less than or equal to 17.0 inches, or less than or equal to 16.5 inches. In yet another aspect, $L_{HC}$ may be within a range between, and including, any of the minimum and maximum values of $L_{HC}$ detailed herein.

Further, in another aspect, $W_H$ can may be greater than or equal to 0.50 inches. Moreover, $W_H$ may be greater than or equal to 0.75 inches, such as greater than or equal to 1.00 inches, such as greater than or equal to 1.50 inches, greater than or equal to 2.50 inches, greater than or equal to 5.00 inches, greater than or equal to 6.50 inches, greater than or equal to 7.00 inches, or greater than or equal to 7.25 inches. In another aspect, $W_H$, may be less than or equal to 12.00 inches. Further, $W_H$ may be less than or equal to 11.50 inches, such as less than or equal to 11.00 inches, less than or equal to 10.50 inches, less than or equal to 10.00 inches, less than or equal to 9.50 inches, less than or equal to 9.00 inches, less than or equal to 8.50 inches, less than or equal to 8.00 inches or less than or equal to 7.50. In yet another aspect, $W_H$ may be within a range between, and including, any of the minimum and maximum values of $W_H$ detailed herein.

In a particular aspect, a ratio of $D_R$ to $L_{HE}$, $D_F/L_{HE}$, can be greater than or equal to 0.10. Moreover, $D_R/L_{HE}$ can be greater than or equal to 0.15, such as greater than or equal to 0.20, greater than or equal to 0.25, or greater than or equal to 0.30. $D_R/L_{HE}$ can also be less than or equal to 0.70, such as less than or equal to 0.65, less than or equal to 0.60, less than or equal to 0.55, less than or equal to 0.50, less than or equal to 0.45, less than or equal to 0.40, or less than or equal to 0.35. Moreover, $D_R/L_{HE}$ can be within a range between, and including, any of the minimum and maximum values of $D_R/L_{HE}$ detailed herein.

In a particular aspect, a ratio of $D_R$ to $L_{HC}$, $D_R/L_{HC}$, can be greater than or equal to 0.50. Moreover, $D_R/L_{HC}$ can be greater than or equal to 0.55, such as greater than or equal to 0.60, greater than or equal to 0.65, or greater than or equal to 0.70. $D_R/L_{HC}$ can also be less than or equal to 1.20, such as less than or equal to 1.15 less than or equal to 1.10, less than or equal to 1.05, less than or equal to 1.00, less than or equal to 0.95 less than or equal to 0.90, less than or equal to 0.85, less than or equal to 0.80, or less than or equal to 0.75. Moreover, $D_R/L_{HC}$ can be within a range between, and including, any of the minimum and maximum values of $D_R/L_{HC}$ detailed herein.

In a particular aspect, a ratio of $D_F$ to $L_{HE}$ can be greater than or equal to 0.02. Moreover, $D_R/L_{HE}$ can be greater than or equal to 0.04, such as greater than or equal to 0.08, greater than or equal to 0.10, or greater than or equal to 0.12. $D_R/L_{HE}$ can also be less than or equal to 0.30, such as less than or equal to 0.25 less than or equal to 0.20, less than or equal to 0.18, less than or equal to 0.16, or less than or equal to 0.14. Moreover, $D_F/L_{HE}$ can be within a range between, and including, any of the minimum and maximum values of $D_F/L_{HE}$ detailed herein.

In a particular aspect, a ratio of $D_F$ to $L_{HC}$, can be greater than or equal to 0.04. Moreover, $D_F/L_{HC}$ can be greater than or equal to 0.06, such as greater than or equal to 0.08, greater than or equal to 0.10, greater than or equal to 0.15, greater than or equal to 0.20, greater than or equal to 0.22, greater than or equal to 0.21, greater than or equal to 0.26, or greater than or equal to 0.28. $D_F/L_{HC}$ can also be less than or equal to 0.60, such as less than or equal to 0.55, less than or equal to 0.50, or less than or equal to 0.45. Moreover, $D_F/L_{HC}$ can be within a range between, and including, any of the minimum and maximum values of $D_F/L_{HC}$ detailed herein.

In another aspect, a ratio of $W_H$ to $T_F$, $W_H/T_F$, can be greater than or equal to 0.10. Moreover, $W_H/T_F$ can be greater than or equal to 0.15, such as greater than or equal to 0.25, greater than or equal to 0.50, greater than or equal to 0.75, greater than or equal to 0.90 or greater than or equal to 0.95. In another aspect, $W_H/T_F$ can be less than or equal to 1.50. Further, $W_H/T_F$ can be less than or equal to 1.45 such as less than or equal to 1.40, less than or equal to 1.35, less than or equal to 1.30, less than or equal to 1.25, less than or equal to 1.20, less than or equal to 1.15 less than or equal to 1.10, less than or equal to 1.05, or less than or equal to 1.00. Moreover, $W_H/T_F$ can be within a range bet ween, and including, any of the minimum and maximum values of $W_H/T_F$ detailed herein.

In still another aspect, a ratio of $W_H$ to $T_R$, $W_H/T_R$, can be greater than or equal to 0.05. Moreover, $W_H/T_R$ can be greater than or equal to 0.10, such as greater than or equal to 0.15, greater than or equal to 0.20, greater than or equal to 0.25, greater than or equal to 0.30, greater that or equal to 0.35, or greater than or equal to 0.40. In another aspect, $W_H/T_R$ can be less than or equal to 0.9. Further, $W_H/T_R$ can be less than or equal to 0.85, such as less than or equal to 0.80, less than or equal to 0.75, less than or equal to 0.70, less than or equal to 0.65, less than or equal to 0.60, less than or equal to 0.55, less than or equal to 0.50, or less than or equal to 0.45. Moreover, $W_H/T_R$ can be within a range between, and including any of the minimum and maximum values of $W_H/T_R$ detailed herein.

Referring now to FIG. 7, the car seat carrier 100 can include a smartphone bracket 700 that can be attached or otherwise affixed, to the pivoting/telescoping handle 520. The smartphone bracket 700, and a smartphone placed therein, is in the line of sight of an infant, or toddler, that is placed its a car seat attached to rise car seat carrier 100, as described herein. In particular, as illustrated in FIG. 7, rise smartphone bracket 700 can be attached to the intermediate support structure 580 of the pivoting/telescoping handle 520. Further still, the smartphone bracket 700 can be attached to the transverse member 586 of the intermediate support structure 580 of the pivoting/telescoping handle 520. As shown, the smartphone bracket 700 can be attached to the transverse member 586 by a first fastener 702 and a second fastener 704. The fasteners 702, 704 can include a pair of threaded fasteners held in place by first and second threaded nuts 706, 708, respectively, as shown in FIG. 4.

Returning to FIG. 7, the smartphone bracket 700 can include a lived portion 710 that can include a base 712. A first support post 714 can extend generally perpendicularly from the base 712. A second support post 716 can also extend generally perpendicularly from the base 712 in the same direction as the first support post 714. As shown, the support posts 714, 716 are substantially parallel to each other. FIG. 7 further shows a transverse mounting plate 718 that can extend between the support posts 714, 716. The fasteners 702, 704 can extend through the transverse mounting plate 718 and into the transverse member 586 of the intermediate support structure 580 of the pivoting/telescoping handle 520.

As illustrated in FIG. 7, the smartphone bracket 700 can include a sliding portion 720 that can slide relative to the fixed portion 710. Specifically, the sliding portion 720 can include a first sliding post 722 installed within a bore (not shown) formed in the first support post 714. It is to be understood that the first sliding post 722 can slide linearly within the first support post 714. The sliding portion 720 can also include a second sliding post 724 installed within a bore (not shown) formed in the second support post 716. It is to be understood that the second sliding post 724 can also slide within the second support post 716.

The sliding portion 720 of the smartphone bracket 700 can further include a transverse member 726 extending between the first sliding post 722 and the second sliding post 724. As shown, the transverse member 726 of the sliding portion 720 is substantially perpendicular to the sliding posts 722, 724 and substantially parallel to the base 712 of the fixed portion 710 of the smartphone bracket 700. Further, as shown in FIG. 7, the sliding portion 720 of the smartphone bracket 700 may include a handle 728 extending from the transverse member 726 of the sliding portion 720 of the smartphone bracket 700. In a particular aspect, the smartphone bracket 700 can include a first internal spring (not shown) installed within the first support post 714 and connected to the first sliding post 772. Further, the smartphone bracket 700 can include a second internal spring (not shown) installed within the second support post 716 and connected to the second sliding post 724. As such, a user can grasp the handle 728 and moving sliding portion 720 of the smartphone bracket 700 away from the base 712 of the fixed portion 710 of the smartphone bracket 700. The internal springs (not shown) can provide a force on each sliding post 722, 724 to retract the sliding portion 720 back toward the base 712 of the fixed portion 710. A smartphone, or other portable electrode device, may be placed between the base 712 of the fixed portion 710 and the transverse member 726 of the sliding portion 720 and the internal springs (not shown) can provide a retention force to hold the smartphone within the smartphone bracket 700.

Also, as indicated in FIG. 7, the smartphone bracket 700 can have a bracket height, $H_{SB}$, that is measured from an axis passing through the handle fasteners 522, 524 to a midline of the smartphone bracket 700. The midline of the smartphone bracket 700 is half the distance measured between the base 712 of the fixed portion 710 of the smartphone bracket 700 and the transverse member 726 of she sliding portion 720 of the smartphone bracket 700.

In a particular aspect, $H_{SB}$, may be greater than or equal to 8.0 inches. Moreover, $H_{SB}$ may be greater than or equal to 8.5 inches, such as greater than or equal to 9.0 inches, greater than or equal to 9.5 inches greater than or equal to 10.0 inches, greater than or equal to 10.5 inches, greater than or equal to 11.0 inches, greater than or equal to 11.5 inches, or greater than 12.0 inches. In another aspect, $H_{SB}$, may be less than or equal to 16.0 inches. Further, $H_{SB}$ may be less than or equal to 15.5 inches, such as less than or equal to 15.0 inches less than or equal to 14.5 inches, less than or equal to 14.0 inches, less than or equal to 13.5 inches, less than or equal to 13.0 inches, or less than or equal to 12.5 inches. In yet another aspect $H_{SB}$ may be within a range between and including, any of the minimum and maximum values of $H_{SB}$ detailed herein.

In another particular aspect, can be less than or equal to $L_{HC}$. Further, a ratio of $H_{Sb}$ to $L_{HC}$, $H_{SB}/L_{HC}$, can be greater than or equal to 0.50 Further, $H_{SB}/L_{HC}$ can be greater than or equal to 0.55, such as greater than or equal to 0.60, greater than or equal to 0.65, greater than or equal to 0.70, or greater than or equal to 0.75. In another aspect, $H_{SB}/L_{HC}$ can be less than or equal to 1.0. Moreover, $H_{SB}/L_{HC}$ can be less than or equal to 0.95, such as less than or equal to 0.90, less than or equal to 0.85, or less than or equal to 0.80. In addition, $H_{SB}/L_{HC}$ can be within a range between, and including, any of the minimum or maximum values of $H_{SB}/L_{HC}$ described herein.

Referring now to FIG. 8, it can be seen that the pivoting/telescoping handle 520 can be placed in the collapsed configuration and rotated about the handle fasteners 522, 524 so that the pivoting/telescoping handle 520 is laid back across, or over the carrier body 102 and placed in a first storage position. The first stowage position of the pivoting/telescoping handle 520 facilitates storage or facilitates placement of the car seat carrier 100 in the trunk of an automobile. In the first stowage position, the pivoting/telescoping handle 520 forms an angle, $A_{S1}$, with respect to a vertical axis that extends through the handle fastener(s) 522, 524. Further, in the first stowage position, the pivoting/telescoping handle 520 is rotated behind the vertical axis that extends through the handle fastener(s) 522, 524.

In a particular aspect, $A_{S1}$ can be greater than or equal to 60 degrees. In another aspect, $A_{S1}$ can be greater than or equal 65 degrees, such as greater than or equal to 70 degrees, greater than or equal to 75 degrees, greater than or equal to 80 degrees, or greater than or equal to 85 degrees. In yet another particular aspect, $A_{S1}$ can be less than or equal to 120 degrees. Moreover, $A_{S1}$ can be less than or equal 115 degrees, such as less than or equal to 110 degrees, less than or equal to 105 degrees, less than or equal to 100 degrees, less than or equal to 95 degrees or less than or equal to 90 degrees. In another aspect, $A_{S1}$ can be within a range between, and including, any of the values of $A_{S1}$ described herein.

With the pivoting/telescoping handle 520 in the first stowage position, the car seat carrier 100 can include an overall height, $H_O$, measured from a surface on which car seat carrier 100 is placed to the highest part of the pivoting/telescoping handle 520. Further, in the first stowage position, the car seat carrier 100 can include an overall length, $L_O$, measured from a line perpendicular to the surface on which the car seat carrier 100 is placed and tangential to the first rear wheel assembly 180 and line perpendicular to the surface on which the car seat carrier 100 is placed and tangential to the bottom of the first lower bracket 536.

In a particular aspect, $H_O$ can be greater than or equal to 11.0 inches. Further, $H_O$ can be greater than or equal to 11.5 inches, such as greater than or equal to 12.0 inches greater than or equal to 12.5 inches, greater than or equal to 13.0 inches, greater than or equal to 13.5 inches, greater than or equal to 14.0 inches, greater than or equal to 14.5 inches, or greater than or equal to 15.0 inches. In another aspect, $H_O$ can be less than or equal to 20.0 inches. Moreover, $H_O$ can be less than or equal to 19.5 inches, such as less than or equal to 19.0 inches, less than or equal to 18.5 inches, loss than or equal to 18.0 inches less than or equal to 17.5 inches, less than or equal to 17.0 inches, less than or equal to 16.5 inches, less than or equal to 16.0 inches, or less than or equal to 15.5 inches. In another aspect, $H_O$ can be within a range between, and including, any of the minimum and maximum values of $H_O$ described herein.

In yet another particular aspect $L_O$ can be greater than or equal to 20.0 inches. Further, $L_O$ can be greater than or equal to 21.5 inches, such as greater than or equal to 22.0 inches, greater than or equal to 22.5 inches, or greater than or equal to 23.0 inches. In another aspect, $L_O$ can be less than or equal to 26.0 inches. Moreover, $H_O$ can be less than or equal to 25.5 inches, such as less than or equal to 25.0 inches, less than or equal to 24.5 inches, less than or equal to 24.0 inches, or less than or equal to 23.5 inches. In another aspect, $L_O$ can be within a range between, and including, any of the minimum and maximum values of $L_O$ described herein.

In a particular aspect, a ratio of $H_O$ to $L_O$, $H_O/L_O$ can be greater than or equal to 0.5. Further, $H_O/L_O$ can greater than or equal to 0.55, such as greater than or equal to 0.60, greater than or equal to 0.65, or greater than or equal to 0.70. In another aspect, $H_O/L_O$ can be less than or equal to 1.0. Moreover, $H_O/L_O$ can be less than or equal to 0.95, such as less than or equal to 0.90, least than or equal to 0.85, less than or equal to 0.80, of less than or equal to 0.75. In yet another aspect, $H_O/L_O$ can be within a range between and including any of the minimum or maximum values of $H_O/L_O$ described herein.

Figure 9:
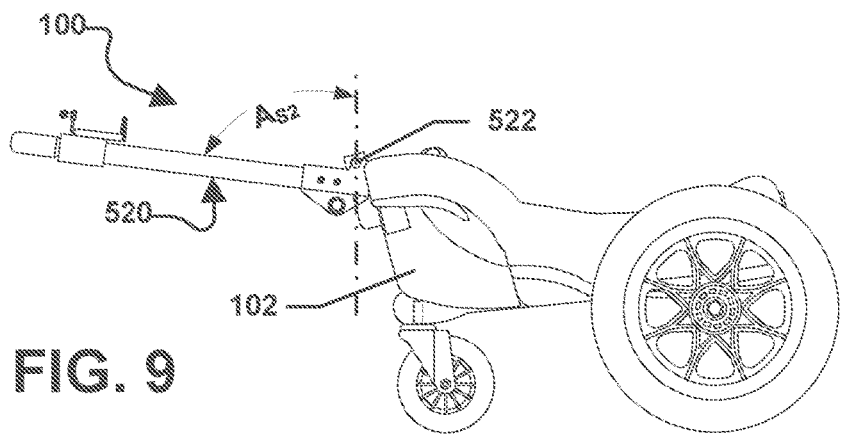
Figure 10:
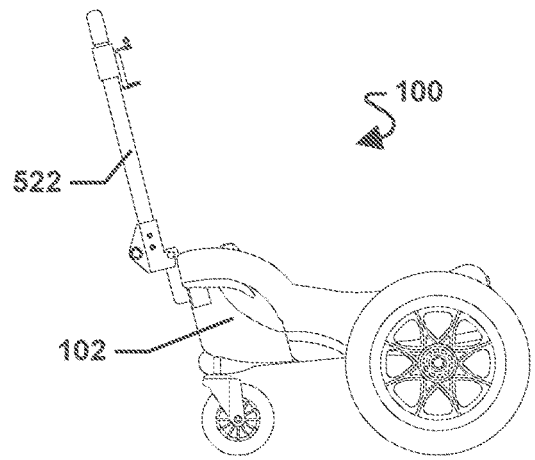
Figure 11:
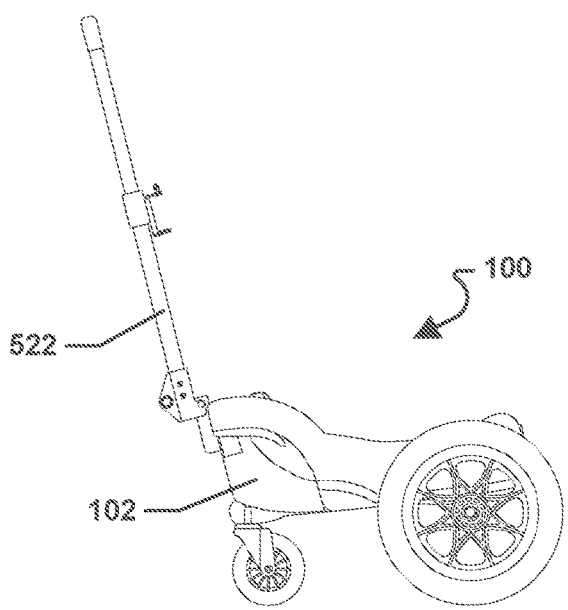

FIG. 9 indicates that the pivoting/telescoping handle 520 can be rotated to a second stowage position substantially opposite to the first stowage positron, in the second stowage position, the pivoting/telescoping handle 520 can be rotated around the handle fasteners 522, 524 until the upper handgrip 640 is the farthest distance away from the rear wheel assemblies 180, 184. With the pivoting/telescoping handle 520 in the second stowage position, the car seat carrier 100 can be rotate to a vertical position (relative to FIG. 9) and hung from a hook by the upper handgrip 640 of the pivoting/telescoping handle 520. In the second stowage position, the pivoting/telescoping handle 520 forms an angle, $A_{S2}$, with respect to a vertical axis that extends through the handle fastener(s) 522, 524. Further, in the second stowage position, the pivoting/telescoping handle 520 is rotated in front of the vertical axis that extends through the handle fastener(s) 522, 524.

In a particular aspect, $A_{S2}$ can be greater than or equal to 60 degrees. In another aspect, $A_{S2}$ can be greater than or equal 65 degrees, such as greater than or equal to 70 degrees greater than or equal to 75 degrees, greater than or equal to 80 degrees, or greater than or equal to 85 degrees. In yet another particular aspect, $A_{S2}$ can be less than or equal to 120 degrees. Moreover, $A_{S2}$ can be less than or equal 115 degrees, such as less than or equal to 110 degrees, less than or equal to 105 degrees, less than or equal to 109 degrees, less than or equal to 95 degrees, or less than or equal to 90 degrees. In another aspect, $A_{S2}$ can be within a range between, and including, any of the values of $A_{S2}$ described herein.

FIG. 10 through FIG. 13 show how the pivoting/telescoping handle 520 can be deployed from the first stowage position (FIG. 8) or the second stowage position (FIG. 9) to the front push/pull position illustrated in FIG. 12 and FIG. 13. Specifically, the pivoting/telescoping handle 520 can be rotated from either stowage position to a vertical, or near vertical position, as show n in FIG. 10. Then, the release button 650 can be pressed in order to unlock the pivoting/telescoping handle 520 so that the pivoting/telescoping handle 520 can be moved to an intermediate extended configuration, illustrated in FIG. 11, before being moved to the fully extended configuration, illustrated in FIG. 12 and FIG. 13.

FIG. 12 and FIG. 13 show that in the fully extended configuration, the pivoting/telescoping handle 520 can be moved to the front push/pull position. In the front push/pull position, the pivoting/telescoping handle 520 may form an angle, $A_{FPP}$, with inspect to an axis that extends vertically through the handle fastener(s) 522, 524. $A_{FPF}$ can vary based on the height of the user and the length of the user's arms. Moreover, regardless of the value of $A_{FPP}$, the pivoting/telescoping handle 520 will be rotated so that the pivoting/telescoping handle 520 is in front of the axis that extends vertically through the handle fastener(s) 522, 524 about which the pivoting/telescoping handle 520 pivots or rotates. Further, in the front push/pull position the upper handgrip 640 is in front of the axis that extends vertically through the handle fastener(s) 522, 524 and the upper handgrip 640 is not directly above the carrier body 102.

In a particular aspect $A_{FPF}$ can be greater than or equal to 0 degrees. In another aspect, $A_{PFP}$ can be greater than or equal 5 degrees, such as greater than or equal to 10 degrees, greater than or equal to 15 degrees, greater than or equal to 20 degrees, greater than or equal to 25 degrees, greater than or equal to 30 degrees, greater than or equal to 35 degrees, greater than or equal to 40 degrees, or greater than or equal to 45 degrees. In yet another particular aspect, $A_{FPP}$ can be less than or equal to 90 degrees. Moreover, $A_{FPF}$ can be less than or equal 85 degrees such as less tot or equal to 80 degrees, less than or equal to 75 degrees, less than or equal to 70 degrees, less than or equal to 65 degrees, less than or equal to 60 degrees less than or equal to 55 degrees, or less than or equal to 50 degrees. In another aspect, $A_{FPP}$ can be within a range between, and including, any of the values of $A_{PFP}$ described herein.

With the telescoping handle 520 in the front push/pull position, a user can pull the car seat carrier 100 in a direction indicated by arrow 1200 as illustrated in FIG. 12. Moreover, with the telescoping handle 520 in the from push/pull position, a user can push the car seat carrier 100 in a direction indicated by arrow 1300 as illustrated in FIG. 13.

Figure 14:
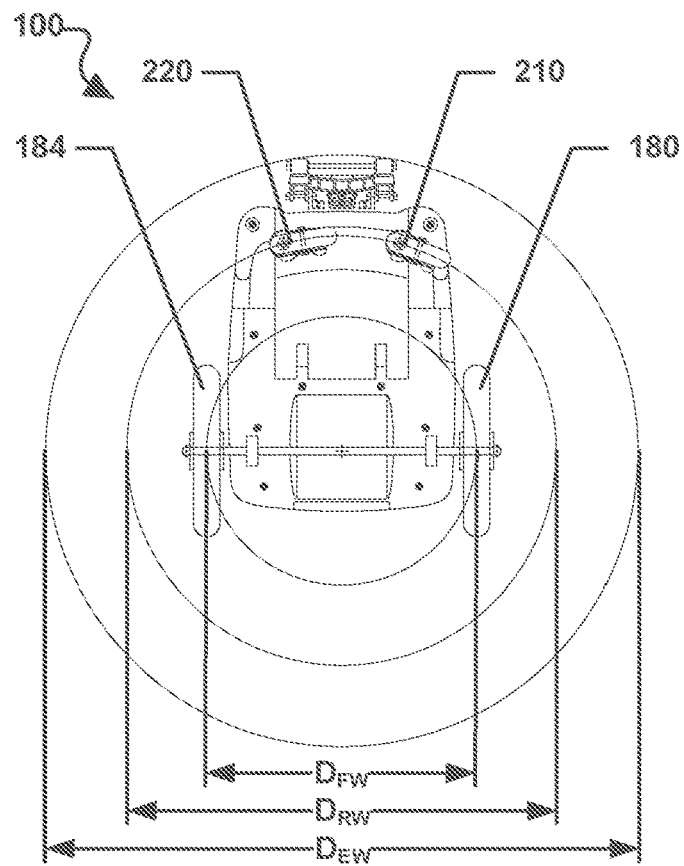
FIG. 14 includes a bottom plan view of a car seat carrier in accordance with an embodiment.

FIG. 14 indicates that the car seat carrier 100 can have a zero turn radius. Also due to the relatively short wheel base and relatively narrow front and rear track, with the pivoting/telescoping handle 520 in a vertical position, the entire car seat carrier 500 can turn three-hundred and sixty degrees within a circle having a diameter, $D_E$. In particular $D_E$ is less than or equal to 44.0 inches. In another aspect, $D_E$ can be less than or equal to 43.5 inches, such as less than or equal to 43.0 inches, less than or equal to 42.5 inches, less than or equal to 42.0 inches less than or equal to 41.5 inches, less than or equal to 41.0 inches, less than or equal to 40.5 inches, less than or equal to 40 inches, or less than or equal, to 39.5 inches. In yet another aspect, $D_{FW}$ can be greater than or equal to 36.0 inches. Further, $D_{FW}$ can be greater than or equal to 36.5 inches, such as greater than or equal to 37.0 inches, greater than or equal to 37.5 inches, greater than or equal to 38.0 inches, greater than or equal to 38.5 inches or greater than or equal to 39.0 inches. It is to be understood that $D_E$ can be within a range between, and including any of the maximum and minimum values of $D_E$ described herein.

Additionally, when the car seat carrier 100 turned three-hundred and sixty degrees, as illustrated in FIG. 14, the front wheel assemblies 210, 220 can trace a circle having a diameter, $D_{FW}$. In particular $D_{FW}$ is less than or equal to 36.0 inches. Further, $D_{FW}$ can be less than or equal to 35.5 inches, such as less than or equal to 35.0 inches, less than or equal to 34.5 inches, less than or equal to 34.0 inches, less than or equal to 33.5 inches, less than or equal to 33.0 inches, less than or equal to 32.5 inches, less than or equal to 32 inches, less than or equal to 31.5 inches, less than or equal to 31.0 inches, less than or equal to 30.5 inches, less than or equal to 30.0 inches, less than or equal to 29.5 inches, or less than or equal to 29.0 inches. In another aspect, $D_{FW}$ can be greater than or equal to 26.0 inches. Further, $D_{FW}$ can be greater than or equal to 26.5 inches, such as greater than or equal to 27.0 inches, greater than or equal to 27.5 inches, greater than or equal to 28.0 inches, greater than or equal to 28.5 inches or greater than or equal to 29.0 inches. It is to be understood that $D_{FW}$ can be within a range between, and including any of the maximum and minimum values of $D_{FW}$ described herein.

When turned three-hundred and sixty degrees, as indicated in FIG. 14, the rear wheel assemblies 180, 184 can trace a circle having a diameter, $D_{FW}$. In particular $D_{RW}$ is the same is the rear track $T_R$, of the of the rear wheel assemblies 180, 184 and detailed herein.

Referring now to FIG. 15 the car seat carrier 100 is shown with an infant car seat 1500 above the car seal carrier 100. As illustrated, the infant car seat 1500 includes a body 1502, a handle 1504 that extends from the body 1502, and a canopy 1506 that can be raised or lowered. The body 1502 is confirmed to fit into the carrier body 102 of the car seat earlier 100. Specifically, the body 1502 of the infant car seat 1500 is configured to fit into me first cavity 122 (FIG. 3) and the second cavity 124 (FIG. 3) of the carrier body 102.

Further, the body 1502 of the infant car seat 1500 can include a retractable securing projection 1508 on each side of the body 1502 of the infant car seat 1500. The infant car seat 1500 also includes a release handle 1510 that can be used to retract the retractable securing projections 1508 in order to unlock the infant car seat 1500 from the car seat carrier 100 when the infant car seat 1500 is properly installed, and locked, in the car seat carrier 100. When installed in the car seat carrier, the retractable securing projections 1508 of the car seat 1500 can snap into and engage the rear locking notches 128, 130 (FIG. 3) formed in the carrier body 102.

Additionally, attachment points (not shown) on the underside of the body 1502 of the car seat 1500 can engage the first book 142 (FIG. 3) and the second book 144 (FIG. 3) that extend from the carrier body 102 of the car seat carrier 100. Accordingly, the first hook 142, the second hook 144, the first rear locking notch 128, and the second rear locking notch 130 work in concert with the attachment points and the retractable securing projections 1508, respectively, to engage and lock the infant car seat 1500 to the car seat carrier 100, as shown in FIG. 16 through FIG. 22.

FIG. 15 indicates that the infant car seat 1500 can have an overall length, $L_{ICS}$, measured between the front of the infant car seat 1500 and the rear of the infant car seat 1500. In this case, $L_{ICS}$ is measured with the canopy 1506 fully raised, as shown in FIG. 15. Additionally, as shown, the infant car seat 1500 can have an overall height, $H_{ICS}$, that is measured from the bottom of the infant car seat 1500 and the top of the handle 1504 when it is locked in the upright position, as illustrated in FIG. 15.

In a particular aspect, $L_{ICS}$ can be greater than or equal to 24 inches. Further, $L_{ICS}$ can be greater than or equal to 24.5 inches, such as greater than or equal 25.0 inches, greater than or equal to 25.5 inches, greater than or equal to 26.0 inches, or greater than or equal to 26.5 inches. In another aspect, $L_{ICS}$ can be less than or equal to 30 inches. Moreover, $L_{ICS}$ can be less than or equal to 29.5 inches, such as less than or equal to 29.0 inches, less than or equal to 28.5 inches, less than or equal to 28.0 inches, less than or equal to 27.5 inches, or less than or equal to 27.0 inches. In still another aspect, $L_{ICS}$ can be within a range between, and including, any of the minimum and maximum values of $L_{ICS}$ described herein.

In another particular aspect, $H_{ICS}$ can be greater than or equal to 20 inches. Further, $H_{ICS}$ can be greater than or equal to 20.5 inches, such as greater than or equal 21.0 inches, greater than or equal to 21.5 inches, greater than or equal to 22.0 inches, greater than or equal to 22.5 inches or greater than or equal to 23.0 inches. In another aspect, can be less than or equal to 26 inches. Moreover, $H_{ICS}$ can be less than or equal to 25.5 inches, such as less than or equal to 25.0 inches, less than or equal to 24.5 inches, less than or equal to 24.0 inches, or less than or equal to 23.5 inches. In still another aspect, $H_{ICS}$ can be within, a range between, and including, any of the minimum and maximum values of $H_{ICS}$ described herein.

Figure 16:
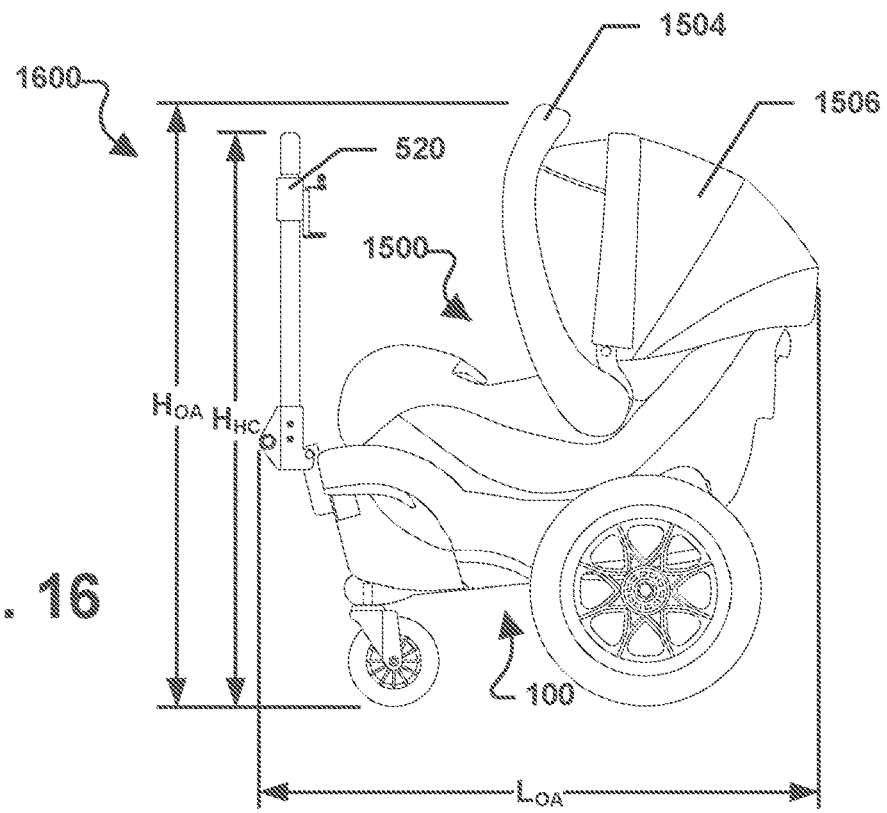

FIG. 16 depicts an infant car seat carrier assembly 1600 that includes the infant car seat 1500 lockably engaged with the car seat carrier 100. As shown, the infant car seat carrier assembly 1600 can include an overall height, $H_{OA}$, measured from the surface on which the infant car seat carrier assembly 1600 is resting to the top of the handle 1504 that is attached to the body 1502 of the infant car seat 1500 when the handle 1504 is positioned in the most upright position. Further, the pivoting/telescoping handle 520 of the car seat carrier 100 can have a collapsed height, $H_{HC}$, measured from the surface on which the infant car seat carrier assembly 1600 is resting to the top of the pivoting/telescoping handle 520 when the pivoting/telescoping handle is collapsed and in a vertical position, as shown in FIG. 16.

In one aspect, as shown in FIG. 16, $H_{HC}$ can be slightly less than $H_{OA}$. However, $H_{HC}$ can be equal to $H_{OA}$. In another aspect $H_{HC}$ can be less than or equal to 99.5% $H_{OA}$. Further, $H_{HC}$ can be less than or equal to 99.0% $H_{OA}$, such as less than or equal to 98.5% $H_{OA}$, less than or equal to 98.0% $H_{OA}$, less than or equal to 97.5% $H_{OA}$, less than or equal to 97.0% $H_{OA}$, less than or equal to 96.5% $H_{OA}$, less than or equal to 96.0% $H_{OA}$, less than or equal to 95.5% $H_{OA}$, or less than or equal to 95.0% $H_{OA}$. In another aspect, $H_{HC}$ can be greater than or equal to 90.0% $H_{OA}$. Further, $H_{HC}$ can be greater than or equal to 90.5% $H_{OA}$, such as greater than or equal to 91.0% $H_{OA}$, greater than or equal to 91.5% $H_{OA}$, greater than or equal to 92.0% $H_{OA}$, greater than or equal to 92.5% $H_{OA}$, greater than or equal to 93.0% $H_{OA}$, greater than or equal to 93.5% $H_{OA}$, greater than or equal to 94.0% $H_{OA}$, or greater than or equal to 94.5% $H_{OA}$. It is to be understood that $H_{HC}$ can also be within a range between, and including, any of the maximum or minimum values of $H_{HC}$ described herein.

In another aspect, $H_{OA}$ can be less or equal to 36 inches. Further, $H_{OA}$ can be less than or equal to 35.5 inches, such as less than or equal to 35.0 inches, less than or equal to 34.5 inches, less than or equal to 34.0 inches, less than or equal to 33.5 inches, less than or equal to 33.0 inches, less than or equal to 32.5 inches, less than or equal to 32.0 inches, less than or equal to 31.5 inches, less than or equal to 31.0 inches, less than or equal to 30.5 inches, or less than or equal to 30.0 inches. Additionally, in another aspect $H_{OA}$ can be greater than or equal to 35.0 inches. Moreover, $H_{OA}$ can be greater than or equal to 25.5 inches, such as greater than or equal to 26.0 inches, greater than or equal to 26.5 inches, greater than or equal to 27.0 inches, greater than or equal to 27.5 inches, greater than or equal to 28.0 inches, greater than or equal to 28.5 inches, greater than or equal to 29.0 inches, or greater than or equal to 29.5 inches. It is to be understood that $H_{OA}$ can also be within a range between, and including, any of the maximum or minimum values of $H_{OA}$ described herein.

In yet another aspect, $H_{HC}$ can be less or equal to 36 inches. Further, $H_{HC}$ can be less than or equal to 35.5 inches, such as less than or equal to 35.0 inches, less than or equal to 34.5 inches, less than or equal to 34.0 inches, less than or equal to 33.5 inches, less than or equal to 33.0 inches, less than or equal to 32.5 inches, less than or equal to 32.0 inches, less than or equal to 31.5 inches, less than or equal to 31.0 inches, less than or equal to 30.5 inches, less than or equal to 30.0 inches, less than or equal to 29.5 inches, or less than or equal to 29.0 inches. Additionally, in another aspect, $H_{HC}$ can be greater than or equal to 25.0 inches. Moreover, $H_{HC}$ can be greater than or equal to 25.5 inches, such as greater than or equal to 26.0 inches, greater than or equal to 26.5 inches, greater than or equal to 27.0 inches, greater than, or equal to 27.5 inches, greater than or equal to 28.0 inches, or greater than or equal to 22.5 inches. It is to be understood that $H_{HC}$ can also be within a range between, and including, any of the maximum or minimum values of $H_{HC}$ described herein.

FIG. 16 further indicates that the infant car seat carrier assembly 1600 can have an overall length, $L_{OA}$, measured from the front of the pivoting/telescoping handle 520 of the car seat carrier 100 when the pivoting/telescoping handle 520 is rotated to the vertical position, as illustrated, to the rear of the canopy 1506 of the infant car seat 1500 when the canopy 1506 is fully raised as illustrated.

In a particular aspect, $L_{OA}$ can greater than or equal 26 inches. Further, $L_{OA}$ can be greater than or equal to 26.5 inches, such as greater than or equal to 27.0 inches, greater than or equal to 27.5 inches, greater than or equal to 28.0 inches, greater than 28.5 inches, greater than or equal to 29.0 inches, or greater than or equal to 29.5 inches. In another aspect, $L_{OA}$ can be less than or equal to 35 inches. Also $L_{OA}$ can be less than or equal to 34.5 inches, such as less than or equal to 34.0 inches, less than or equal to 33.5 inches, less than or equal to 31.0 inches, less than or equal to 32.5 inches, less than or equal to 32.0 inches, less than or equal to 31.5 inches, less than or equal to 31.0 inches less than or equal to 30.5 inches, or less than or equal to 30.0 inches. In another aspect, $L_{OA}$ can be within a range between, and including, any of the minimum and maximum values of $L_{OA}$ described herein.

As clearly illustrated in FIG. 16, the infant car seat carrier assembly 1600 is only slightly longer than the infant car seat 1500. In other words, $L_{OA}$ can be greater than or equal to $L_{ICS}$. Additionally, a ratio of $L_{OA}$ to $L_{ICS}$, $L_{OA}/L_{ICS}$ can be greater than or equal to 1.00. Further, $L_{OA}/L_{ICS}$ can be greater than or equal to 1.05, such as greater than or equal to 1.06, greater than or equal to 1.07, greater than or equal to 1.08 greater than or equal to 1.09, greater than or equal to 1.10 greater than or equal to 1.11, greater than or equal to 1.12 greater than or equal to 1.13, greater than or equal to 1.14, or greater than or equal to 1.15. In another aspect, $L_{OA}/L_{ICS}$ can be less than or equal to 1.50. Moreover, $L_{OA}/L_{ICS}$ can be less than or equal to 1.45, such as less than or equal to 1.40, less than or equal to 1.35 less than or equal to 1.30, less than or equal to 1.25, or less than or equal to 1.20. In another aspect $L_{OA}/L_{ICS}$ can be within a range between, and including, any of the minimum and maximum values of $L_{OA}/L_{ICS}$ described herein.

$L_{OA}$ can also greater than $WB_{PULL}$ and $WB_{PUSH}$. For example, the ratio of $L_{OA}$ to $WB_{PULL}$, $L_{OA}/WB_{PULL}$ can be greater than or equal to 2.00. Further $L_{OA}/WB_{PULL}$ can be greater than or equal to 2.05, such as greater than or equal to 2.10, greater than or equal to 2.15, greater than or equal to 2.20, greater than or equal to 2.25, greater than or equal to 2.30, greater than or equal to 2.35, or greater than or equal to 2.40. In another aspect, $L_{OA}/WB_{PULL}$ can be less than or equal to 3.00. Moreover, $L_{OA}/WB_{PULL}$ can be less than or equal to 2.95, such as less than or equal to 2.90, less than or equal to 2.85, less than or equal to 2.80, less than or equal to 2.75, less than or equal to 2.70, less than or equal to 2.65, less than or equal to 2.60, less than or equal to 2.55, less than or equal to 2.50, or less than or equal to 2.45. In still another aspect, $L_{OA}/WB_{PULL}$ can be within a range between, and including, any of the values of $L_{OA}/WB_{PULL}$ described herein.

The ratio of $L_{OA}$ to $WB_{PUSH}$, $L_{OA}/WB_{PUSH}$ can be greater than or equal to 1.50. Further, $L_{OA}/WB_{PUSH}$ can be greater than or equal to 1.55, such as greater than or equal to 1.60, greater than or equal to 1.65, greater than or equal to 1.70, greater than of equal to 1.75, greater than or equal to 1.80, greater than or equal to 1.85, greater than or equal to 1.90, or greater than or equal to 1.95. In another aspect, $L_{OA}/WB_{PUSH}$ can be less than or equal to 2.50. Moreover, $L_{OA}/WB_{PUSH}$ can be less than or equal to 2.45, such as less than or equal to 2.40, less than or equal to 2.35, less than or equal to 2.30, less than or equal to 2.25, less than or equal to 2.20, less than or equal to 2.15, less than or equal to 2.10, less than or equal to 2.05, or less than or equal to 2.00. In still another aspect, $L_{OA}/WB_{PUSH}$ can be within a range between, and including, any of the values of $L_{OA}/WB_{PUSH}$ described herein.

Further, as illustrated in FIG. 16, the infant car seat cannier assembly 1600 is slightly taller than the infant car seat 1500. As such $H_{OA}$ is greater than $H_{ICS}$. Moreover, a ratio of $H_{OA}$ to $H_{ICS}$, $H_{OA}/H_{ICS}$ can be greater than, or equal to 1.10. Further, $H_{OA}/H_{ICS}$ can be greater than or equal to 1.15, such as greater than or equal to 1.20, greater than or equal to 1.25, or greater than or equal to 1.30. In another aspect, $H_{OA}/H_{ICS}$ can be less than or equal to 1.50, such as less than or equal to 1.45, less than or equal to 1.40, or less than or equal to 1.35. In another aspect, $H_{OA}/H_{ICS}$ can be within a range between, and including, any of the minimum and maximum values of $H_{OA}/H_{ICS}$ described herein.

In a particular aspect, the infant car seat 1500 can have a weight, $WW_{ICS}$, and $WW_{ICS}$ can be less than or equal to 15 pounds. Further, $WW_{ICS}$ can be less than or equal to 14 pounds, such as less than or equal to 13 pounds, less than or equal to 12 pounds, less than or equal to 11 pounds less than or equal to 10 pounds, or less than or equal to 9 pounds. In another aspect, $WW_{ICS}$ can be greater than or equal 4 pounds. Moreover, $W_{CSC}$ can be greater than or equal to 5 pounds, such as greater than or equal to 6 pounds, greater than or equal to 7 pounds, or greater than or equal to 8 pounds. In yet another aspect, $WW_{ICS}$ can be within a range between and including, any of the maximum and minimum values of $WW_{ICS}$ described herein.

In another aspect, a ratio of $W_{CSC}$ to $WW_{ICS}$, $W_{CSC}/WW_{ICS}$ can be less than or equal to 2.0. Further, $W_{CSC}/WW_{ICS}$ can be less than or equal to 1.9, such as less than or equal to 1.8, less than or equal to 1.7, less than or equal to 1.6, or less than or equal to 1.5. In another aspect, $W_{CSC}/WW_{ICS}$ can be greater than or equal to 1.0. Moreover, $W_{CSC}/WW_{ICS}$ can be greater than or equal to 1.1, such as greater than or equal to 1.2, greater than or equal to 1.3, or greater than or equal to 1.4.

Figure 17:
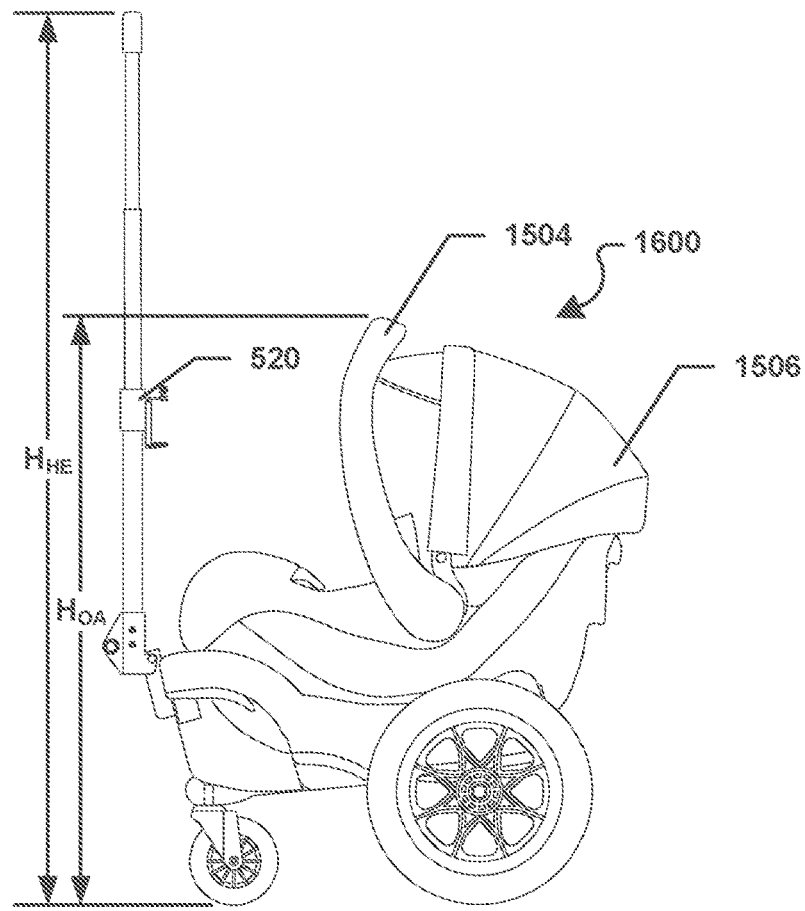

FIG. 17 shows the infant car seat carrier assembly 1600 with the pivoting/telescoping handle 520 of the car seat carrier 100 in the extended configuration. In the extended configuration, the pivoting/telescoping handle 520 can have an extended height, $H_{HE}$, measured from the surface on which the infant car seat carrier assembly 1600 is resting to the top of the pivoting/telescoping handle 520 when the pivoting/telescoping handle is in an extended configuration and in a vertical position, as shown in FIG. 17.

In a particular aspect, $H_{HE}$ can be less or equal to 54 inches. Further, $H_{HE}$ can be less than or equal to 53.5 inches, such as less than or equal to 53.0 inches, less than or equal to 52.5 inches, less than or equal to 52.0 inches, less than or equal to 51.5 inches, less than or equal to 51.0 inches, less than or equal to 50.5 inches, less than or equal to 50.0 inches, less than or equal to 49.5 inches, less than or equal to 49.0 inches, less than or equal to 48.5 inches, or less than or equal to 48.0 inches. Additionally, in another aspect, $H_{HE}$ can be greater than or equal to 36.0 inches. Moreover, $H_{HE}$ can be greater than or equal to 36.5 inches, such as greater than or equal to 37.0 inches, greater than or equal to 37.5 inches, greater than or equal to 38.0 inches, greater than or equal to 38.5 inches, greater than or equal to 39.0 inches, greater than or equal to 39.5 inches, greater than or equal to 40.0 inches, greater than or equal to 40.5 inches, greater than or equal to 41.0 inches, greater than or equal to 41.5 inches, greater than or equal to 42.0 inches, greater than or equal to 42.5 inches, greater than or equal to 43.0 inches, greater than or equal to 43.5 inches, greater than or equal to 44.0 inches, greater than or equal to 44.5 inches, greater than or equal to 45.0 inches, greater than or equal to 45.5 inches, greater than or equal to 46.0 inches, greater than or equal to 46.5 inches, greater than or equal to 47.0 inches, or greater than or equal to 47.5 inches. It is to be understood that $H_{HE}$ can also be within a range between, and including, any of the maximum or minimum values of $H_{HE}$ described herein.

In another aspect, a ratio of $H_{HE}$ to $H_{OA}$, $H_{HE}/H_{OA}$, can be greater than or equal to 1.00. Further, $H_{HE}/H_{OA}$ can be greater than or equal to 1.05, such as greater than or equal to 1.10, greater than or equal to 1.15, greater than or equal to 1.20, greater than or equal to 1.25, greater than or equal to 1.30, greater than or equal to 1.35, greater than or equal to 1.40, greater than or equal to 1.45, greater than or equal to 1.50, greater than or equal to 1.55, or greater than or equal to 1.6. In another aspect, $H_{HE}/H_{OA}$ can be less than or equal to 2.00. Further, $H_{HE}/H_{OA}$ can be less than or equal to 1.95, such as less than or equal to 1.90, less than or equal to 1.85, less than or equal to 1.80, less than or equal to 1.75, less than or equal to 1.70, or less than or equal to 1.65. It is to be understood that $H_{HE}/H_{OA}$ can be within a range between and including, any of the minimum and maximum values of $H_{HE}/H_{OA}$ described herein.

Figure 18:
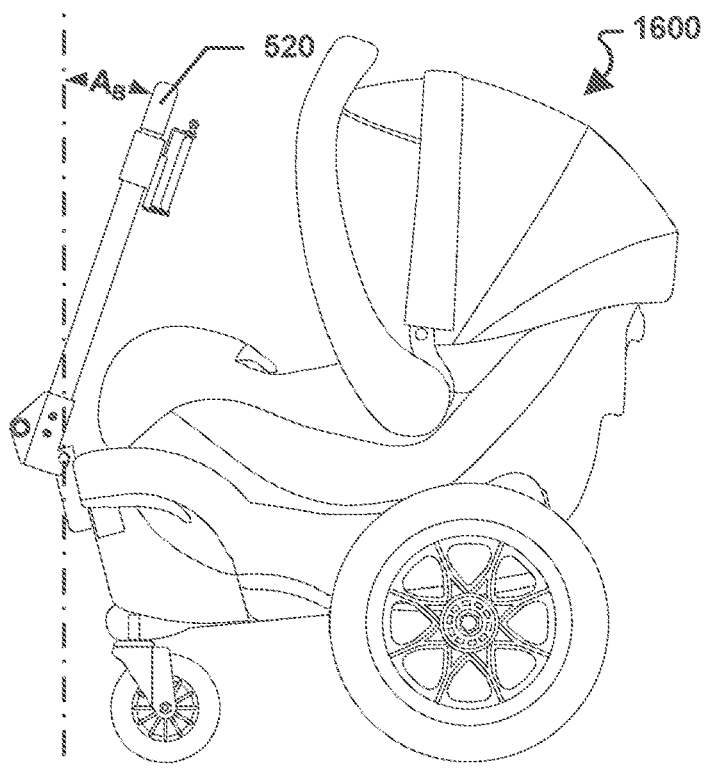

FIG. 18 shows that a smartphone 1800, or other portable electronic device, may be installed in the smartphone bracket 700 and the pivoting/telescoping handle 520 may be rotated to a broadcast position so that a child inside the infant car seat 1500 can view or listen to whatever is playing on the smartphone 1800. For example nursery rhyme song videos can be streamed from a dam network, e.g., a local area network (LAN) connected via a Wi-Fi connection, or a mobile telephone network connected via CDMA, GSM. LTE, etc., to the smartphone 1800 and the child inside the infant car seat 1500 can listen and/or view the nursery thyme song videos.

Further, smartphone applications have been developed that provide child oriented content, e.g., nursery rhyme song videos, that can be broadcast via the smartphone 1800 whether or not the smartphone 1800 is connected to a data network. Other smartphone applications have been developed that provide white noise that can be soothing to a fussy baby or a sleeping baby and can mask other noises that may otherwise wake a sleeping baby. It can be appreciated that the smartphone 1800 can be placed within the smartphone bracket 700 so that the screen of the smartphone 1800 faces away from the pivoting/telescoping handle 520 and toward the infant car seat 1500. Conversely, the smartphone 1800 can be placed within the smartphone bracket 700 so that the screen of the smartphone 1800 faces toward the pivoting/telescoping handle 520 and away from the infant car set 1500. It can also be appreciated that the pivoting/telescoping handle 520 may be rotated to the broadcast position whether or not the pivoting/telescoping handle 520 is in the collapsed configuration, as shown in FIG. 18 or the extended configuration, previously described.

As illustrated in FIG. 18, in the broadcast position, the pivoting/telescoping handle 520 can form a broadcast angle, $A_B$, with respect to an axis that extends vertically through the handle fasteners 522, 524. In a particular aspect, $A_B$ is forming by rotating the pivoting/telescoping handle 520 so that it is vertical or behind the axis that extends vertically through the handle fasteners 522, 524.

In particular, $A_B$ can be greater than or equal to 0 degrees. Further, $A_B$ can be greater than or equal to 5 degrees, such as greater than or equal to 10 degrees, greater than or equal to 15 degrees, or greater than or equal to 20 degrees. In another aspect, $A_B$ can be less than or equal to 45 degrees. Moreover, $A_B$ can be less than or equal to 40 degrees, such as less than or equal to 35 degrees, less than or equal to 30 degrees, or less than or equal to 25 degrees. In still another aspect, $A_B$ can be within a range between, and including, any of the minimum or maximum values of $A_B$ described herein.

Figure 19:
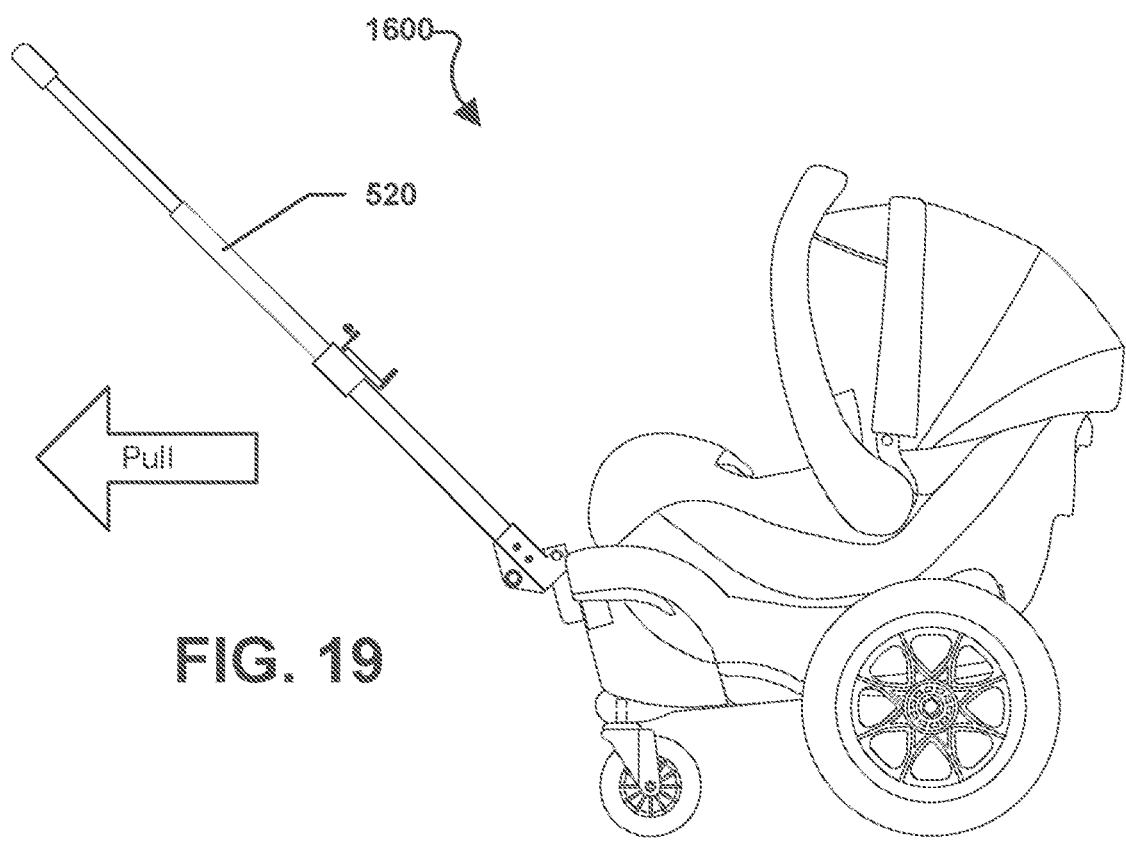
Figure 20:
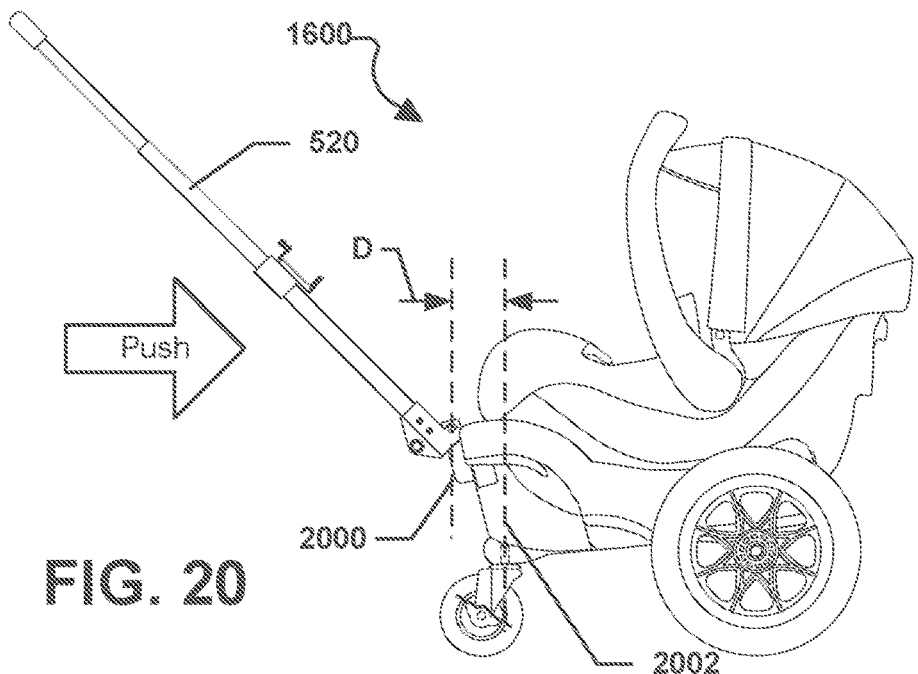
Figure 21:
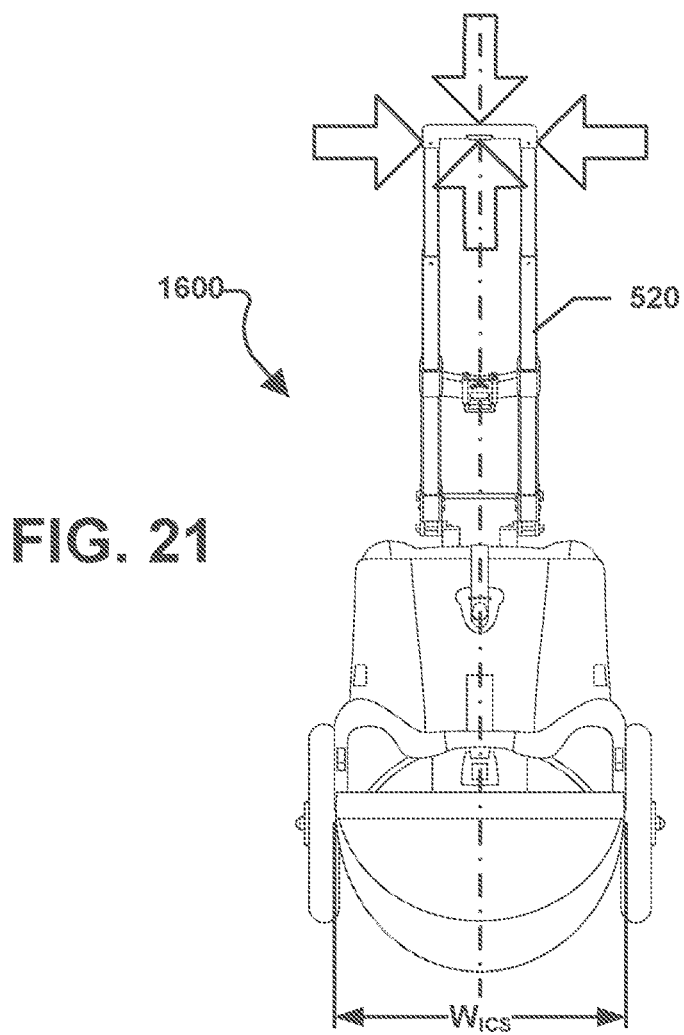
FIG. 21 includes a top plan view of a car seat carrier and a car seat in accordance with an embodiment.

FIG. 19 through 21 illustrates the infant car seat carrier assembly 1600 with the pivoting/telescoping handle 520 in the front push/pull position. As shown in FIG. 19 and FIG. 21, with the pivoting/telescoping handle 520 in the front push/pull position, a user can easily, with one hand on the upper handgrip 640, pull the infant car seat carrier assembly 1600 behind him or her while walking face forward, i.e., away from the infant car seat carrier assembly 1600. Further, as shown in FIG. 20 and FIG. 21, with the pivoting/telescoping handle 520 in the front push/pull position, a user can easily, with one on the upper handgrip 640, push the car seat carrier assembly 1600 in front of him or her while walking facing, forward, i.e., toward the infant car seat carrier assembly 1600.

Moreover, as indicated in FIG. 21 the upper handgrip 640 can be centered along a central axis 2100. Further, the front wheel assemblies 210, 220 (not shown in FIG. 21) and the rear wheel assemblies 180, 184 can also be centered on file central axis 2100. As such, when pushing or pulling the car seat carrier 100, the input to the pivoting/telescoping handle 520 is centered with respect to the front wheel assemblies 210, 220 (not shown in FIG. 21) and the rear wheel assemblies 180, 184. In addition, the upper handgrip 640 can be narrower than $T_F$ and $T_R$. A user can provide all the inputs to push, poll, and steer the infant car seat carrier assembly 1600 from the upper handgrip 640. For example, while grasping the upper handgrip 640 with a single hand, the user can push and steer the infant car seat carrier assembly 1600 in front of him or her while facing the infant car seat carrier assembly 1600 with the car seat assembly 1600 facing the user. On the other hand, while grasping the upper handgrip 640 with a single hand, the user can pull and steer the infant car seat carrier assembly 1600 behind him or her while facing away from the infant car seat carrier assembly 1600 with the infant car seat assembly 1600 facing the user. The ability to easily push and pull the infant car seat carrier assembly 1600 provides the user with the ability to push the infant car seat carrier assembly 1600 or pull the infant car seat carrier assembly 1600. It is to be understood that all of the user inputs to the pivoting/telescoping handle 520 are transmitted down the handle to a vertically oriented control axis 2000, or plane, that passes through the handle fasteners 522, 524. This control axis 2000 is spaced a distance, D, from a vertically oriented swivel axis 2002, or vertically oriented swivel plane 2002, that passes through the threaded stems 212, 222 of the front wheel assemblies 210, 220 about which the front wheel assemblies 210, 220 can rotate. In a particular aspect, D can be less than or equal to 6 inches. Further, D can be less than or equal to 5.5 inches, such as less than or equal to 5.0 inches, less than or equal to 4.5 inches, less than or equal to 4.0 inches, less than or equal to 4.5 inches, or less than or equal to 3.0 inches. Further, D can be greater than or equal to 0.5 inches, such as greater than or equal to 1.0 inches, greater than or equal to 1.5 inches, greater than or equal to 2.0 inches, or greater than or equal to 2.5 inches. It is to be understood that D can be within a range between, and including, any of the maximum and minimum values of D described herein.

FIG. 21 also indicates that the infant car seat 1500 can have an overall width, $W_{ICS}$, that is measured through the widest point of the infant car seat 1500. In a particular aspect, $W_{ICS}$ can be less than or equal to 20 inches. Further, $W_{ICS}$ can be less than or equal to 19.5 inches, such as less than or equal to 19.0 inches, less than or equal to 18.5 inches, less than or equal to 18.0 inches, or less than or equal to 17.5 inches. In another aspect, $W_{ICS}$ can be greater than or equal to 15.0 inches. Moreover, $W_{ICS}$ can be greater than or equal to 15.5 inches, such as greater than or equal to 16.0 inches, greater than or equal to 16.5 inches, or greater than or equal to 17.0 inches. Further, $W_{ICS}$ can be within a range between, and including, any of the maximum and minimum values of $W_{ICS}$ described herein.

In another aspect, a ratio of $W_O$ to $W_{ICS}$, $W_O/W_{ICS}$ can be less than or equal to 1.4. Further, $W_O/W_{ICS}$ can be less than or equal to 1.35, such as less than or equal to 1.30, less than or equal to 1.25 less than or equal to 1.20, or less than or equal to 1.15. In yet another aspect, $W_O/W_{ICS}$ can be greater than or equal to 0.70. Moreover, $W_O/W_{ICS}$ can be greater than or equal to 0.75, such as greater than or equal to 0.80, greater than or equal to 0.85, greater than or equal to 0.90, greater than or equal to 0.95, greater than or equal to 1.00, greater than or equal to 1.05, or greater than or equal to 1.10. In yet another aspect, $W_O/W_{ICS}$ can be within a range between and including, any of the maximum and minimum values of $W_O/W_{ICS}$ described herein.

In another aspect, a ratio of $T_P$ to $W_{ICS}$, $T_P/W_{ICS}$ can be less than or equal to 0.65. Further, $T_P/W_{ICS}$ can be less than or equal to 0.60, such as less than or equal to 0.55, less than or equal to 0.50, or less than or equal to 0.45. In another aspect, $T_P/W_{ICS}$ can be greater than or equal to 0.25. Moreover, $T_P/W_{ICS}$ can be greater than or equal to 0.30, such as greater than or equal to 0.35, or greater than or equal to 0.40. In still another aspect $T_P/W_{ICS}$ can be within a range between, and including, any of the maximum or minimum values of $T_P/W_{ICS}$ described herein.

In yet anther aspect, a ratio of $T_R$ to $W_{ICS}$, $T_R/W_{ICS}$ can be less than or equal to 1.25. Further, $T_P/W_{ICS}$ can be less than or equal to 1.20, such as less than or equal to 1.15 less than or equal to 1.10, less than or equal to 1.05, or less than or equal to 1.00. In another aspect, $T_R/W_{ICS}$ can be greater than or equal to 0.75. Moreover, $T_R/W_{ICS}$ can be greater than or equal to 0.80, such as greater than or equal to 0.85, greater than or equal to 0.90, or greater than or equal to 0.95. In still another aspect, $T_R/W_{ICS}$ can be within a range between, and including, any of the maximum or minimum values of $T_R/W_{ICS}$ described herein.

FIG. 22 further indicates that the pivoting/telescoping handle 520 can be further moved to a rear push position. In the rear push position, the pivoting/telescoping handle 520 can be rotated toward the rear end 108 of the car seat wagon 100, e.g., until the pivoting/telescoping handle 520 is adjacent to, or in contact with, a position of the infant car seat 1500. Specifically, the pivoting/telescoping handle 520 will be rotated to that the pivoting/telescoping handle 520 is behind the axis that extends vertically through the handle fasteners 522, 524 about which the pivoting/telescoping handle 520 pivots or rotates. Further, the pivoting/telescoping handle 520 can form an angle $A_{RP}$, with respect to the axis that extends vertically through the handle fasteners 522, 524. Moreover, in the rear push position the upper handgrip 640 is behind the axis that extends vertically through the handle fasteners 522, 524 and the upper handgrip 640 is directly above the carrier body 102.

In a particular aspect, $A_{RP}$ can be greater or equal to than 10 degrees. Further, $A_{RP}$ can be greater or equal to than 15 degrees, such as greater than or equal to 20 degrees, greater than or equal to 25 degrees, greater than or equal to 30 degrees, or greater than or equal to 35 degrees. In another aspect, $A_{RP}$ can be less than or equal to 65 degrees. Moreover, $A_{RP}$ can be less than or equal to 60 degrees such as less than or equal to 55 degrees, less than or equal to 50 degrees, less than or equal to 45 degrees or less than or equal to 40 degrees. In yet another aspect, $A_{RP}$ can be within a range between, and including, any of the minimum and maximum values of $A_{RP}$ described herein.

With the pivoting/telescoping handle 520 in the rear push position, illustrated in FIG. 22 a user can grasp the upper handgrip 640 with one hand and push the infant car seat carrier assembly 1600 in the direction as indicated by arrow 2200, i.e., forward with the infant car seat 1500 facing in the same direction as the user is walking. The user can walk behind the infant car seat carrier assembly 1600 as he or she pushes the infant car seat carrier assembly 1600 by the pivoting/telescoping handle 520. Alternately, the user can walk beside the infant car seat carrier assembly 1600 as he or she pushes the infant car seat carrier assembly 1600 by the pivoting/telescoping handle 520.

Accordingly, as shown in the various figures, the pivoting/telescoping handle 520 of the car seat carrier 100 can be rotated around the handle fasteners 522, 524 to one of many different positions relative to the carrier body 102. Specifically for storing the car seat carrier 100, the pivoting/telescoping handle 520 can be rotated to the first stowage position or the second stowage position. To push the car seat carrier 100 with the infant car seat 1500 facing the user, the pivoting/telescoping handle 520 can be rotated to the front push/pull position. Further to pull the car seat carrier 100 with the infant car seat 1500 facing the user, the pivoting/telescoping handle 520 can be also be rotated to the front push/pull position. To push the car seat carrier 100 with the infant car seat 1500 facing away front the user, the pivoting/telescoping handle 520 can be rotated to the rear push position. Further to provide entertainment, or white noise, to an infant within the infant car seat 1500, the pivoting/telescoping handle 520 can be rotated to the broadcast position and the smartphone 1800 can be placed within the smartphone bracket 700.

Referring now to FIG. 23, with the pivoting/telescoping handle 520 in a vertical position, the car seat carrier 100 can have a footprint, $FP_{CSC}$, that includes all parts of the car seat carrier 100 as indicated by the cross-hatched area of FIG. 23. In a particular aspect, $FP_{CSC}$ can be greater than or equal to 300 in$^2$. Further $FP_{CSC}$ can be greater than or equal to 305 in$^2$, such as greater than or equal to 310 in$^2$, greater than or equal to 315 in$^2$, greater than or equal to 320 in$^2$, greater than or equal to 325 in$^2$, greater than or equal to 330 in$^2$, greater than or equal to 335 in$^2$, greater than or equal to 340 in$^2$, or greater than or equal to 345 in$^2$. In another aspect, $FP_{CSC}$ can be less than or equal to 400 in$^2$. Moreover. $FP_{CSC}$ can be less than or equal to 395 in$^2$, such as less than or equal to 390 in$^2$, less than or equal to 385 in$^2$, less than or equal to 380 in$^2$, less than or equal to 385 in$^2$, less than or equal to 380 in$^2$, less than or equal to 375 in$^2$, less than or equal to 370 in$^2$, less than or equal to 365 in$^2$, less than or equal to 360 in$^2$, less than or equal to 355 in$^2$, or less than or equal to 350 in$^2$. In another aspect, $FP_{CSC}$ can be within a range between, and including, any of the minimum and maximum values of $FP_{CSC}$ described herein.

FIG. 24 shows that the infant car seat 1500 can also have a footprint, $FP_{ICS}$, as indicated by the cross-hatched area of FIG. 24. It is to be understood that the footprint of the infant car seat 1500, as shown, is the footprint of the infant car seat 1500 with the handle 1504 in the upright position and the canopy 1506 fully raised, as shown in side plan view in FIG. 16.

In a particular aspect, $FP_{ICS}$ can be greater than or equal to 300 in$^2$. Further, $FP_{ICS}$ can be greater than or equal to 305 in$^2$, such as greater than or equal to 310 in$^2$, greater than or equal to 315 in$^2$, greater than or equal to 320 in$^2$, greater than or equal to 325 in$^2$, greater than or equal to 330 in$^2$, greater than or equal to 335 in², greater than or equal to 340 in², greater than or equal to 345 in², greater than or equal to 350 in², or greater than or equal to 355 in². In another aspect, $FP_{ICS}$ can be less than or equal to 400 in². Moreover, $FP_{ICS}$ can be less than or equal to 395 in², such as less than or equal to 390 in², less than or equal to 385 in², less than or equal to 380 in², less than or equal to 375 in², less than or equal to 370 in², less than or equal to 375 in², or less than or equal to 365 in². In another aspect, $FP_{ICS}$ can be within a range between, and including, any of the minimum and maximum values of $FP_{ICS}$ described herein.

In a particular aspect, $FP_{CSC}$ is nearly equal to $FP_{ICS}$. Further, a ratio of $FP_{CSC}$ to $FP_{ICS}$, $FP_{CSC}/FP_{ICS}$, can be greater than or equal to 0.75. Further, $FP_{CSC}/FP_{ICS}$ can be greater than or equal to 0.80, such as greater than, or equal to 0.85 greater than or equal to 0.90 greater than or equal to 0.95, greater than or equal to 0.96, greater than or equal to 0.97, greater than or equal to 0.98, greater than or equal to 0.99, greater than or equal to 1.00, or greater than or equal to 1.01. In another aspect, $FP_{CSC}/FP_{ICS}$ can be less than or equal to 1.25. Moreover, $FP_{CSC}/FP_{ICS}$ can be less than or equal to 1.20, such as less than or equal to 1.15, less than or equal to 1.10, less than or equal to 1.09, less than or equal to 1.08, less than or equal to 1.07, less than or equal to 1.06, less than or equal to 1.05, less than or equal to 1.04, less than or equal to 1.03, or less than or equal to 1.02. In another particular aspect, $FP_{CSC}/FP_{ICS}$ can be within a range between, or including, any of the minimum or maximum values of $FP_{CSC}/FP_{ICS}$ described herein.

FIG. 24 also shows that the footprint of the infant car seat 1500 overlies a majority of the footprint of the car seat wagon 100. As indicated by the dashed lines, the infant car seat 1500 overlies at least 75% of $FP_{CSC}$ of the car sett carrier 100. Further, the infant car seat 1500 can overlie at least 76% of $FP_{CSC}$, such as at least 77% of $FP_{CSC}$, at least 78% of $FP_{CSC}$, at least 79% of $FP_{CSC}$, at least 80% of $FP_{CSC}$, at least 81% of $FP_{CSC}$, at least 82% of $FP_{CSC}$, at least 83% of $FP_{CSC}$, at least 84% of $FP_{CSC}$, at least 85% of $FP_{CSC}$, or at least 86% of $FP_{CSC}$. In another aspect, the infant car seat 1500 can overlie less than 100% of $FP_{CSC}$. Moreover, the infant car seat 1500 can overlie less; than 99% of $FP_{CSC}$, such as less than 98% $FP_{CSC}$, less than 97% $FP_{CSC}$, less than 96% $FP_{CSC}$, less than 95% $FP_{CSC}$, less than 94% $FP_{CSC}$, less than 93% $FP_{CSC}$, less than 92% $FP_{CSC}$, less than 91% $FP_{CSC}$, less than 90% $FP_{CSC}$, less than 89% $FP_{CSC}$, less than 88% $FP_{CSC}$, or less than 87% $FP_{CSC}$. In another aspect, the % of overlie of the infant car seat 1500 relative to the car seat wagon 100 can be within a range between, and including, any of the % values of overlie described herein.

FIG. 23 through FIG. 38 illustrate a car seat carrier that is generally designated 2500. As shown, the car seat carrier 2500 can include a carrier body 2502. The carrier body 2502 can be sized and shaped to receive and lockably engage a complementary shaped infant car seat, as described in detail below.

In particular, the carrier body 2502 can include a molded shell that can be substantially symmetrical about a central longitudinal axis 2504. In one aspect, the carrier body 2502 can be a one-piece molded shell. The carrier body 2502 may be molded from a polymer material. In particular, the carrier body 2502 may be made from a lightweight, durable plastic material. For example, the carrier body 2502 may be made from polypropylene, such as impact grade polypropylene or impact copolymer polypropylene. In another aspect, the carrier body 2502 may be made from nylon. In still another aspect, the carrier body 2502 may be made from a metal or a metal alloy. For example, the carrier body 2502 may be stamped from sheet steel or aluminum.

In a particular aspect, the entire car seat carrier 2500 can have a weight, $W_{CSC}$, and $W_{CSC}$ can be less than or equal to 20 pounds. Further $W_{CSC}$ can be less than or equal to 19 pounds, such as less than or equal to 18 pounds, less than or equal to 17 pounds, less than or equal to 16 pounds, less than or equal to 15 pounds, or less than or equal to 14 pounds. In another aspect, $W_{CSC}$ can be greater than or equal to 8 pounds. Moreover, $W_{CSC}$ can be greater than or equal to 9 pounds such as greater than or equal to 10 pounds, greater than or equal to 11 pounds, greater than or equal to 12 pounds, or greater than or equal to 15 pounds. In yet another aspect, $W_{CSC}$ can be within a range between and including, any of the maximum and minimum values of $W_{CSC}$ described herein. The relatively light weight of the car seat carrier 2500 makes it easy to lift up the car seat carrier 2500 and place the car seat carrier 2500 in a vehicle.

As illustrated, the carrier body 2502 can include a front end 2506 and a rear end 2508. A first outer side wall 2510 can extend between the front end 2506 and the rear end 2508 of the carrier body 2502. Also, a second outer side wall 2512 can extend between the front end 2506 and the rear end 2508 of the carrier body 2502 opposite the first outer side wall 2510 across the longitudinal axis 2504.

Figure 27:
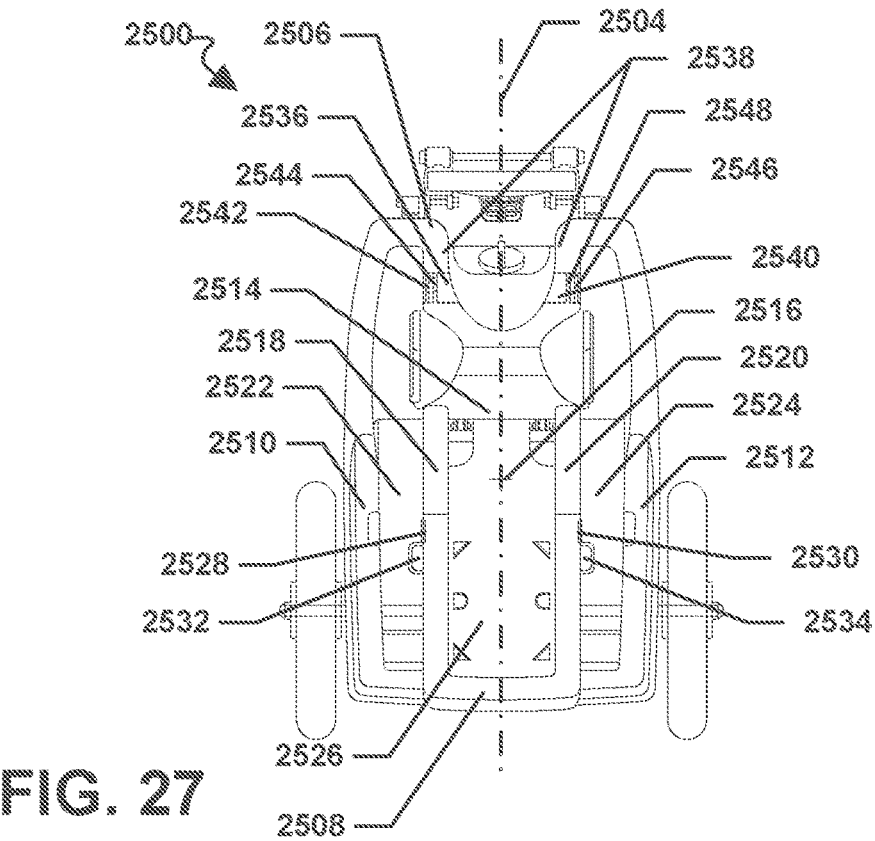
FIG. 27 and FIG. 28 include top and bottom plan views of a car seat carrier in accordance with an embodiment.

As shown in FIG. 27, the carrier body 2502 can further include a transverse wall 2514 that can extend between the first outer side wall 2510 and the second outer side wall 2512 at a location between a midpoint 2516 of the carrier body 2502 and the front end 2506 of the carrier body 2502. The transverse wall 2514 can be substantially perpendicular to the longitudinal axis 2504 of the carrier body 2502. The carrier body 2502 can also include a first inner side wall 2518 that can extend from the rear end 2508 of the carrier body 2502 to the turns verse wall 2514. Moreover, the earner body 2502 can include a second inner side w all 2520 that can also extend from the rear end of the carrier body 2502 to the transverse wall 2514 opposite the first inner side wall 2518 across the longitudinal axis 2504.

FIG. 27 indicates that the carrier body 2502 can include a first cavity 2522 formed between the first inner side wall 2518 and the first outer side wall 2510 and a second cavity 2524 formed between the second inner side, wall 2520 and the second outer side wall 2512, she first cavity 2522 and the second cavity 2524 can extend from the rear end 2508 of the carrier body 2502 to the transverse wall 2514 of the carrier body 2502. A curved platform 2526 can extend between the first inner side wall 2518 and the second inner side wall 2520 and between the rear end 2508 of the carrier body 2502 and the transverse wall 2514. In a particular aspect, the first cavity 2522, the second cavity 2524, and the curved platform 2526 are configured to receive and lockably engage a complementary shaped infant car seat, as shown in greater detail in FIG. 40.

Figure 39:
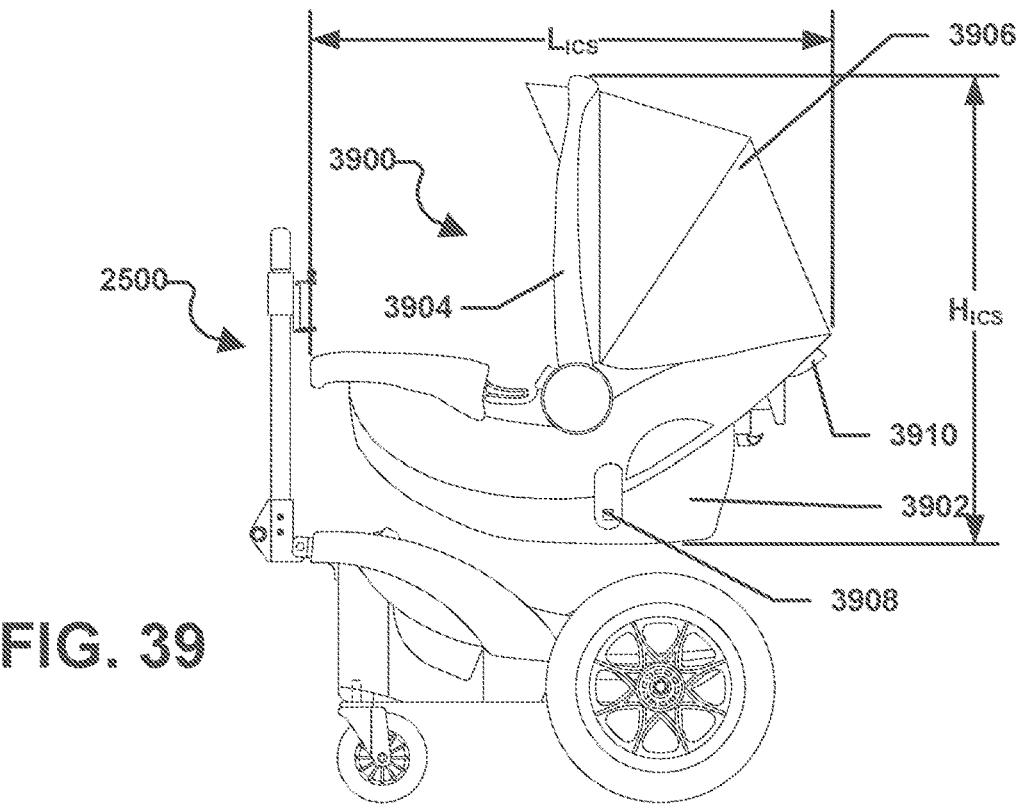
FIG. 39 through FIG. 44 include left side plan views of a car seat carrier and a car seat in accordance with an embodiment.

As illustrated in FIG. 27, the carrier body 102 can further include a first rear locking notch 2528 formed in the first inner side wall 2518 adjacent to the first cavity 2522. Moreover, the carrier body 2502 can include a second rear locking notch 2530 formed us the second inner side wall 2520 adjacent to the second cavity 2524. The rear locking notches 2528, 2530 are configured to receive retractable securing projections on an infant car seat, as illustrated in FIG. 39.

The carrier body 2502 can further include a first rear guide 2532 that can extend from the first inner side wall 2518 into the first cavity 2522 adjacent to the first rear locking notch 2528. The carrier body 102 can also include a second rear guide 2534 that can extend from the second inner side wall 2520 into the second cavity 2524 adjacent to the second rear locking notch 2530. The second rear guide 2534 is opposite the first rear guide 2532 across the longitudinal axis 2504. A first front locking notch 2536 may be formed in an upper surface 2538 of the carrier body 2503 near the front end 2506 of the carrier body 2502. A second front locking notch 2540 may be formed in the upper surface 2538 of the carrier body 2502 near the front end 2506 of the carrier body 2502 opposite the first from, locking notch 2536.

FIG. 27 further shows that a first hook 2542 can extend into the first front locking notch 2536 from inside the carrier body 2502 through a slot formed in the first front locking notch 2536. A first front looking rod guide 2544 can span the first front locking notch 2536 adjacent to the first hook 2542. The first front locking rod guide 2544 can be substantially parallel to the first hook 2542. In a particular aspect, the first hook 2542 may extend into the first front locking notch 2536 so that the head of the first hook 2542 faces the front end 2506 of the carrier body 2502. A second hook 2546 can extend into the second front locking notch 2540 from inside the carrier body 2562 through a slot formed in the second front locking notch 2540. A second front locking rod guide 2548 can span the second front locking notch 2540 adjacent to the second hook 2516. The second front locking rod guide 2548 can be substantially parallel to the second hook 2546. In a particular aspect, the second hook 2546 may extend into the second front locking notch 2540 so that the head of the second hook 2546 faces the front end 2506 of the carrier body 2502.

The first hook 2538, the first front locking rod guide 2544, the second hook 2546, and the second front locking rod guide 2548 on the carrier body 2502 of the car seat carrier 2500 are configured to engage attachment points, e.g., a rod on the underside of an infant car seat. Accordingly the first hook 2538, the second hook 2546, the first front locking rod guide 2544, the second front locking rod guide 2548, the first rear locking notch 2528, the second rear locking notch 2530, the first rear guide 2532, and the second rear guide 2534 can work in concert to engage and lock an infant car seat to the car seat carrier 100, as shown in FIG. 40 through FIG. 46.

Figure 28:
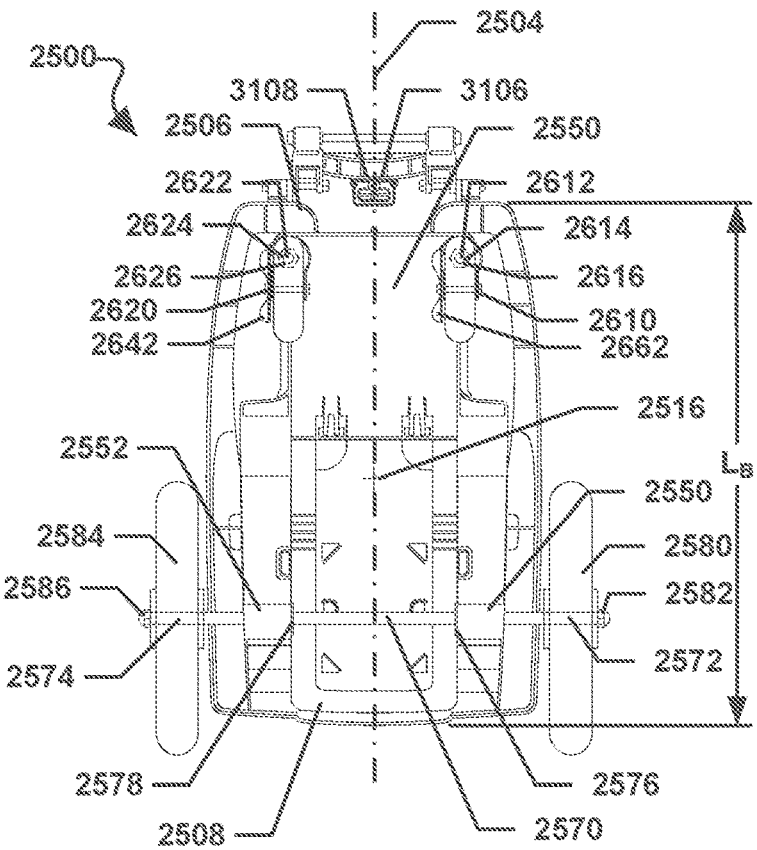

Referring now to FIG. 28, the underside of the carrier body 2502 is illustrated. As shown, the car seat carrier 2500 can further include a bottom plate 2550 that can cover and enclose a portion of the underside of the carrier body 2502 of the car seat carrier 2500. Specifically, the bottom plate 2550 can cover the underside of the carrier body 2502 between the midpoint 2516 and the front end 2506 of the carrier body 2502. FIG. 28 also indicates that the carrier body 102 of the car seat carrier 2500 can include a first rear axle support frame 2552 that is formed by a portion of the first outer side wall 2510 and a portion of the first inner side wall 2518. The interior of the first rear axle support frame 2552 can establish at least a portion of the first cavity 2522. The carrier body 2502 of the car seat carrier 2500 can also include a second rear axle support frame 2554 that is formed by a portion of the second outer side wall 2512 and a portion of the second inner side w all 2520. The interior of the second rear axle support frame 2554 can establish at least a portion of the second cavity 2524.

FIG. 28 further indicates that the walls of the first rear axle support frame 2552 can be formed with a first transverse bore (not shown) and a second transverse bore (not shown). Additionally, the walls of the second rear axle support frame 2554 can also be formed with a first transverse bore (not shown) and a second transverse bore (not shown). The transverse bores can be formed in the rear axle support frames 2552, 2554 perpendicular to the longitudinal axis 2504 near the rear cod 2508 of the carrier body 2502 between the midpoint 2516 of me carrier body 2502 and the rear end 2508 of the carrier body 2502.

A fixed, i.e., non-rotating and non-steering, rear axle 2570 can be installed within the rear axle support frames 2552, 2554, e.g., through the transverse axle bores formed therein, so that a first end 2572 of the rear axle 2570 extends beyond the first rear axle support frame 2552 and the outer periphery of the carrier body 2502. Moreover, a second end 2574 of the rear axle 2570 extends beyond the second rear axle support frame 2554 and the outer periphery of the carrier body 2502. In a particular aspect, the rear axle 2570 can be made from a metal or metal alloy. Further, the rear axle 2570 can be made from steel, in another aspect, the rear axle 2570 can be made from aluminum. Moreover, at least a portion of the ends 2572, 2574 of the axle 2570 can be threaded.

In a particular aspect, the rear axle 2570 may engage the bores formed in the rear axle support frames 2552, 2554 in an interference fit. As such, the rear axle 2570 may not rotate within the rear axle support frames 2552, 2554. Further the rear axle 2570 may not translate linearly within the rear axle support frames 2552, 2554, i.e., along a longitudinal axis of the rear axle 2570.

FIG. 28 further indicates that the car seat carrier 2500 can include a first retaining ring clip 2576 fitted into a slot (not shown) machined in the rear axle 2570 adjacent to the first rear axle support frame 2552. Moreover, the car seal carrier 2500 can include a second retaining ring clip 257S fitted into a slot (not shown) machined it; the rear axle 2570 adjacent to the second rear axle support frame 2554. The retaining hug slips 2576, 2578 can further prevent the rear axle 2570 from translating linearly within the rear axle support frames 2552, 2554.

As illustrated, a first rear wheel assembly 2580 may be installed on the first end 2572 of the rear axle 2572 and held in place by a first rear wheel nut 2582. A second rear wheel assembly 2584 may be installed on the second end 2574 of the near axle 2570 and held in place by a second rear wheel nut 2586. Accordingly, the rear wheel assemblies 2580, 2584 can be directly attached to the carrier body 2502. Further, the rear wheel assemblies 2580, 2584 can be considered fixed wheel assemblies, i.e., wheels that rotate about a single axis and do not steer.

Figure 25:
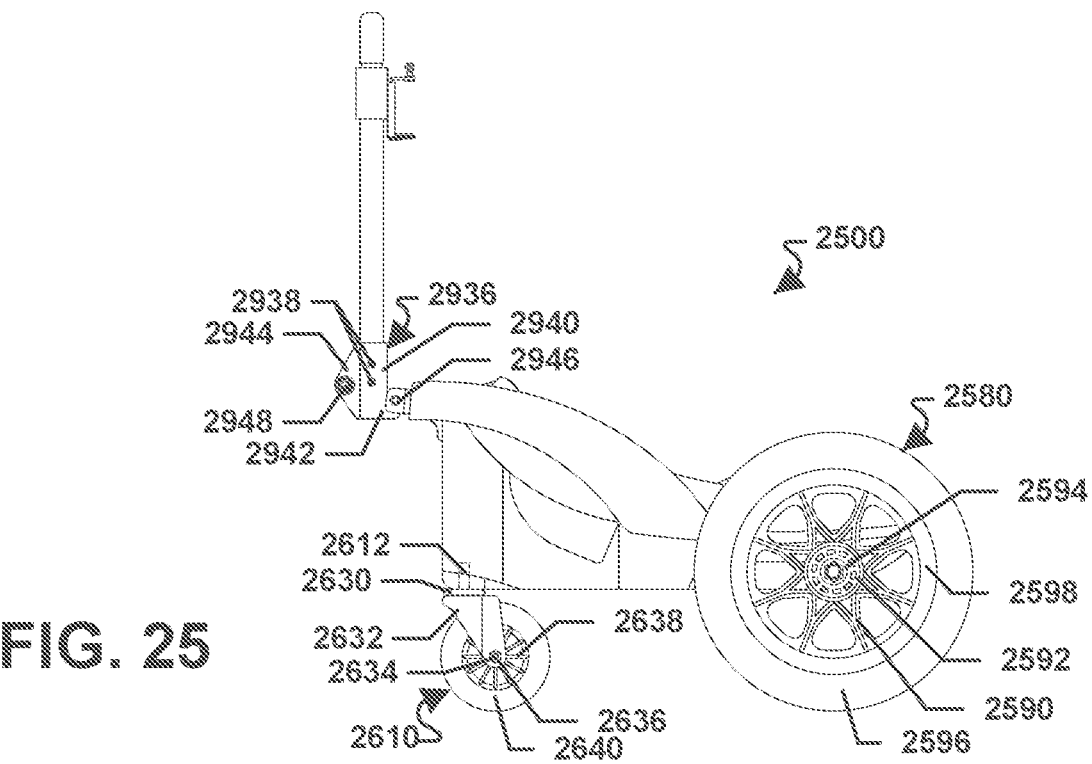
FIG. 25 and FIG. 26 include left and right side plan views of a car seat carrier in accordance with an embodiment.

As illustrated in FIG. 25, the first rear wheel assembly 2580 may include a wheel 2590 having a central hub 2592 in which an outer wheel bearing 2594 and an inner wheel bearing (not shown) are installed. The first rear wheel assembly 2580 may flutter include a the 2596 installed around an outer rim 2598 of the wheel 2580. In a particular aspect, the wheel 2590 may be made from a polymer material. In particular, the wheel 2590 may be made from polypropylene, such as impact grade polypropylene or impact copolymer polypropylene. In another aspect the wheel 2590 may be made from nylon. The tire 2596 may also be made from a polymer material. For example, the tire 2596 may be a solid tire made from a polymer foam material. Further, the tire 196 may polyurethane foam material, e.g., a closed cell polyurethane foam material. In another aspect, the tire 2596 may be made from rubber and filled with air.

Figure 26:
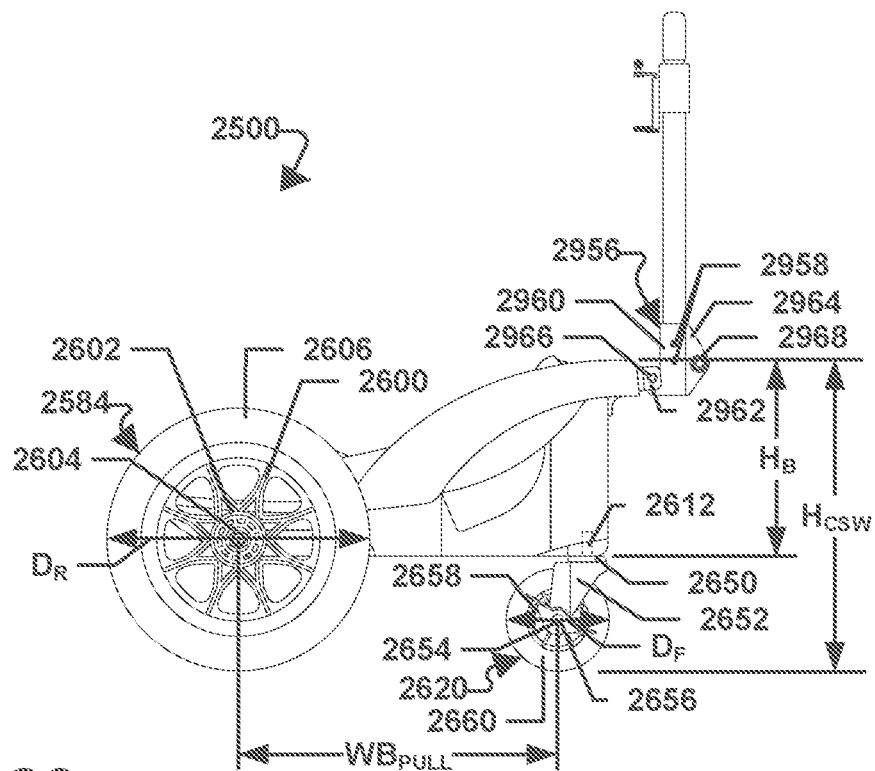

As illustrated in FIG. 26, the second rear wheel assembly 2584 may include a wheel 2600 having a central hub 2602 in which an outer wheel bearing 2604 and an inner wheel bearing (not shown) are installed. The second rear wheel assembly 2584 may further include a tire 2606 installed around an outer rim 2608 of the wheel 2600. In a particular aspect, the wheel 2600 may be made from a polymer material. In particular, the wheel 2600 may be made from polypropylene such as impact grade polypropylene or polypropylene impact copolymer. In another aspect, the wheel 2600 may be made from nylon. The tire 2606 may also be made from a polymer material. For example, the tire 2606 may be a solid tire made from a polymer foam material. Further, the tire 196 may polyurethane foam material, e.g., a closed cell polyurethane foam material, in another aspect, the tire 2606 may be made from rubber and filled with air.

Returning to FIG. 28, the car seat carrier 2500 can further include a first front wheel assembly 2610 installed in the bottom plate 2550 of the carrier body 2502. In particular, the first front wheel assembly 2610 can include a threaded stem 2612 that extends through a bore 2614 formed in the bottom plate 2550 near the from end 2506 of the carrier body 2502. A threaded nut 2616 can engage the threaded stem 2602 and held the first front wheel assembly 2600 firmly in place.

The car seat carrier 2500 can also include a second front wheel assembly 2620 installed in the bottom plate 2550 of the carrier body 2502. In particular, the second front wheel assembly 2620 can include a threaded stem 2622 that can extend through a bore 2624 formed in the bottom plate 2550 near the from end 2506 of the carrier body 2502. A threaded nut 2626 can engage the threaded stem 2622 and hold the second front wheel assembly 2620 firmly in place. The front wheel assemblies 2610, 2620 can be swiveled wheels assemblies, e.g., wheel assemblies that rotate about two axes and provide steering.

FIG. 25 shows that the first front wheel assembly 2610 can include a base plate 2630 from which the threaded stem 2612 can extend up into carrier body 2502 through the bottom plate 2550. A wheel support frame 2632 can be coupled to the base plate 2630 via a bearing assembly and an internal post (not shown). The wheel support frame 2632 can rotate three-hundred and sixty degrees (360°) relative to the base plate 2630 around an axis centered on the threaded stem 2602. Further, the wheel support frame 2672 can rotate around the axis centered on the threaded stem 2602 three-hundred and sixty degrees (360°) relative to the carrier body 2502.

The first front wheel assembly 2610 also includes an axle 2634 mounted in the wheel support frame 2632. The axle 2634 can include an at least partially threaded bolt held in place within the wheel support frame 2632 by a threaded nut 2626. A wheel 2638 can be mounted on the axle 2634 and rotate thereon. Further, a tire 2640 can be mounted on the wheel 2638. In a particular aspect, the wheel 2638 may be made from a polymer material. In particular, the wheel 2638 may be made from polypropylene, such as impact grade polypropylene or impact copolymer polypropylene, in another aspect, the wheel 26381 may be made front nylon. The tire 2640 may also be made from a polymer material. For example, the tire 2640 may be a solid the made from a polymer foam material. Further, the tire 196 may polyurethane foam material, e.g., a closed cell polyurethane foam material. In another aspect, the tire 2640 may be made from rubber and filled with air. In still another aspect, the tire 2640 may be a solid polymer tire, e.g., a solid polyurethane tire or a solid rubber tire. Since the wheel 2638 is mounted on the axle 2634 of the wheel support frame 2632, the wheel 2638 and the tire 2640 may also rotate three-hundred and sixty degrees (360°) relative to the carrier body 2502 with the first front wheel assembly 2610.

FIG. 28 indicates that the first front wheel assembly 2610 may also include a wheel lock 2642 that may be toggled between an "ON" position and an "OFF" position. When the wheel lock 2642 is in the "ON" position, the wheel 2638 and the tire 2640 may not easily rotate within the first front wheel assembly 2610 on the axle 2634. When the wheel lock 2642 is in the "OFF" position, the wheel 2638 and the tire 2640 may freely rotate within the first front wheel assembly 2610 on the axle 2634. Accordingly, a user can lock the wheel 2638 of the first wheel assembly 2610 in order to prevent the car seat carrier 2500 from freely moving relative to a surface on which the car seat carrier 2500 is placed.

FIG. 26 shows that the second front wheel assembly 2620 can include a base plate 2650 from which the threaded stem 2622 can extend up into cannier body 2502 through the bottom plate 2550. A wheel support frame 2652 can be coupled to the base plate 2650 via a bearing assembly and an internal post (not shown). The wheel support frame 2652 can rotate three-hundred and sixty degrees (360°) relative to the base plate 2650 around an axis centered on the threaded stem 2622. Further, the wheel support frame 2652 can rotate around the axis centered on the threaded stem 2622 three-hundred and sixty degrees (360°) relative to the carrier body 2502.

The second from wheel assembly 2020 also includes an axle 2654 mounted in the wheel support frame 2052. The axle 2654 can be an at least partially threaded bolt held in place within the wheel support frame 2652 by a threaded nut 2656. A wheel 2658 can be mounted on the axle 2654 and rotate thereon. Further, a tire 2660 can be mounted on the first front wheel 2653. In a particular aspect, the wheel 2658 may be made from a polymer material. In particular, the wheel 2658 may be made from polypropylene, such as impact grade polypropylene or impact copolymer polypropylene. In another aspect, the wheel 2658 may be made from nylon. The tire 2660 may also be made from a polymer material. For example, the tire 2660 may be a solid tire made from a polymer foam material, further the tire 196 may polyurethane foam material e.g., a closed cell polyurethane foam material. In another aspect, the tire 2660 may be made from rubber and filled with air. In still another aspect, the tire 2660 may be a solid polymer tire. e.g., a solid polyurethane tire or a solid rubber tire. Since the wheel 2658 is mounted on the axle 2654 of the wheel support frame 2652 the wheel 2658 and the tire 2660 may also rotate three-hundred and sixty degrees (360°) relative to the carrier body 2502 with the second front wheel assembly 2620.

FIG. 28 indicates that the second front wheel assembly 2620 may also include a wheel lock 2662 that may be toggled between an "ON" position and an "OFF" position. When the wheel lock 2662 is in the "ON" position, the wheel 2658 and the tire 2660 may not easily rotate within the second front wheel assembly 2620 on the axle 2651. When the wheel lock 2662 is in the "OFF" position, the wheel 2658 and the tire 2660 may freely rotate within the second front wheel assembly 2620 on the axle 2654. Accordingly, a user can lock the wheel 2658 of the second front wheel assembly 2620 in order to prevent the car seat carrier 2500 from freely moving relative to a surface on which the car seat carrier 2500 is placed. It can be appreciated that the wheels 2638, 2658 or both front wheel assemblies 2610, 2620 may be locked at the same time to present the car seat carrier 2500 from rolling on a surface.

It can be appreciated that the front wheels 2638, 2658 and front tires 2640, 2660 can swivel around the stems 2612, 2622 in unison with each other but also independent from each other. Further, the front wheels 2638, 2658 and front tires 2640, 2660 can swivel around the stems 2612, 2622 in response to steering inputs provided to the front 2506 of the carrier body 2502 via handle affixed thereto, as described in detail below. However, the front wheels assemblies 2610, 2620 are not directly connected to the handle.

Figure 37:
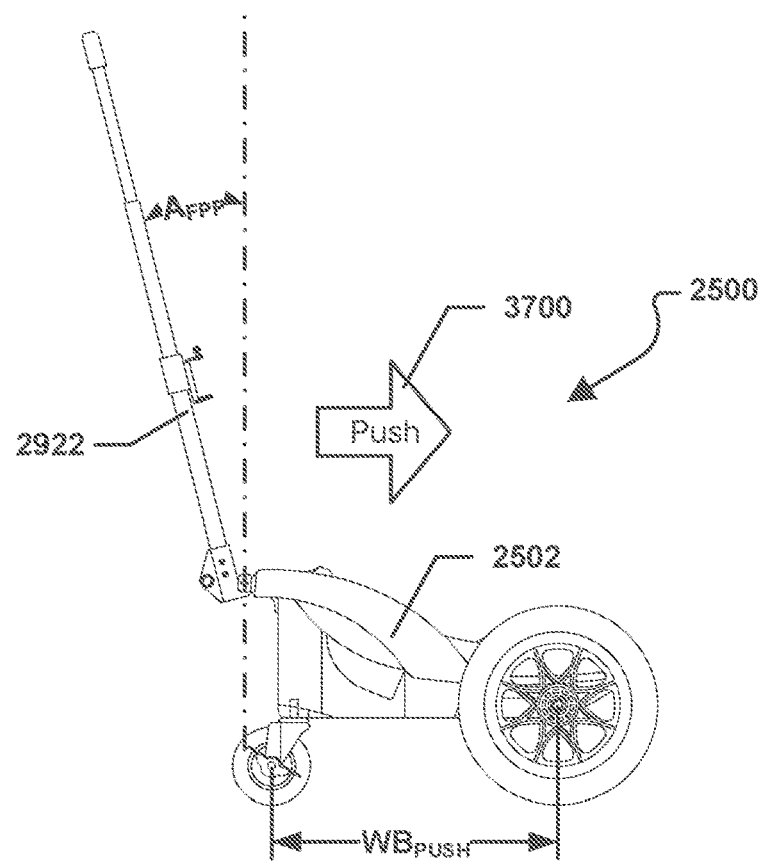

As shown in FIG. 26, the rear wheel assemblies 2580, 2584 can have a diameter, $D_R$. The front wheel assemblies 2610, 2620 can have a diameter, $D_F$. Further, the car seat carrier 2500 can have a first wheelbase when it is polled. $WB_{PULL}$, and a second wheelbase when it is pushed, $WB_{PUSH}$, as illustrated in FIG. 37. $WB_{PULL}$ can be measured from the center of the rear wheel assemblies 2580, 2584 to the center of the 2634, 2654 of the of the front wheel assemblies 2610, 2620 when the front wheel assemblies 2610, 2620 are in position for the car seat carrier 2500 to be pulled by a user, as shown in FIG. 26. $WB_{PUSH}$ can be measured from the center of the rear wheel assemblies 2580, 2584 to the center of the axles 2634, 2654 of the of the front wheel assemblies 2610, 2620 when the front wheel assemblies 2610, 2620 are in position for the car seat carrier 2500 to be pushed by a user as shown in FIG. 57.

In a particular aspect, $D_R$ can be greater than or equal to 5.5 inches. Further, $D_R$ may be greater than or equal to 4.0 inches, such as greater than or equal to 4.5 inches, greater than or equal to 5.0 inches, greater than or equal to 5.5 inches, greater than or equal to 6.0 inches, greater than or equal to 6.5 inches, greater than or equal to 7.0 inches, greater than or equal to 7.5 inches, greater than or equal to 8.0 inches, greater than or equal to 8.5 inches, greater than or equal to 9.0 inches, greater than or equal to 9.5 inches, greater than or equal to 10.0 inches, greater than or equal to 10.5 inches, greater than or equal to 11.0 inches, or greater than or equal to 11.50 inches. In another aspect, $D_R$, may be less than or equal to 17.00 inches. Further, $D_R$, may be less than or equal to 16.5 inches, such as less than or equal to 16.0 inches, less than or equal to 15.5 inches, less than or equal to 15.0 inches, less than or equal to 14.5 inches, less than or equal to 14.0 inches, less than or equal to n 13.5 inches less than or equal to 13.0 inches, less than or equal to 12.5 inches, or less than or equal to 12.0 inches. In another aspect, $D_R$ may be within a range between an including, any of the minimum and maximum values of $D_R$ detailed above.

In a particular aspect, $D_F$ can be greater than or equal to 1.0 inches. Further, $D_F$ may be greater than or equal to 1.5 inches, such as greater than or equal to 2.0 inches, greater than or equal to 2.5 inches, greater than or equal to 5.0 inches, greater than or equal to 3.5 inches, greater than or equal to 4.0 inches, greater than or equal to 4.50 inches. In another aspect, $D_F$ may be less than or equal to 8.00 inches. Further, $D_R$, may be less than or equal to 7.5 inches, such as less than or equal to 7.0 inches, less than or equal to 6.5 inches, less than or equal to 6.0 inches, less than or equal to 5.5 inches, or less than or equal to 5.0 inches. In another aspect, $D_F$ may be within a range between and including, any of the minimum and maximum values of $D_F$ detailed above.

In another aspect, $D_F$ can be less than $D_R$. Further, the ratio of $D_F$ to $D_R$, $D_F/D_R$, can be greater than or equal to 0.20. Further, $D_F/D_R$ can be greater than or equal to 0.250, such as greater than or equal to 0.275, greater than or equal to 0.300, greater than or equal to 0.325, greater than or equal to 0.350, or greater than or equal to 0.375. In still another aspect, $D_F/D_R$ can be less than or equal to 0.500. Moreover, $D_F/D_R$ less than or equal to 0.475 less than or equal to 0.450, less than or equal to 0.425, or less than or equal to 0.400. In another aspect, the values of $D_F/D_R$ can be within a range between, and including, any of the minimum or maximum values of $D_F/D_R$, described above.

In a particular aspect, $D_F$ can be greater than or equal to 1.0 inches. Further $D_F$ may be greater than or equal to 1.5 inches, such as greater than or equal to 2.0 inches, greater than or equal to 2.5 inches, greater than or equal to 3.0 inches, greater than or equal to 3.5 inches, greater than or equal to 4.0 inches, greater than or equal to 4.50 inches. In another aspect, $D_F$, may be less than or equal to 8.00 inches. Further, $D_R$, may be less than or equal to 7.5 inches, such as less than or equal to 7.0 inches, less than or equal to 6.5 inches, less than or equal to 6.0 inches, less than or equal to 5.5 inches, or less than or equal to 5.0 inches. In another aspect, $D_F$ may be within a range between, and including, any of the minimum and maximum values of $D_F$ detailed above.

In another aspect, $D_F$ can be less than $D_R$. Further, the ratio of $D_F$ to $D_R$, $D_F/D_R$, can be greater than or equal to 0.20. Further, $D_F/D_R$ can be greater than or equal to 0.250, such as greater than or equal to 0.275, greater than or equal to 0.300, greater than or equal to 0.325, greater than or equal to 0.350, or greater than or equal to 0.375. In still another aspect, $D_F/D_R$ can be less than or equal to 0.500. Moreover, $D_F/D_R$ less than or equal to 0.475, less than or equal to 0.450, less than or equal to 0.425, or less than or equal to 0.400. In another aspect, the values of $D_F/D_R$ can be within a range between, and including, any of the minimum or maximum values of $D_F/D_R$, described above.

In still another aspect, $WB_{PULL}$, may be greater than or equal to 10.0 inches. Moreover, $WB_{PULL}$ may be greater than or equal to 10.5 inches, such as greater than or equal to 11.0 inches, greater than or equal to 11.5 inches, greater than or equal to 12.0 inches, greater than or equal to 12.5 inches, greater than or equal to 13.0 inches, greater than or equal to 13.5 inches, or greater than or equal to 14.0 inches. In another aspect, $WB_{PULL}$, may be less than or equal to 19.0 inches. Further, $WB_{PULL}$ may be less than or equal to 18.5 inches, such as less than or equal to 18.0 inches, less than or equal to 17.5 inches, less than or equal to 17.0 inches, less than or equal to 16.5 inches, less than or equal to 16.0 inches, less than or equal to 15.5 inches, less than or equal to 15.0 inches, or less than or equal to 14.5 inches. In yet another aspect, $WB_{PULL}$ may be within a range between, and including, any of the minimum and maximum values of $WB_{PULL}$ detailed herein.

In still another aspect, $WB_{PUSH}$, may be greater than or equal to 12.5 inches. Moreover, $WB_{PUSH}$ may be greater than or equal to 13.0 inches, such as greater than or equal to 13.5 inches, greater than or equal to 14.0 inches, greater than or equal to 14.5 inches greater than or equal to 15.0 inches, greater than or equal to 15.5 inches, greater than or equal to 16.0 inches, greater than or equal to 16.5 inches. In another aspect, $WB_{PULL}$, may be less than, or equal to 21.5 inches. Further, $WB_{PULL}$ may be less than or equal to 21.0 inches, such as less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, or less than or equal to 17.0 inches. In yet another aspect, $WB_{PUSH}$ may be within a range between, and including, any of the minimum and maximum values of $WB_{PUSH}$ detailed herein.

Returning to FIG. 26, the carrier body 2502 of the car seat carrier 2500 can include a carrier body height, $H_{CB}$, measured between the lowest part of the carrier body 2502 and the highest part of the carrier body 2502. It is to be understood that $H_{CB}$ does not include the wheel assemblies 2580, 2584, 2610, 2620 and the pivoting/telescoping handle, described in detail below. Further as shown in FIG. 26, the carrier body 2502 of the car seat carrier 2500 can include an overall carrier body height, $H_{OCB}$, measured from a surface on which the car seat carrier 2500 is placed to the highest part of the carrier body 2502, not including the pivoting/telescoping handle described in detail below.

In a particular aspect, $H_{CB}$, may be greater than or equal to 7.00 inches. Moreover, $H_{CB}$ may be greater than or equal to 7.25 inches, such as greater than or equal to 7.50 inches, greater than or equal to 7.75 inches, greater than or equal to 8.00 inches, greater than or equal to 8.25 inches, greater than or equal to 8.50 inches, or greater than or equal 8.75 inches. In another aspect, $H_{CB}$, may be less than or equal to 10.00 inches. Further, $H_{CB}$ may be less than or equal to 9.75 inches, such as less than or equal to 9.50 inches, less than or equal to 9.25 inches, or less than or equal to 9.00 inches. In yet another aspect, $H_{CB}$ may be within a range between, and including, any of the minimum and maximum values of $H_{CB}$ detailed herein.

In another aspect $H_{OCB}$, may be greater than or equal to 9.0 inches. Moreover, $H_{OCB}$ may be greater than or equal to 9.5 inches, such as greater than or equal to 10.0 inches, greater than or equal to 10.5 inches, greater than or equal to 11.0 inches, greater than or equal to 11.5 inches, greater than or equal to 12.0 inches greater than or equal to 12.5 inches, or greater than equal to 13.0 inches. In another aspect, $H_{OCB}$, may be less than or equal to 17.0 inches. Further, $H_{OCB}$ may be less than or equal to 16.5 inches, such as less than or equal to 16.0 inches, less than or equal to 15.5 inches, less than or equal to 15.0 inches, less than or equal to 14.5 inches, less than or equal to 14.0 inches, or less than or equal to 13.5 inches. In yet another aspect, $H_{OCB}$ may be within a range between and including any of the minimum and maximum values of $H_{OCB}$ detailed herein.

In a particular aspect, a ratio of $D_R$ to $H_{CB}$, $D_R/H_{CB}$ can be greater than or equal to 0.65. Additionally. $D_R/H_{CB}$ can be greater than or equal to 0.70, such as greater than or equal to 0.75, greater than or equal to 0.80, greater than or equal to 0.85, greater than or equal to 0.90, greater than or equal to 0.95, greater than or equal to 1.00, greater than or equal to 1.10 greater than or equal to 1.15, greater than or equal to 1.20 greater than or equal to 1.25, or greater than or equal to 1.30. In another aspect, $D_R/H_{CB}$ can be less than or equal to 2.00. Moreover, can be less than or equal to 1.95, such as lens than or equal to 1.90, less than or equal to 1.85, less than or equal to 1.90, less than or equal to 1.75, less than or equal to 1.79, less than or equal to 1.65, less than or equal to 1.60, less than or equal to 1.55, less than or equal to 1.50, less than or equal to 1.45, less than or equal to 1.40, less than or equal to 1.35. Further, $D_R/H_{CB}$ can be within a range between, and including, any of the minimum and maximum values of $D_R/H_{CB}$ described herein.

In another aspect, a ratio of $D_F$ to $H_{CB}$, $D_F/H_{CB}$ can be greater than or equal to 0.10. Additionally, $D_F/H_{CB}$ can be greater than or equal to 0.15, such as greater than or equal to 0.20, greater than or equal to 0.25, greater than or equal to 0.30, greater than or equal to 0.35, greater than or equal to 0.40, greater than or equal to 0.45, greater than or equal to 0.50, or greater than or equal to 0.55. In another aspect $D_F/H_{CB}$ can be less than or equal to 0.90. Moreover, $D_F/H_{CB}$ can be less than or equal to 0.85, such as less than or equal to 0.80, less than or equal to 0.75, less than or equal to 0.70, less than or equal to 0.65, or less than or equal to 0.69. Further $D_F/H_{CB}$ can be within a range between, and including, any of the minimum and maximum values of $D_F/H_{CB}$ described herein.

Figure 29:
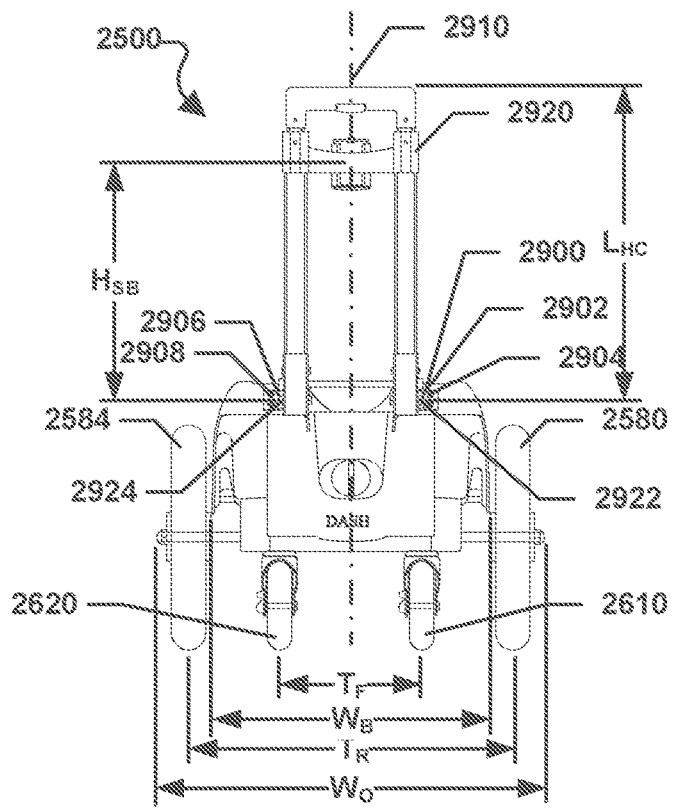
FIG. 29 and FIG. 30 include front plan views of a car seat carrier in accordance with an embodiment.

FIG. 29 shows that the carrier body 2502 of the car seat carrier 2500 can include an overall body width, $W_{CB}$, measured through the widest point of the carrier body 2502, but not including the rear wheel assemblies 2580, 2584. FIG. 28 indicates that the carrier body 2502 of the car seat carrier 2500 can include on overall body length, $L_{CB}$, measured through the longest portion of the carrier body 2502, but not including the handle brackets 2902, 2906, the pivoting/telescoping handle 2920, the front wheel assemblies 2610, 2020 (in the push position), and the rear wheel assemblies 2580, 2584. Further, as indicated in FIG. 29, the car seat carrier 2500 can include an overall car sent carrier width, $W_O$, measured through the widest portion of the car seat carrier 2500, i.e., from the outer periphery of the first wheel nut 2582 to the outer periphery of the second wheel nut 2586.

In a particular aspect, $W_{CB}$, may be greater than or equal to 11.0 inches. Moreover, $W_{CB}$ may be greater than or equal to 11.5 inches, such as greater than or equal to 12.0 inches, greater than or equal to 12.5 inches, greater than or equal 13.0 inches, greater than or equal to 13.5 inches greater than or equal to 14.0 inches, greater than or equal to 14.5 inches, greater than or equal to 15.0 inches, greater than or equal to 15.5 inches, or greater than or equal to 16.0 inches. In another aspect, $W_{CB}$ may be less than or equal to 20.0 inches. Further, $W_{CB}$ may be less than or equal to 19.5 inches, such as less than or equal to 19.0 inches, less than or equal to 18.5 inches, less than or equal to 18.0 inches, less than or equal to 17.5 inches, less than or equal to 17.0 inches, or less than or equal to 16.5 inches. In yet another aspect, $W_{CB}$ may be within a range between, and including, any of the minimum and maximum values of $W_{CB}$ detailed herein.

In another aspect, $L_{CB}$, may be greater than or equal to 16.0 inches. Moreover, $L_{CB}$ may be greater than or equal to 16.5 inches, such as greater than or equal to 17.0 inches, greater than or equal to 17.5 inches, such as greater than or equal to 18.0 inches, greater than or equal to 18.5 inches, greater than or equal to 19.0 inches, greater than or equal to 19.5 inches, greater than or equal to 20.0 inches, greater than or equal to 20.5 inches, greater than or equal to 21.0 inches, greater than or equal to 21.5 inches, or greater than or equal to 22.0 inches. In another aspect, $L_{CB}$, may be less than or equal to 24.0 inches. Further, $L_{CB}$ may be less than or equal to 23.5 inches, such as less than or equal to 23.0 inches, or less than or equal to 22.5 inches. In yet another aspect, $L_{CB}$ may be within a range between, and including, any of the minimum and maximum values of $L_{CB}$ detailed herein.

In a particular aspect, $WB_{PULL}$ and $WB_{PUSH}$ can be less than $L_{CB}$. Further, a ratio of $WB_{PULL}$ to $L_{CB}$, $WB_{PULL}/L_{CB}$ can be greater than or equal to 0.500. Moreover, $WB_{PULL}/L_{CB}$ can be greater than or equal to 0.525, such as greater than or equal to 0.550, greater than or equal to 0.575, greater than or equal to 0.600, or greater to or equal to 0.625. $WB_{PULL}/L_{CB}$ can be less than or equal to 0.750. Further, $WB_{PULL}/L_{CB}$ can be less than or equal to 0.725, such as less than or equal to 0.700, less than or equal to 0.675, or less than or equal to 0.650. Moreover, $WB_{PULL}/L_{CB}$ can be within a range between, and including, any of the minimum and maximum values of $WB_{PULL}/L_{CB}$ detailed herein.

A ratio of $WB_{PUSH}$ to $L_{CB}$, $WB_{PUSH}/L_{CB}$ can be greater than or equal to 0.625. Also, $WB_{PUSH}/L_{CB}$ can be greater than or equal to 0.650, such as greater than or equal to 0.675, greater than or equal to 0.700, greater than or equal to 0.725 or greater than or equal to 0.750. $WB_{PUSH}/L_{CB}$ can be less than or equal to 0.875, such as less than or equal to 0.850, less than or equal to 0.825, less than or equal to 0.800, or less than or equal to 0.775. Moreover, $WB_{PUSH}/L_{CB}$ can be within a range between, and including, any of the minimum and maximum values of $WB_{PUSH}/L_{CB}$ detailed herein.

In another particular aspect $W_O$, may be greater than or equal to 13.5 inches. Moreover, $W_O$ may be greater than or equal to 14.0 inches, such as greater than or equal to 14.5 inches, greater than or equal to 15.0 inches greater than or equal to 15.5 inches, greater than or equal to 16.0 inches, greater than or equal to 16.5 inches, greater than or equal to 17.0 inches, greater than or equal to 17.5 inches greater than or equal to 18.0 inches, greater than or equal to 18.5 inches, or greater than or equal to 19.0 inches. In another aspect, $W_O$, may be less than or equal to 22.0 inches. Further, $W_O$ may be less than or equal to 21.5 inches, such as less than or equal to 21.0 inches, less than or equal to 20.5 inches, less than or equal to 20.0 inches, or less than or equal to 19.5 inches. In yet another aspect, $W_O$ may be within a range between, and including any of the minimum and maximum values of $W_O$ detailed herein. Further, it is to be understood that in certain embodiments in which the rear wheel assemblies 180, 184 are placed inboard to the carrier body 162, i.e., within the outer periphery of the carrier body 102, $W_O$ may be equal to $W_{CB}$.

Referring now to FIG. 29, the car seat carrier 100 can include a rear track, $T_R$, i.e., the distance from an axis passing through the center of the first rear wheel assembly 2582 and an axis passing through the center of the second rear wheel assembly 2584. Further, the car seat carrier 2500 can include a front track, $T_F$, i.e., the distance from an axis passing through the center of the first front wheel assembly 2610 and an axis passing through the center of the second front wheel assembly 2620.

In a particular aspect, $T_F$ may be greater than or equal to 5.00 inches. Further, $T_F$ may be greater than or equal to 5.25 inches, such as greater than or equal to 5.50 inches, greater than or equal to 5.75 inches, greater than or equal to 6.00 inches, greater than or equal to 6.25 inches, greater than or equal to 6.50 inches, greater than or equal to 6.75 inches, greater than or equal to 7.00 inches, greater than or equal to 7.25 inches, or greater than or equal to 7.50 inches. In another aspect $T_R$, may be less than or equal to 9.00 inches. Further, $T_R$ may be less than or equal to 8.75 inches, such as less than or equal to 8.50 inches, less than or equal to 8.25 inches, less than or equal to 8.00 inches, or less than or equal to 7.75 inches. In another aspect, $T_F$ may be within a range between, and including, any of the minimum and maximum values of $T_F$ detailed above.

In still another aspect, $T_R$, may be greater than 11.0 inches. Moreover, $T_R$ may be greater than or equal to 11.5 inches, such as greater than or equal to 12.0 inches, greater than or equal to 12.5 inches, greater than or equal to 13.0 inches, greater than or equal to 13.5 inches, greater than or equal to 14.0 inches, greater than or equal to 14.5 inches, greater than or equal to 15.0 inches, greater than or equal to 15.5 inches, or greater than or equal to 16.0 inches. In another aspect $T_R$ may be less than or equal to 20.0 inches. Further, $T_R$ may be less than or equal to 19.5 inches, such as less than or equal to 19.0 inches, less than or equal to 18.5 inches, less than or equal to 18.0 inches, less than or equal to 17.5 inches, less than or equal to 17.0 inches, or less than or equal to 16.5 inches. In yet another aspect, $T_R$ may be within a range between, and including, any of the minimum and maximum values of $T_R$ detailed herein.

In another aspect, $T_F$ can be less than $T_R$. Further, a ratio of the front track to the rear track of the car seat carrier 100 $T_F/T_R$ can be greater than or equal to 0.25. Further, $T_F/T_R$ can be greater than or equal 0.30, such as greater than or equal to 0.35, or greater than 0.40. In still another particular aspect $T_F/T_R$ can be less than or equal to 0.85. Moreover, $T_F/T_R$ can be less than or equal to 0.80, such as less than or equal to 0.75, less than or equal to 0.70, less than or equal to 0.65, less than or equal to 0.60, less than or equal to 0.55, less than or equal to 0.50, or less than or equal to 0.45. It is to be understood that $T_F/T_R$ can be within a range between, and including, any of the minimum and maximum values of $T_F/T_R$ detailed herein.

Further, $T_F$ can be less than $W_{CB}$. Moreover, a ratio of the front track to the overall width of the carrier body 2502 of the car seat carrier 2500, $T_F/W_{CB}$, can be greater than or equal to 0.25. Further, $T_F/W_{CB}$ can be greater than or equal 0.30, such as greater than or equal to 0.35, or greater than 0.40. In still another particular aspect, $T_F/W_{CB}$ can be less than or equal to 0.85. Moreover, $T_F/W_{CB}$ can be less than or equal to 0.80, such as less than or equal to 0.75, less than or equal to 0.70, less than or equal to 0.65, less than or equal to 0.60, less than or equal to 0.55, less than or equal to 0.50, or less than or equal to 0.45. It is to be understood that $T_F/W_{CB}$ can be within a range between, and including, any of the minimum and maximum values of $T_F/W_{CB}$ detailed herein.

In another aspect, as illustrated in FIG. 29, $T_R$ can be greater than $W_{CB}$. However, in other instances, $T_R$ may also be less than $W_{CB}$. Further, a ratio of the rear track to the overall width of the carrier body 2502 of the car seat carrier 2500, $T_R/W_{CB}$, can be greater than or equal to 0.50. Further, $T_R/W_{CB}$ can be greater than or equal 0.75, such as greater than or equal to 1.00, or greater than 1.10. In still another particular aspect, $T_R/W_{CB}$ can be less than or equal to 1.80. Moreover, $T_F/W_{CB}$ can be less than or equal to 1.70, such as less than or equal to 1.60, less than or equal to 1.50 less than or equal to 1.40, less than or equal to 1.30, or less than or equal to 1.20. It is to be understood that $T_R/W_{CB}$ can be within a range between, and including, any of the minimum and maximum values of $T_R/W_{CB}$ detailed herein.

Referring now to FIG. 29, the car seat carrier 2500 can include a front face 2900 at the front end 2506 of the carrier body 2502. As illustrated, a first handle bracket 2902 can be attached to the front face 2900 of the carrier body 2502 via a pair of fasteners 2904. In a particular aspect, each of the fasteners 2904 includes a threaded bolt and a nut. As shown, the car seat carrier 2500 can further include a second handle bracket 2906 also attached to the front face 2900 of the carrier body 2502 via a pair of fasteners 2908. In a particular aspect, each of the fasteners 2908 includes a threaded bolt and a nut. The second handle bracket 2906 may be spaced from and opposite to the first handle bracket 2900 across a central vertical axis 2910. A pivoting/telescoping handle 2920 may be rotatably affixed to fire handle brackets 2900, 2906 via a first handle fastener 2922 and a second handle fasten 2924. In a particular aspect each of the handle fasteners 2922, 2924 comprises a threaded bolt and a nut.

Figure 30:
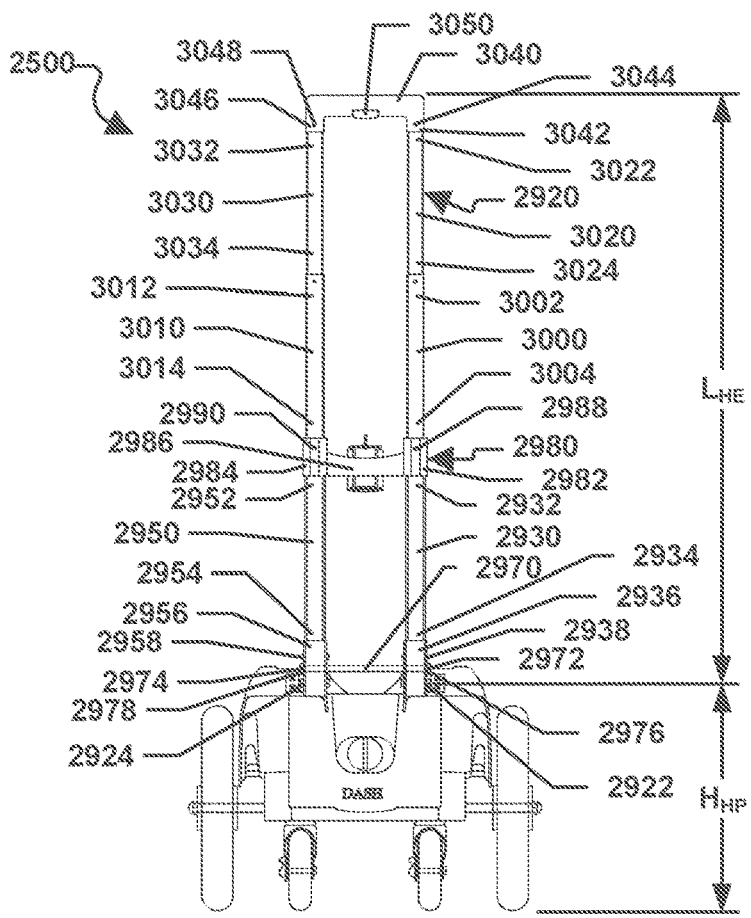

FIG. 30 shows that the pivoting/telescoping handle 2920 can include a first lower handle portion 2930 having a proximal end 2932 and a distal end 2934. A first lower bracket 2936 may be connected, or otherwise coupled, to the distal end 2934 of the first lower handle portion 2930 by at least one fastener 2938. As depicted in FIG. 25, the first lower bracket 2936 is generally L shaped and can include a stem 2940 and a lower arm 2942 that can extend from the stem 2940 toward the rear end 2508 of the carrier body 2502. The first lower bracket 2936 may also include a protrusion 2944 near a midpoint of the stem 2940 that can extend in a direction opposite the lower arm 2942. FIG. 25 also shows that the arm 2942 may be formed with a lateral bore 2946 that can be sized to receive the first handle fastener 2922 in a slip fit arrangement. The protrusion 2944 may also be formed with a lateral bore 2948.

Returning to FIG. 30 the pivoting/telescoping handle 2926 can also include a second lower handle portion 2950 having a proximal end 2952 and a distal end 2954. A second lower bracket 2956 may be connected or otherwise coupled, to the distal end 2954 of the second lower handle portion 2950 by at least one fastener 2958. As depicted in FIG. 26, the second lower bracket 2956 is generally L shaped and can include a stem 2960 and a lower arm 2962 that can extend from the stem 2960 toward the rear end 2508 of the carrier body 2502. The second lower bracket 2956 may also include a protrusion 2964 near a midpoint of the stem 2960 that can extend in a direction opposite the lower arm 2962. FIG. 26 also shows that the arm 2962 may be formed with a lateral bore 2966 that can be sized to receive the second handle fastener 2924 in a slip fit arrangement. The protrusion 2964 may also be formed with a lateral bore 2968.

FIG. 30 further indicates that the pivoting/telescoping handle 2920 can further include a cross bar 2970 that can extend between the lower brackets 2936, 2956. In particular the cross bar 2970 can be a cylindrical rod and the cross bar 2970 can be installed in the lateral bores 2946, 2966 formed in the protrusion 2944, 2946 of each lower brackets 2936, 2956 so that a first end 2972 of the cross bar 2970 can extend beyond an outer side wall of the first lower bracket 2936 and a second end 2974 of the crass bar 2970 can extend beyond an outer side wall of the second lower bracket 2956. The cross bar 2970 can be held in place within the lower brackets 2936, 2956 by a first end cap 2976 and a second end cap 2976 that fit over the first end 2972 and second end 2974 of the crass bar 2970, respectively.

Figure 32:
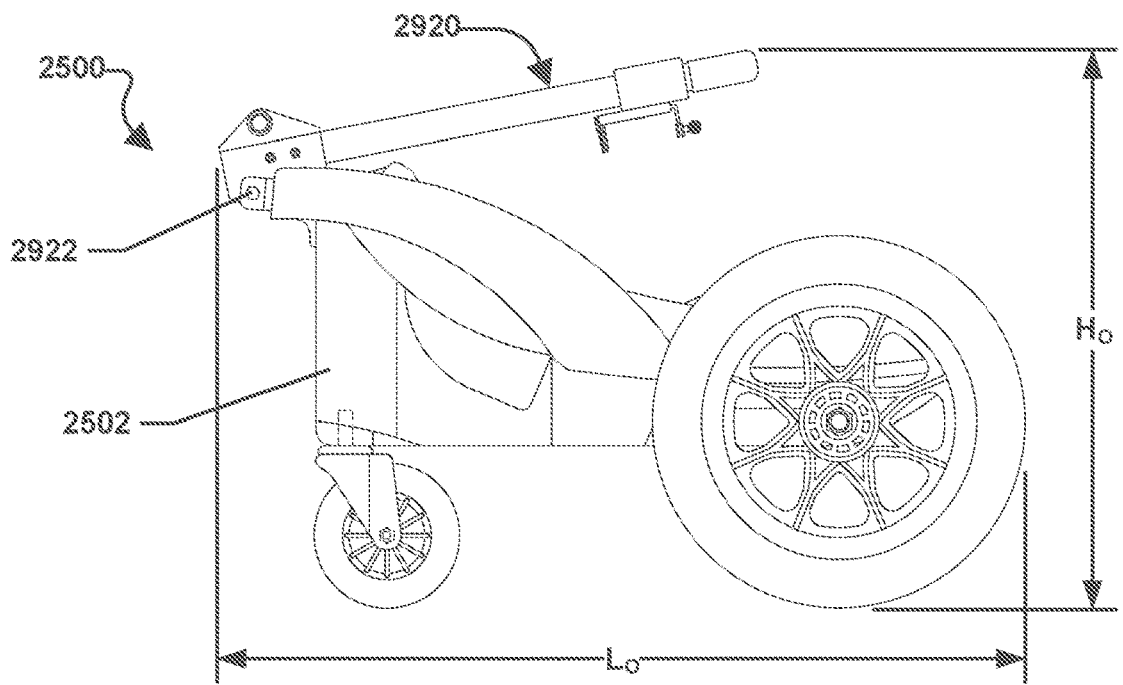

In a particular aspect, the cross bar 2970 can act as a lower handle that can be used to facilitate picking the car seat carrier 2500 up to place it in a car when the pivoting/telescoping handle 2920 is rotated so that it lays across the carrier body 2502 as illustrated in FIG. 32. In another aspect the crass bar 2970 can be used as an attachment point for a name plate, a storage pouch, a leash, or some other attachment.

As shown in FIG. 30, the pivoting/telescoping handle 2920 can further include an intermediate support structure 2980 installed on the proximal ends 2952, 2952 of the lower handle portions 2930, 2950 of the pivoting/telescoping handle 2920. Specifically, the intermediate support structure 2980 can include a first cellar 2982 that fits over the proximal end 2932 of the first lower handle portion 2930. Moreover, the intermediate support structure 2980 can include a second collar 2984 that fits over the proximal end 2952 of the second lower handle portion 2950. A transverse member 2986 can extend between the first and second collars 2982, 2984. The intermediate support structure 2980 can be held in place by a fits; fastener 2988 that is engaged with the first lower handle portion 2930 and a second fastener 2990 that is engaged with the second lower handle portion 2950.

FIG. 30 further illustrates that the pivoting/telescoping handle 2920 can include a first intermediate handle portion 3000 having a proximal end 3002 and a distal end 3004. The first intermediate handle portion 3000 can fit into, and slide within, the first lower handle portion 2930. The pivoting/telescoping handle 2920 can also include a second intermediate handle portion 3010 having a proximal end 3012 and a distal end 3014. The second intermediate handle portion 3010 can fit into, and slide within, the second lower handle portion 2930. Additionally, the pivoting/telescoping handle 2920 can include a first upper handle portion 3020 having a proximal end 3022 and a distal end 3024. The first upper handle portion 3020 can fit into, and slide within, the first intermediate handle portion 3000. Moreover the pivoting/telescoping handle 2920 can include a second upper handle portion 3030 having a proximal end 3032 and a distal end 3034. The second upper handle portion 3030 can fit into, and slide within, the second intermediate handle portion 3010.

Figure 31:
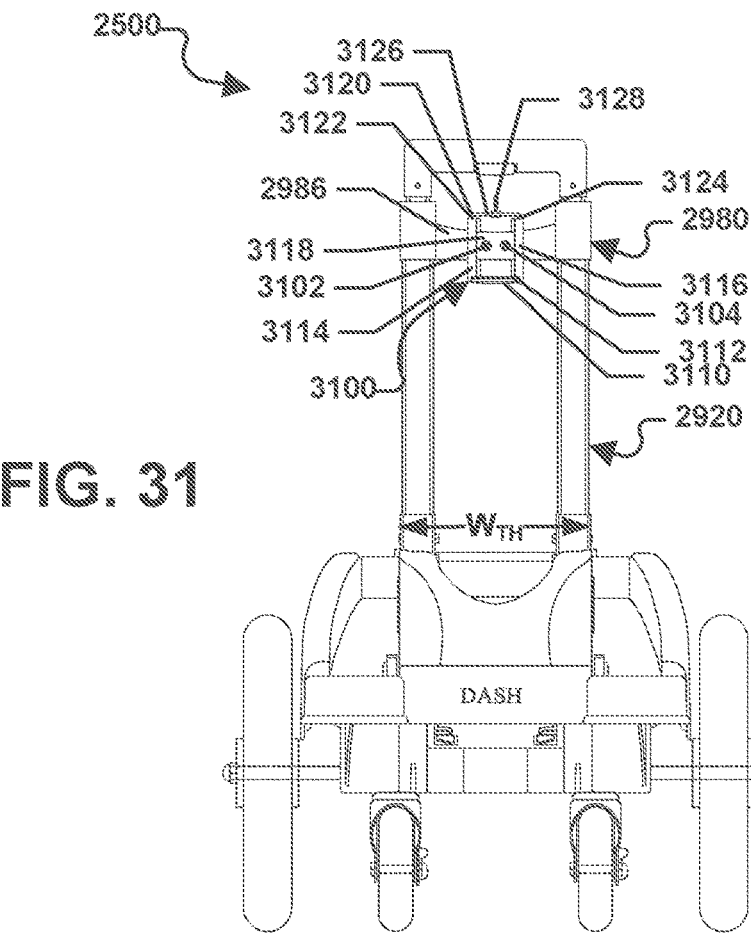
FIG. 31 includes a rear plan view of a car seat carrier in accordance with an embodiment.

As shown in FIG. 30, the pivoting/telescoping handle 2920 can further include an upper handgrip 3040 coupled to the proximal ends 3022, 3032 of the upper handle portions 3020, 3030. Specifically, the upper handgrip 3040 can include a first collar 3042 fated over the proximal end 3022 of the first upper handle portion 3020 and held in place by a first fastener 3044. Further the upper handgrip 3040 can include a second collar 3046 fitted over the proximal end 3032 of the second upper handle portion 3030 and held in place by a second fastener 3048. FIG. 30 also indicates that the upper handgrip 3040 can include a release button 3050 that is coupled to an internal locking mechanism (not shown). The pivoting/telescoping handle 2920 can be locked in a collapsed configuration, as illustrated in FIG. 29 and FIG. 31, and locked in an extended configuration, as illustrated in FIG. 30. By depressing the release button 3050, the pivoting/telescoping handle 2920 can be unlocked and moved between the collapsed configuration and the extended configuration.

For example when the pivoting/telescoping handle 2920 is fully collapsed it can automatically lock in the collapsed configuration. Pressing the release button 3050 will unlock the pivoting/telescoping handle 2920 and allow the user to move the pivoting/telescoping handle 2920 to the extended configuration. When the pivoting/telescoping handle 2920 is fully extended it will automatically hick in the extended configuration until the user presses the release button 3050 to unlock the pivoting/telescoping handle 2920 and return it to the collapsed configuration.

In another aspect, as illustrated in FIG. 30, the pivoting/telescoping handle 2920 can have an extended length, $L_{HE}$, measured from an axis passing through the center of the handle fasteners 2922, 2924 to the top of the upper handgrip 3040 when the pivoting/telescoping handle 2920 is in the extended configuration and rotated to a vertical position. Moreover as indicated in FIG. 31, the pivoting/telescoping handle 2920 can have a collapsed length, $L_{HC}$, measured from an axis passing through the center of the handle fasteners 2922, 2924 to the top of the upper handgrip 3040 when the pivoting/telescoping handle 2920 is in the collapsed configuration and rotated to a vertical position. In addition, the handle fasteners 2922, 2924 can provide a pivot that is located a height, $H_P$, measured from the surface on which the car seat carrier 100 is placed to an axis passing through the center of the handle fasteners 2922, 2924. FIG. 31 also indicates that the pivoting/telescoping handle 2920 can have an overall width, $W_H$, that is measured through the widest portion of the pivoting/telescoping handle 2920.

In particular aspect, may be greater than or equal to 24.0 inches. Moreover, $L_{HE}$ may be greater than or equal to 24.5 inches, such as greater than or equal to 25.0 inches, greater than or equal to 25.5 inches, such as greater than or equal to 26.0 inches greater than or equal to 26.5 inches, greater than or equal to 27.0 inches, greater than or equal to 27.5 inches, greater than or equal to 28.0 inches, greater than or equal to 28.5 inches, greater than or equal to 29.0 inches, greater than or equal to 29.5 inches, greater than or equal to 30.0 inches, greater than or equal to 30.5 inches, greater than or equal to 31.0 inches, greater than or equal to 31.5 inches, greater than or equal to 32.0 inches greater than or equal to 32.5 inches, greater than or equal to 33.0 inches, greater than or equal to 33.5 inches, greater than or equal to 34.0 inches, greater than or equal to 34.5 inches, or greater than or equal to 35.0 inches.

In another aspect $L_{HE}$, may be less than or equal to 48.0 inches. Further $L_{HE}$ may be less than or equal to 47.5 inches, such as less than or equal to 47.0 inches, less than or equal to 46.5 inches, less than or equal to 46.0 inches, less than or equal to 45.5 inches, less than or equal to 45.0 inches, less than or equal to 44.5 inches, less than or equal to 44.0 inches, less than or equal to 43.5 inches, less than or equal to 43.0 inches, less than or equal to 42.5 inches, less than or equal to 42.0 inches, less than or equal to 41.5 inches, less than or equal to 41.0 inches, less than or equal to 40.5 inches, less than or equal to 40.0 inches, less than or equal to 39.5 inches, less than or equal to 39.0 inches, less than or equal to 38.5 inches, less than or equal to 38.0 inches, less than or equal to 37.5 inches, less than or equal to 37.0 inches, less than or equal to 36.5 inches, less than or equal to 37.0 inches, less than or equal to 35.5 inches. In yet another aspect, $L_{HE}$ may be within a range between, and including, any of the minimum and maximum values of $L_{HE}$ detailed herein.

In particular aspect $L_{HC}$, may be greater than or equal to 10.0 inches. Moreover, $L_{HC}$ may be greater than or equal to 10.5 inches, such as greater than or equal to 11.0 inches, greater than or equal to 11.5 inches, such as greater than or equal to 12.0 inches, greater than or equal to 12.5 inches, greater than or equal to 13.0 inches, greater than or equal to 13.5 inches greater than or equal to 14.0 inches, greater than or equal to 14.5 inches, greater than or equal to 15.0 inches, greater than or equal to 15.5 inches, or greater than or equal to 16.0 inches. In another aspect, $L_{HC}$ may be less than or equal to 24.0 inches. Further, $L_{HC}$ may be less than or equal to 23.5 inches, such as less than or equal to 23.0 inches, less than or equal to 22.5 inches, less than or equal to 22.0 inches, less than or equal to 21.5 inches less than or equal to 21.0 inches, less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, less than or equal to 17.0 inches, or less than or equal to 16.5 inches. In yet another aspect, $L_{HC}$ may be within a range between, and including, any of the minimum and maximum values of $L_{HC}$ detailed herein.

Further, in another aspect, $W_H$ can may be greater than or equal to 0.50 inches. Moreover, $W_H$ may be greater than or equal to 0.75 inches, such as greater than or equal to 1.00 inches, such as greater than or equal to 1.50 inches, greater than or equal to 2.50 inches, greater than or equal to 5.00 inches, greater than or equal to 6.50 inches, greater than or equal to 7.00 inches, or greater than or equal to 7.25 inches. In another aspect, $W_H$, may be less than or equal to 12.00 inches. Further, $W_H$ may be less than or equal to 11.50 inches, such as less than or equal to 11.00 inches, less than or equal to 10.50 inches, less than or equal to 10.00 inches, less than or equal to 9.50 inches, less than or equal to 9.00 inches, less than or equal to 8.50 inches, less than or equal to 8.00 inches, or less than or equal to 7.50. In yet another aspect, $W_H$ may be within a range between, and including, any of the minimum and maximum values of $W_H$ detailed herein.

In a particular aspect, a ratio of $D_R$ to $L_{HE}$, can be greater than or equal to 0.10. Moreover, $D_R/L_{HE}$ can be greater than or equal to 0.15, such as greater than or equal to 0.20, greater than or equal to 0.25, or greater than or equal to 0.30. $D_R/L_{HE}$ can also be less than or equal to 0.70, such as less than or equal to 0.65, less, than or equal to 0.60, less than or equal to 0.55, less than or equal to 0.50, less than or equal to 0.45, less than or equal to 0.40, or less; than or equal to 0.35. Moreover, $D_R/L_{HE}$ can be within a range between and including, any of the minimum and maximum values of $D_R/L_{HE}$ detailed herein.

In a particular aspect, a ratio of $D_R$ to $L_{HC}$, $D_R/L_{HC}$, can be greater than or equal to 0.50. Moreover. $D_R/L_{HC}$ can be greater than or equal to 0.55, such as greater than or equal to 0.60, greater than or equal to 0.65, or greater than or equal to 0.70. $D_R$, $L_{HC}$ can also be less than or equal to 1.20, such as less than or equal to 1.15, less than or equal to 1.10, less than or equal to 1.05, less than or equal to 1.00, less than or equal to 0.95, less than or equal to 0.90, less than or equal to 0.85, less than or equal to 0.80, or less than or equal to 0.75. Moreover, $D_R/L_{HC}$ can be within a range between, and including, any of the minimum and maximum values of $D_R/L_{HC}$ detailed herein.

In a particular aspect, a ratio of $D_F$ to $D_F/L_{HE}$, can be greater than or equal to 0.02. Moreover. $D_F/L_{HE}$ can be greater than or equal to 0.04, such as greater than or equal to 0.08, greater than or equal to 0.10, or greater than or equal to 0.12. $D_R/L_{HE}$ can also be less than or equal to 0.30, such as less than or equal to 0.25, less than or equal to 0.20, less than or equal to 0.18, less than or equal to 0.16, or less than or equal to 0.14. Moreover, $D_F/L_{HE}$ can be within a range between, and including, any of the minimum and maximum values of $D_F/L_{HE}$ detailed heroin.

In a particular aspect, a ratio of $D_F$ to $L_{HC}$, $D_F/L_{HC}$, can be greater than or equal to 0.04. Moreover, $D_F/L_{HC}$ can be greater than or equal to 0.06, such as greater than or equal to 0.08, greater than or equal to 0.10, greater than or equal to 0.15, greater than or equal to 0.20, greater than or equal to 0.22, greater than or equal to 0.24, greater Item or equal to 0.26, or greater than or equal to 0.28. $D_F/L_{HC}$ can also be less than or equal to 0.60, such as less than or equal to 0.55, less than or equal to 0.50, or less than or equal to 0.45. Moreover, $D_F/L_{HC}$ can be within a range between, and including, any of the minimum and maximum values of $D_F/L_{HC}$ detailed herein.

In another aspect a ratio of $W_H$ to $T_F$, $W_H/T_F$, can be greater than or equal to 0.05. Moreover, $W_H/T_F$ can be greater than or equal to 0.15, such as greater than or equal to 0.25, greater than or equal to 0.50, greater item or equal to 0.75, greater than or equal to 0.90, or greater than or equal to 0.95. In another aspect, $W_H/T_F$ can be less than or equal to 1.50. Further, $W_H/T_F$ can be less than or equal to 1.45, such as less man or equal to 1.40, less item or equal to 1.35, less than or equal to 1.30, less than or equal to 1.25, less than or equal to 1.20, less than or equal to 1.15, less than or equal to 1.10, less than or equal to 1.05, or less than or equal to 1.00. Moreover, $W_H/T_F$ can be within a range between, and including, any of the minimum and maximum values of $W_H/T_F$ detailed herein.

In still another aspect, a ratio ox $W_H$ to $T_R$, $W_H/T_R$, can be greater than or equal to 0.05. Moreover, $W_H/T_R$ can be greater than or equal to 0.10, such as greater than or equal to 0.15, greater than or equal to 0.20, greater than or equal to 0.25, greater than or equal to 0.30, greater than or equal to 0.35, or greater than or equal to 0.40. In another aspect $W_H/T_R$ can be less than or equal to 0.9. Further, $W_H/T_R$ can be less than or equal to 0.85, such as less than or equal to 0.80, less than or equal to 0.75, less than or equal to 0.70, less than or equal to 0.65, less than or equal to 0.60, less than or equal to 0.55, less than or equal to 0.50, or less than or equal to 0.45. Moreover $W_H/T_R$ can be within a range between, and including, any of the minimum and maximum values of $W_H/T_R$ detailed herein.

Referring now to FIG. 31, the car seat carrier 2500 can include a smartphone bracket 3100 that can be attached, or otherwise affixed, to the pivoting/telescoping handle 2920. In particular, as illustrated in FIG. 31, the smartphone bracket 3100 can be attached to the intermediate support structure 2980 of the pivoting/telescoping handle 2920. Further still, the smartphone bracket 3100 can be attached to the transverse member 2986 of the intermediate support structure 2980 of the pivoting/telescoping handle 2920. As shown, the smartphone bracket 3100 can be attached to the transverse member 2986 by a first fastener 3102 and a second fastener 3104. The fasteners 3102, 3104 can include a pair of threaded fasteners held in place by first and second threaded nuts 3106, 3108, respectively, as shown in FIG. 28.

Returning to FIG. 31, the smartphone bracket 3100 can include a fixed portion 3110 that can include a base 3112. A first support post 3114 can extend generally perpendicularly from the base 3112. A second support post 3116 can also extend generally perpendicularly from the base 3112 in the same direction as the first, support post 3114. As shown, the support posts 3114, 3116 are substantially parallel to each other. FIG. 31 further shows a transverse mounting plate 3118 that can extend between the support posts 3114, 3116. The fasteners 3102, 3104 can extend through the transverse mounting plate 3118 and into the transverse member 2986 of the intermediate support structure 2980 of the pivoting/telescoping handle 2920.

As illustrated in FIG. 31, the smartphone bracket 3100 can include a sliding portion 3120 that can slide relative to the fixed position 3110. Specifically, the sliding portion 3120 can include a first sliding, post 3122 installed within a bore (not shown) formed in the first support post 3114. It is to be understood that the first sliding post 3122 can slide linearly within the first support post 3114. The sliding portion 3120 can also include a second sliding post 3124 installed within a bore (not shown) formed in the second support post 3116. It is to be understood that the second sliding post 3124 can also slide within the second support post 3116.

The sliding portion 3120 of the smartphone bracket 3100 can further include a transverse member 3126 extending between the first sliding post 3122 and the second sliding post 3124. As shown, the transverse member 3126 of the sliding portion 3120 is substantially perpendicular to the sliding posts 3122, 3124 and substantially parallel to the base 3112 of the fixed portion 3110 of the smartphone bracket 3100. Further, as shown in FIG. 31, the sliding portion 3120 of the smartphone bracket 3100 may include a handle 3120 extending from the transverse member 3126 of the sliding portion 3120 of the smartphone bracket 3100. In a particular aspect the smartphone bracket 3100 can include a first infernal spring (not shown) installed within the first support post 3314 and connected to the first sliding post 3122. Farther, the smartphone bracket 3100 can include a second internal firing (not shewn) installed with in the second support post 3116 and connected to the second sliding post 3124. As such, a user can grasp the handle 3128 and moving sliding portion 3120 of the smartphone bracket 3100 away front the base 3112 of the fixed portion 3110 of the smartphone bracket 3100. The internal springs (not shown) can provide a force on each sliding post 3122, 3124 to retract the sliding portion 3120 back toward the base 3112 of the fixed portion 3110. A smartphone or other portable electronic device, may be placed between the base 3112 of the fixed portion 3110 and the transverse member 3126 of the sliding portion 3120 and the internal springs (not shown) can provide a retention force to hold the smartphone within the smartphone bracket 3100.

Also as indicated in FIG. 31, the smartphone bracket 3100 can lave a bracket height, $H_{SB}$, that measured from an axis passing through the handle fasteners 2922, 2924 to a midline of the smartphone bracket 3100. The midline of the smartphone bracket 3100 is half the distance measured between the base 3112 of the fixed portion 3110 of the smartphone bracket 3100 and the transverse member 3126 of the sliding portion 3120 of the smartphone bracket 3100.

In a particular aspect, $H_{SB}$, may be greater than or equal to 8.0 inches. Moreover, $H_{SB}$ may be greater than or equal to 8.5 inches, such as greater than or equal to 9.0 inches, greater than or equal to 9.5 inches, greater than or equal to 10.0 inches, greater than or equal to 10.5 inches, greater than or equal to 11.0 inches, greater than or equal to 11.5 inches or greater than 12.0 inches. In another aspect, $H_{SB}$, may be less than or equal to 16.0 inches. Further, $H_{SB}$ may be less tot or equal to 15.5 inches, such as less than or equal to 15.0 inches, less than or equal to 14.5 inches, less than or equal to 14.0 inches, less than or equal to 13.5 inches, less than or equal to 13.0 inches, or less than or equal to 12.5 inches. In yet another aspect, $H_{Sb}$ may be within a range between, and including, any of the minimum and maximum values of $H_{SB}$ detailed herein.

In another particular aspect, $H_{SB}$ can be less than or equal to $L_{HC}$. Further, a ratio of $H_{SB}$ to $L_{HC}$, $H_{SB}/L_{HC}$, can be greater than or equal to 0.50. Further $H_{SB}/L_{HC}$ can be greater than or equal to 0.55, such as greater than or equal to 0.60, greater than or equal to 0.65, greater than or equal to 0.70, or greater than or equal to 0.75. In another aspect, $H_{SB}/L_{HC}$ can be less than or equal to 1.0. Moreover, $H_{SB}/L_{HC}$ can be less than or equal to 0.95, such as less than or equal to 0.90, less than or equal to 0.85, or less than or equal to 0.80. In addition, $H_{SB}/L_{HC}$ can be within a range between, and including, any of the minimum or maximum values of described herein.

Referring now to FIG. 32, it can be seen that the pivoting/telescoping handle 2920 can be placed in the collapsed configuration and rotated about the handle fasteners 2922, 2924 so that the pivoting/telescoping handle 2920 is laid back across the carrier body 2502 and placed in a first stowage position. The first stowage position of the pivoting/telescoping handle 2920 facilitates storage or facilitates placement of the car seat carrier 2500 in the trunk of an automobile. In the first stowage position, the pivoting/telescoping handle 2920 forms an angle. $A_{S1}$, with respect to a vertical axis that extends through the handle fastener(s) 2922, 2924. Further, in the first stowage position, the pivoting/telescoping handle 2920 is rotated behind the vertical axis that extends through the handle fastener(s) 2922, 2924.

In a particular aspect, $A_{S1}$ can be greater than or equal to 60 degrees. In another aspect, $A_{S1}$ can be greater than or equal 65 degrees, such as greater than or equal to 70 degrees, greater than or equal to 75 degrees, greater than or equal to 80 degrees, or greater than or equal to 85 degrees. In yet another particular aspect, $A_{S1}$ can be less than or equal to 120 degrees. Moreover, $A_{S1}$ can be less than or equal 115 degrees, such as less than or equal to 110 degrees, less than or equal to 105 degrees, less than or equal to 100 degrees, less than or equal to 95 degrees, or less than or equal to 90 degrees. In another aspect, $A_{S1}$ can be within a range between, and including, any of the values of $A_{S1}$ described herein.

With the pivoting/telescoping handle 2920 in the first stowage position, the car seat earlier 2500 can include an overall height. $H_O$, measured from a surface on which car seat carrier 2500 is placed to the highest part of the pivoting/telescoping handle 2920. Further in the first stowage position, the car seat carrier 2500 can include an overall length, $L_O$, measured from a line perpendicular to the surface on which the car seat carrier 2500 is placed and tangential to the first rear wheel assembly 2580 and line perpendicular to the surface on which the car seat carrier 2500 is placed and tangential to the bottom of the first lower bracket 2936.

In a particular aspect, $H_O$ can be greater than or equal to 11.0 inches. Further, $H_O$ can be greater than or equal to 11.5 inches, such as greater than or equal to 12.0 inches, greater than or equal to 12.5 inches, greater than or equal to 13.0 inches, greater than or equal to 13.5 inches, greater than or equal to 14.0 inches greater than or equal to 14.5 inches, or greater than or equal to 15.0 inches. In another aspect, $H_O$ can be less than or equal to 20.0 inches. Moreover, $H_O$ can be less than or equal to 19.5 inches, such as less than or equal to 19.0 inches, less than or equal to 18.5 inches, less than or equal to 18.0 inches, less than or equal to 17.5 inches less than or equal to 17.0 inches, less than or equal to 16.5 inches, less than or equal to 16.0 inches, or less than or equal to 15.5 inches. In another aspect, $H_O$ can be within a range between, and including, any of the minimum and maximum values of $H_O$ described herein.

In yet another particular aspect, $L_O$ can be greater than or equal to 20.0 inches. Further $L_O$ can be greater than or equal to 21.5 inches, such as greater than or equal to 22.0 inches, greater than or equal to 22.5 inches, or greater than or equal to 23.0 inches. In another aspect, $L_O$ can be less than or equal to 26.0 inches. Moreover, $H_O$ can be less than or equal to 25.5 inches, such as less than or equal to 25.0 inches, less than or equal to 24.5 inches, less than or equal to 24.0 inches or less than or equal to 21.5 inches. In another aspect, $L_O$ can be within a range between, and including, any of the minimum and maximum values of $L_O$ described herein.

In a particular aspect a ratio of $H_O$ to $L_O$, $H_O/L_O$ can be greater than or equal to 0.5. Further, $H_O/L_O$ can be greater than or equal to 0.55, such as greater than or equal to 0.60, greater than or equal to 0.65, or greater than or equal to 0.70. In another aspect, $H_O/L_O$ can be less than or equal to 1.0. Moreover, $H_O/L_O$ can be less than or equal to 0.95, such as less than or equal to 0.90, less than or equal to 0.85, less than or equal to 0.80, or less than or equal to 0.75. In yet another aspect, $H_O/L_O$ can be within a range between and including any of the minimum or maximum values of $H_O/L_O$, described herein.

FIG. 33 indicates that the pivoting/telescoping handle 2920 can be rotated to a second stowage position substantially opposite to the first stowage position. In the second stowage position, the pivoting/telescoping handle 2920 can be rotated around the handle fastener's 2922, 2924 until the upper handgrip 3040 is the farthest distance away from the rear wheel assemblies 2580, 2584. With the pivoting/telescoping handle 2920 in the second, stowage position, the car seat carrier 2500 can be rotate to a vertical position (relative to FIG. 9) and hung from a hook by the upper handgrip 3040 of the pivoting/telescoping handle 2920. In the second stowage position, the pivoting/telescoping handle 2920 forms an angle, $A_{S2}$, with respect to a vertical axis that extends through the handle fastener(s) 2922, 2924. Further, in the second stowage position, the pivoting/telescoping handle 2920 is rotated in front of the vertical axis that extends through the handle fastener(s) 2922, 2924.

In a particular aspect, $A_{S2}$ can be greater than or equal to 60 degrees. In another aspect, $A_{S2}$ can be greater than or equal 65 degrees, such as greater than or equal to 70 degrees, greater than or equal to 75 degrees, greater than or equal to 80 degrees, or greater than to equal to 85 degrees. In yet another particular aspect $A_{S2}$ can be less than or equal to 120 degrees. Moreover, $A_{S2}$ can be less than or equal 115 degrees, such as less than or equal to 110 degrees, less than or equal to 105 degrees, less than or equal to 100 degrees, less than or equal to 95 degrees, or less than or equal to 90 degrees. In another aspect, $A_{S2}$ can be within a range between, and including, any of the values of $A_{S2}$ described herein.

Figure 36:
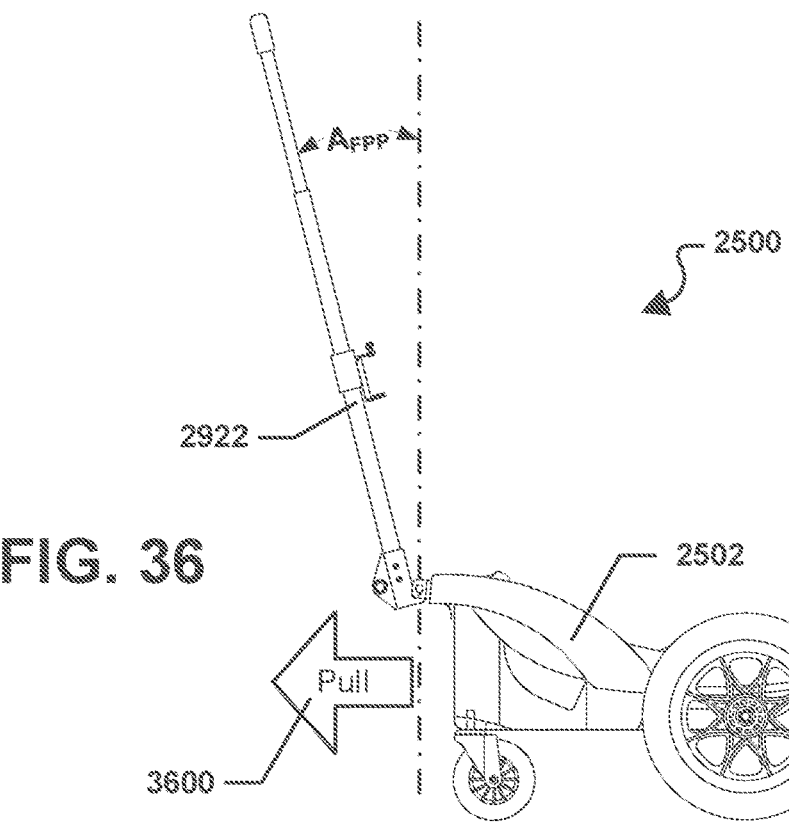

FIG. 34 through FIG. 37 show how the pivoting/telescoping handle 2920 can be deployed from the first stowage position (FIG. 32) or the second stowage position (FIG. 33) to the front push/pull position illustrated in FIG. 36 and FIG. 37. Specifically, the pivoting/telescoping handle 2920 can be rotated from either stowage position to a vertical, or near vertical position, as shown in FIG. 34. Then the release button 3050 can be pressed in order to unlock the pivoting/telescoping kindle 2920 so that the pivoting/telescoping handle 2920 can be moved to an intermediate extended configuration, illustrated in FIG. 35, before being moved to the fully extended configuration, illustrated in FIG. 36 and FIG. 37.

FIG. 36 and FIG. 37 show that in the fully extended configuration, the pivoting/telescoping handle 2920 can be moved to the front push/pull position, in the front push-pull position, the pivoting/telescoping handle 2920 may form an angle, $A_{FPP}$, with respect to an axis that extends vertically through the handle fasteners 2922, 2924. $A_{FPP}$ can vary based on the height of the user and the length of the user's arms. Moreover, regardless of the value of $A_{FPP}$, the pivoting/telescoping handle 2920 will be rotated so that the pivoting/telescoping handle 2920 is in front of the axis that extends vertically through the handle listeners 2922, 2924 about which the pivoting/telescoping handle 2920 pivots or rotates. Further, in the front push/pull position the upper handgrip 3040 is in front of the axis that extends vertically through the handle fasteners 2922, 2924 and the upper handgrip 3040 is not directly above the carrier body 2502.

In a particular aspect, $A_{FPP}$ can be greater than or equal to 0 degrees. In another aspect, $A_{FPP}$ can be greater than or equal 5 degrees, such as greater than or equal to 10 degrees, greater than or equal to 15 degrees, greater than or equal to 20 degrees, greater than or equal to 25 degrees, greater than or equal to 30 degrees, greater than or equal to 35 degrees, greater than or equal to 40 degrees or greater than or equal to 45 degrees. In yet another particular aspect, $A_{FPP}$ be less than or equal to 90 degrees. Moreover, $A_{FPP}$ can be less than or equal 85 degrees, such as less than or equal to 80 degrees, less than or equal to 75 degrees, less than or equal to 70 degrees, less than or equal to 65 degrees, less than or equal to 60 degrees, less than or equal to 55 degrees, or less than or equal to 50 degrees. In another aspect $A_{FPP}$ can be within a range between, and including, any or the values of $A_{FPP}$ described herein.

With the telescoping handle 2920 in the front push/pull position, a user can pull the car seat carrier 2500 in a direction indicated by arrow 3600 as illustrated in FIG. 36. Moreover, with the telescoping handle 2920 in the front push/pull position, a user can push the car seat carrier 2500 in a direction indicated by arrow 3700 as illustrated in FIG. 37.

Figure 38:
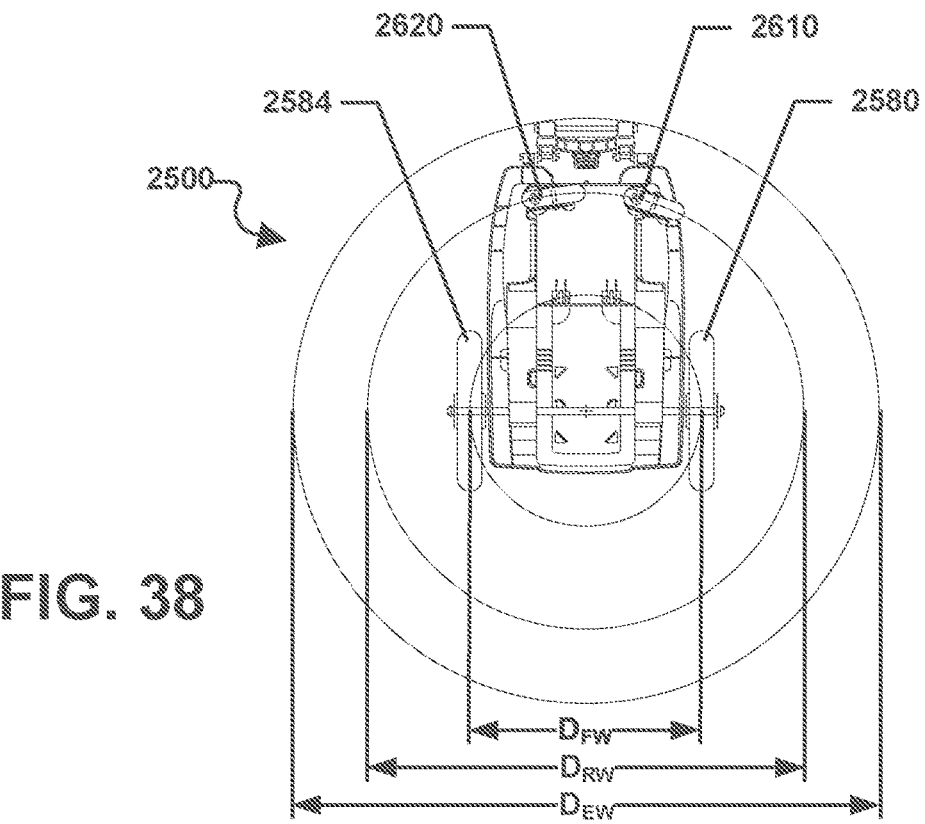
FIG. 38 includes a bottom plan view of a car seat carrier in accordance with an embodiment.

FIG. 38 indicates that the car seat carrier 2500 can have a zero turn radius. Also, due to the relatively short wheel base and relatively narrow front and near track, with the pivoting/telescoping handle 520 in a vertical position, the entire car seat carrier 2500 can turn three-hundred and sixty degrees within a circle having a diameter, $D_E$. In particular $D_E$ is less than or equal to 44.0 inches. In another aspect $D_E$ can be less than or equal to 43.5 inches, such as less than or equal to 43.0 inches, less than or equal to 42.5 inches, less than or equal to 42.0 inches, less than or equal to 41.5 inches, less than or equal to 41.0 inches, less than or equal to 40.5 inches, less than or equal to 40 inches, or less than or equal to 39.5 inches. In yet another aspect, $D_E$ can be greater than or equal, to 36.0 inches. Further, $D_E$ can be greater than or equal to 16.5 inches, such as greater than or equal to 37.0 inches, greater than or equal to 37.5 inches, greater than or equal to 38.0 inches, greater than or equal to 38.5 inches or greater than or equal to 39.0 inches. It is to be understood that $D_E$ can be within a range between, and including any of the maximum and minimum values of $D_E$ described herein.

Additionally, when the car seat carrier 2500 turned three-hundred and sixty degrees, as illustrated in FIG. 38, the front wheel assemblies 210, 220 can trace a circle basing a diameter, $D_{FW}$. In particular $D_{FW}$ is less than or equal to 36.0 inches. Further, $D_{FW}$ can be less than or equal to 35.5 inches, such as less than or equal to 35.0 inches, less than or equal to 34.5 inches, less than or equal so 34.0 inches, less than or equal to 33.5 inches, less than or equal to 33.0 inches, less than or equal to 32.5 inches, less than or equal to 32 inches, less than or equal to 31.5 inches, less than or equal to 31.0 inches, less than or equal to 30.5 inches, less than or equal to 30.0 inches, less than or equal to 29.5 inches, or less than or equal to 29.0 inches. In another aspect, $D_{FW}$ can be greater than or equal to 26.0 inches. Further, $D_{FW}$ can be greater than or equal to 26.5 inches such as greater than or equal to 27.0 inches, greater than or equal to 27.5 inches, greater than or equal to 28.0 inches, greater than or equal to 28.5 inches or greater than or equal to 29.0 inches. It is to be understood that $D_{FW}$ can be within a range between, and including any of the maximum and minimum values of described herein.

When turned three-hundred and sixty degrees, as indicated in FIG. 38, the rear wheel assemblies 2580, 2584 can trace a circle having a diameter, $D_{RW}$. In particular $D_{RW}$ is the same is the rear track. $T_R$, of the of the rear wheel assemblies 2580, 2584 and detailed herein.

Referring now to FIG. 39, the car seat carrier 2500 is shown with an infant car seat 3900 above the car seat carrier 2500. As illustrated, the infant car seat 3900 includes a body 3902, a handle 3904 that extends from the body 3902, and a canopy 3906 that can be raised or lowered. The body 3902 is configured to fit into the carrier body 2502 of the car seat carrier 2500. Specifically, the body 3902 of the infant car seat 3900 is configured to fit into the first cavity 2522 (FIG. 27) and the second cavity 2524 (FIG. 27) of the carrier body 2502.

Further, the body 3902 of the infant car seat 3900 can include a retractable securing projection 3908 on each side of the body 3902 of the infant car seat 3900. The infant car seat 3900 also includes a release handle 3910 that can be used to retract the retractable securing projections 3908 in order to unlock the infant car seat 3900 from the car seat carrier 2500 when the infant car seat 3900 is properly installed, and locked, in the car seat carrier 2500. When installed in the car seat carrier, the retractable securing projections 3908 of the car seat 3900 can snap into and engage the rear locking notches 2528, 2530 (FIG. 27) formed in the carrier body 2502.

Additionally, attachment points (not shown) on the underside of the body 3902 of the car seat 3900 can engage the first hook 2542 (FIG. 27) and the second hook 2544 (FIG. 27) that extend from the carrier body 2502 of the car seat carrier 2500. Accordingly, the first hook 2542, the second hook 2544, the first rear locking notch 2528, and the second rear locking notch 2530 work in concert with the attachment points and the retractable securing projections 3908 respectively, to engage and lock the infant car seat 3900 to the car seat carrier 2500 as shown in FIG. 40 through FIG. 46.

FIG. 39 indicates that the infant car seat 3900 can have an overall length, $L_{ICS}$, measured between the front of the infant car seat 3900 and the rear of the infant car seat 3900. In this case, $L_{ICS}$ is measured with the canopy 3906 fully raised as shown in FIG. 39. Additionally as shown, the infant car seat 3900 can have an overall height, $H_{ICS}$, that is measured from the bottom of the infant car seat 3900 and the top of the handle 3904 when it is locked in the upright position, as illustrated in FIG. 39.

In a particular aspect, $L_{ICS}$ can be greater than or equal to 24 inches. Further, $L_{ICS}$ can be greater than or equal to 24.5 inches, such as greater than or equal 25.0 inches, greater than or equal to 25.5 inches, greater than of equal to 26.0 inches, or greater than or equal to 26.5 inches. In another aspect, $L_{ICS}$ can be less than or equal to 33 inches. Moreover, $L_{ICS}$ can be less than or equal to 29.5 inches, such as less than or equal to 29.0 inches, less than or equal so 28.5 inches, less than or equal to 28.0 inches, less than or equal to 27.5 inches, or less than or equal to 27.0 inches. In still another aspect, $L_{ICS}$ can be within a range between, and including, any of the minimum and maximum values of $L_{ICS}$ described herein.

In another particular aspect, $H_{ICS}$ can be greater than or equal to 20 inches. Further, $H_{ICS}$ can be greater than of equal to 20.5 inches, such as greater than or equal to 21.0 inches, greater than or equal to 21.5 inches, greater than or equal to 22.0 inches, greater than or equal to 22.5 inches, or greater than or equal to 23.0 inches. In another aspect, $H_{ICS}$ can be less than or equal to 26 inches. Moreover, $H_{ICS}$ can be less than or equal to 25.5 inches, such as less than or equal to 25.0 inches, less than or equal to 24.5 inches, less than or equal to 24.0 inches, or less than or equal to 23.5 inches. In still another aspect, $H_{ICS}$ can be within a range between, and including, any of the minimum and maximum values of $H_{ICS}$ described herein.

Figure 40:
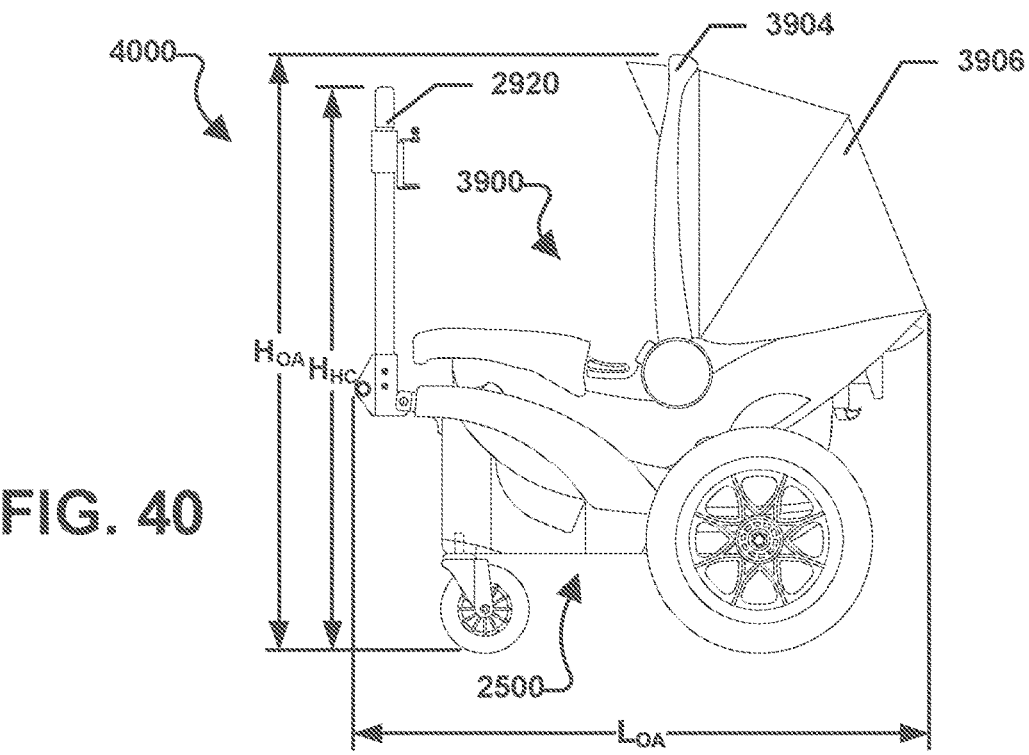

FIG. 40 depicts an infant car seat carrier assembly 4000 that includes the infant car seat 3900 lockably engaged with the car seat carrier 2500. As shown, the infant car seat carrier assembly 4000 can include an overall height, $H_{OA}$, measured from the surface on which the infant car seat carrier assembly 4000 is resting to the top of the handle 3904 that is attached to the body 3902 of the infant car seat 3900 when the handle 3904 is positioned in the most upright position. Further, the pivoting/telescoping handle 2920 of the car seat carrier 2500 can have a collapsed height, $H_{HC}$, measured from the surface on which the infant car seat carrier assembly 4000 is resting to the top of the pivoting/telescoping handle 2920 when the pivoting/telescoping handle is collapsed and in a vertical position, as shown in FIG. 40.

In one aspect, as shown in FIG. 40, $H_{HC}$ can be slightly less than $H_{OA}$. However, $H_{HC}$ can be equal to $H_{OA}$. In another aspect, $H_{HC}$ can be less than or equal to 99.5% $H_{OA}$. Further, $H_{HC}$ can be less than or equal to 99.0% $H_{OA}$, such as less than or equal to 98.5% $H_{OA}$, less than or equal to 98.0% $H_{OA}$, less than or equal to 97.5% $H_{OA}$, less than or equal to 97.0% $H_{OA}$, less than or equal to 96.5% $H_{OA}$, less than or equal to 96.0% $H_{OA}$, less than or equal to 95.5% $H_{OA}$, or less than or equal to 95.0% $H_{OA}$. In another aspect, $H_{HC}$ can be greater than or equal to 90.0% $H_{OA}$. Further, $H_{HC}$ can be greater than or equal to 90.5% $H_{OA}$ such as greater man or equal to 91.0% $H_{OA}$, greater than or equal to 91.5% $H_{OA}$, greater than or equal to 92.0% $H_{OA}$, greater-than or equal to 92.5% $H_{OA}$, greater than or equal to 93.0% $H_{OA}$, greater than or equal to 93.5% $H_{OA}$, greater than or equal to 94.0% $H_{OA}$, or greater than or equal to 94.5% $H_{OA}$.

It is to be understood that $H_{HC}$ can also be within a range between, and including, any of the maximum of minimum values of $H_{HC}$ described herein.

In another aspect, $H_{OA}$ can be less or equal to 36 inches. Further, $H_{OA}$ can be less than or equal to 35.5 inches, such as less than or equal to 35.0 inches, less than or equal to 34.5 inches, less than or equal to 34.0 inches, less than or equal to 33.5 inches, less than or equal to 33.0 inches, less than or equal to 32.5 inches, less than or equal to 32.0 inches, less than or equal to 31.5 inches, less than or equal to 31.0 inches, less than or equal to 30.5 inches, or less than or equal to 30.0 inches. Additionally, in another aspect, $H_{OA}$ can be greater than or equal to 25.0 inches. Moreover, $H_{OA}$ can be greater than or equal to 25.5 inches, such as greater than or equal to 26.0 inches, greater than or equal to 26.5 inches, greater than or equal to 27.0 inches, greater than or equal to 27.5 inches, inches, greater than or equal to 28.0 inches, greater than or equal to 28.5 inches, greater than or equal to 29.0 inches, or greater than or equal to 29.5 inches, it is to be understood that $H_{OA}$ can also be within a range between, and including, any of the maximum or minimum values of $H_{OA}$ described herein.

In yet another aspect, $H_{HC}$ can be less or equal to 36 inches. Further, $H_{HC}$ can be less than or equal to 35.5 inches, such as less or equal to 35.0 inches, less than or equal to 34.5 inches, less than or equal to 34.0 inches, less than or equal to 33.5 inches, less than or equal to 33.0 inches less than or equal to 32.5 inches, less than or equal to 32.0 inches, less than or equal to 31.5 inches, less tor or equal to 31.0 inches, less than or equal to 30.5 inches, less than or equal to 30.0 inches, less than or equal to 29.5 inches, or less than or equal to 29.0 inches. Additionally in another aspect, $H_{HC}$ can be greater tot or equal to 25.0 inches. Moreover. $H_{HC}$ can be greater than or equal to 25.5 inches, such as greater than or equal to 26.0 inches, greater than or equal to 26.5 inches, greater than or equal to 27.0 inches, greater than or equal to 27.5 inches, greater than or equal to 28.0 inches, or greater than or equal to 28.5 inches. It is to be understood that $H_{HC}$ can also be within a range between, and including, any of the maximum or minimum values of $H_{HC}$ described herein.

FIG. 40 further indicates that the infant car seat carrier assembly 4000 can have an overall length, $L_{OA}$, measured from the front of the pivoting/telescoping handle 2920 of the car seat carrier 2500 when the pivoting/telescoping handle 2920 is rotated to the vertical position, as illustrated, to the rear of the canopy 3906 of the infant car seat 3900 when the canopy 3906 is fully raised, as illustrated.

In a particular aspect $L_{OA}$ can greater than or equal to 26 inches. Further, $L_{OA}$ can be greater than or equal to 26.5 inches, such as greater than or equal to 27.0 inches greater than or equal to 27.5 inches, greater than or equal to 28.0 inches, greater than 28.5 inches, greater than or equal to 29.0 inches, or greater than or equal to 29.5 inches. In another aspect $L_{OA}$ can be less than or equal to 35 inches. Also, $L_{OA}$ can be less than or equal to 34.5 inches, such as less to or equal to 34.0 inches, less than or equal to 33.5 inches, less than or equal to 33.0 inches, less than or equal to 32.5 inches, less than or equal to 32.0 inches less than or equal to 31.5 inches, less than or equal to 31.0 inches, less than or equal to 30.5 inches, or less than or equal to 30.0 inches. In another aspect, $L_{OA}$ can be within a range between, and including any of the minimum and maximum values of $L_{OA}$ described herein.

As clearly illustrated in FIG. 40, the infant car seat carrier assembly 4000 is only slightly longer than the infant car seat 3900. In other words, $L_{OA}$ can be greater than or equal to $L_{ICS}$. Additionally, a ratio of $L_{OA}$ to $L_{ICS}$, $L_{OA}/L_{ICS}$ can be greater than or equal to 1.00. Further, $L_{OA}/L_{ICS}$ can be greater than or equal to 1.05, such as greater than or equal to 1.06, greater than or equal to 1.07, greater than or equal to 1.08, greater than or equal to 1.09, greater than or equal to 1.10, greater than or equal to 1.11, greater than or equal to 1.12, greater than or equal to 1.13, greater than or equal to 1.14, or greater than or equal to 1.15. In another aspect, $L_{OA}/L_{ICS}$ can be less than of equal to 1.50. Further, $L_{OA}/L_{ICS}$ can be less than or equal to 1.45, such as less than or equal to 1.40, less than or equal to 1.35, less than or equal to 1.30, less than or equal to 1.25, or less than or equal to 1.20. In another aspect, $L_{OA}/L_{ICS}$ can be within a range between, and including, any of the minimum and maximum values of $L_{OA}/L_{ICS}$ described herein.

$L_{OA}$ can also be greater than $WB_{PULL}$ and $WB_{PUSH}$. For example, the ratio of $L_{OA}$ to $WB_{PULL}$, $L_{OA}/WB_{PULL}$ can be greater than or equal to 2.00 Further, $L_{OA}/WB_{PULL}$ can be greater than or equal to 2.05, such as greater than or equal to 2.10, greater than or equal to 2.15, greater than of equal to 2.20, greater than or equal to 2.25, greater than or equal to 2.30, greater than or equal to 2.35, or greater than or equal to 2.40. In another aspect, $L_{OA}/WB_{PULL}$ can be less than or equal t 3.00. Moreover, $L_{OA}/WB_{PULL}$ can be less than or equal to 2.95, such as less than or equal to 2.90, less than or equal to 2.85, less than or equal to 2.80, less than or equal to 2.75, less than or equal to 2.70, less than or equal to 2.65, less than or equal to 2.60, less than or equal to 2.55, less than or equal to 2.50, or less than or equal to 2.45. In still another aspect, $L_{OA}/WB_{PULL}$ can be within a range between, and including, any of the values of $L_{OA}/WB_{PULL}$ described herein.

The ratio of $L_{OA}$ to $WB_{PUSH}$, $L_{OA}/WB_{PUSH}$ can be greater than or equal to 1.50. Further, $L_{OA}/WB_{PUSH}$ can be greater than or equal to 1.55, such as greater than or equal to 1.60, greater than or equal to 1.65, greater than or equal to 1.70, greater than or equal to 1.75, greater than or equal to 1.80, greater than or equal to 1.85, greater than or equal to 1.90, or greater than or equal to 1.95. In another aspect, $L_{OA}/WB_{PUSH}$ can be less than or equal to 2.50. Moreover, $L_{OA}/WB_{PUSH}$ can be less than or equal to 2.45, such as less, than or equal to 2.40, less than or equal to 2.35, less than or equal to 2.30, less than or equal to 2.25, less than or equal to 2.20, less than or equal to 2.15, less than or equal to 2.10, less than or equal to 2.05, or less than or equal to 2.00. In still another aspect, $L_{OA}/WB_{PUSH}$ can be within a range between, and including, any of the values of $L_{OA}/WB_{PUSH}$ described herein.

Further, as illustrated in FIG. 40, the infant car seat carrier assembly 4000 is slightly taller than the infant car seat 3900. As such, $H_{OA}$ is greater than $H_{ICS}$. Moreover, a ratio of $H_{OA}$ to $H_{ICS}$, $H_{OA}/H_{ICS}$ can be greater than or equal to 1.10. Further, $H_{OA}/H_{ICS}$ can be greater than or equal to 1.15, such as greater than or equal to 1.20, greater than or equal to 1.25, or greater than or equal to 1.30. In another aspect, $H_{OA}/H_{ICS}$ can be less than or equal to 1.50, such as less than or equal to 1.45, less than or equal to 1.40, or less than or equal to 1.35. In another aspect, $H_{OA}/H_{ICS}$ can be within a range between, and including, any of the minimum and maximum values of $H_{OA}/H_{ICS}$ described herein.

In a particular aspect, the infant car seat 3900 can have a weight, $WW_{ICS}$, and $WW_{ICS}$ can be less than or equal to 15 pounds. Further, $WW_{ICS}$ can be less than or equal to 14 pounds, such as less than or equal to 13 pounds, less than or equal to 12 pounds, less than or equal to 11 pounds, less than or equal to 10 pounds, or less than or equal to 9 pounds. In another aspect, $WW_{ICS}$ can be greater than or equal 4 pounds. Moreover, $W_{CSC}$ can be greater than or equal to 5 pounds, such as greater than or equal to 6 pounds, greater than or equal to 7 pounds, or greater than or equal to 8 pounds. In yet another aspect, $WW_{ICS}$ can be within a range between and including, any of the maximum and minimum values of $WW_{ICS}$ described herein.

In another aspect, a ratio of $W_{CSC}$ to $WW_{ICS}$, $W_{CSC}/WW_{ICS}$ can be less than or equal to 2.0. Further, $W_{CSC}/WW_{ICS}$ can be less than or equal to 1.9, such as less than or equal to 1.8, less than or equal to 1.7, less than or equal to 1.6, or less than or equal to 1.5. In another aspect, $W_{CSC}/WW_{ICS}$ can be greater than or equal to 1.0. Moreover, $W_{CSC}/WW_{ICS}$ can be greater than or equal to 1.1, such as greater than or equal to 1.2, greater than or equal to 1.3, or greater than or equal to 1.4.

Figure 41:
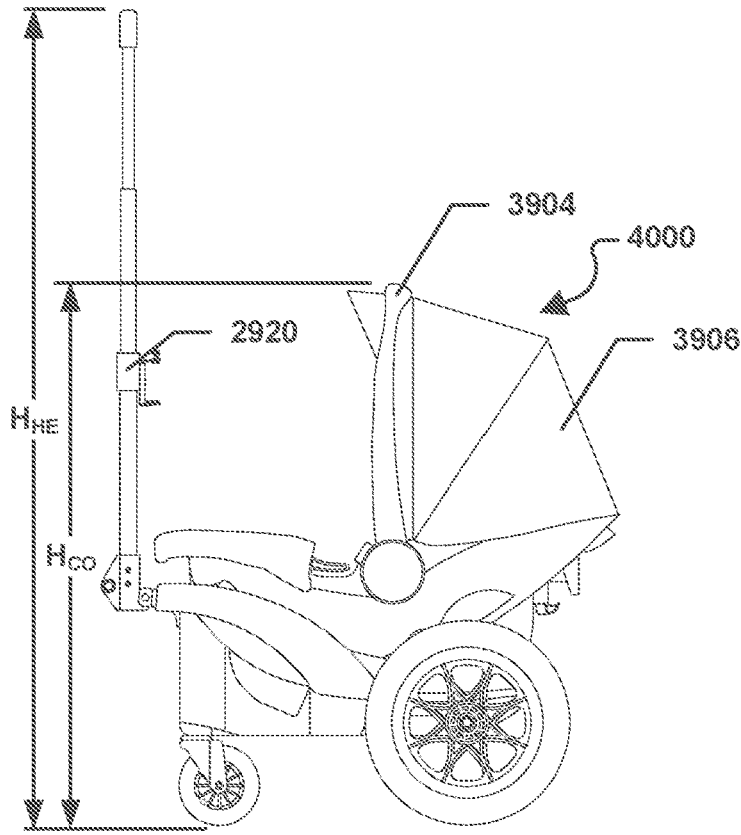

FIG. 41 shows the infant car seat carrier assembly 4000 with the pivoting/telescoping handle 2920 of the car seat carrier 2500 in the extended configuration. In the extended configuration, the pivoting/telescoping handle 2920 can have an extended height, $H_{HE}$, measured from the surface on which the infant car seat carrier assembly 4000 is resting to the top of the pivoting/telescoping handle 2920 when the pivoting/telescoping handle is in an extended configuration and in a vertical position, as shown in FIG. 41.

In a particular aspect, $H_{HE}$ can be less than or equal to 54 inches. Further, $H_{HE}$ can be less than or equal to 53.5 inches, such as less than or equal to 53.0 inches, less than or equal to 52.5 inches, less than or equal to 52.0 inches, less than or equal to 51.5 inches, less than or equal to 51.0 inches, less than or equal to 50.5 inches, less than or equal to 50.0 inches, less than or equal to 49.5 inches, less than or equal to 19.0 inches, less than or equal to 48.5 inches, or less than or equal to 48.0 inches. Additionally, in another aspect $H_{HE}$ can be greater than or equal to 36.0 inches. Moreover, $H_{HE}$ can be greater than or equal to 36.5 inches, such as greater than or equal to 37.0 inches, greater than or equal to 37.5 inches, greater than or equal to 38.0 inches, greater than or equal to 38.5 inches, greater than or equal to 39.0 inches, greater than or equal to 39.5 inches, greater than or equal to 40.0 inches, greater than of equal to 40.5 inches, greater than or equal to 41.0 inches, greater than or equal to 41.5 inches, greater than or equal to 42.0 inches, greater than or equal to 42.5 inches, greater than or equal to 43.0 inches, greater than or equal to 43.5 inches, greater than or equal to 44.0 inches, greater than or equal to 44.5 inches, greater than or equal to 45.0 inches, greater than or equal to 45.5 inches, greater than or equal to 46.0 inches, greater than or equal to 49.5 inches, greater than or equal to 47.0 inches, or greater than or equal to 47.5 inches. It is to be understood that can also be within a range between, and including, any of the maximum or minimum values of $H_{HE}$ described herein.

In another aspect a ratio of $H_{HE}$ to $H_{OA}$, $H_{HE}/H_{OA}$, can be greater than or equal to 1.00. Further, $H_{HE}/H_{OA}$ can be greater than or equal to 1.05, such as greater than or equal to 1.10, greater than or equal to 1.15, greater than or equal to 1.20, greater than or equal to 1.25, greater than or equal to 1.30, greater than or equal to 1.35, greater than or equal to 1.40, greater than or equal to 1.45, greater than or equal to 1.50, greater than or equal to 1.55, or greater than or equal to 1.6. In another aspect, $H_{HE}/H_{OA}$ can be less than or equal to 2.00. Further, $H_{HE}/H_{OA}$ can be less than or equal to 1.95, such as less than or equal to 1.90, less than or equal to 1.85, less than or equal to 1.80, less than or equal to 1.75, less than or equal to 1.70, or less than or equal to 1.65. It is to be understood that $H_{HE}/H_{OA}$ can be within a range between, and including, any of the minimum and maximum values of $H_{HE}/H_{OA}$ described herein.

Figure 42:
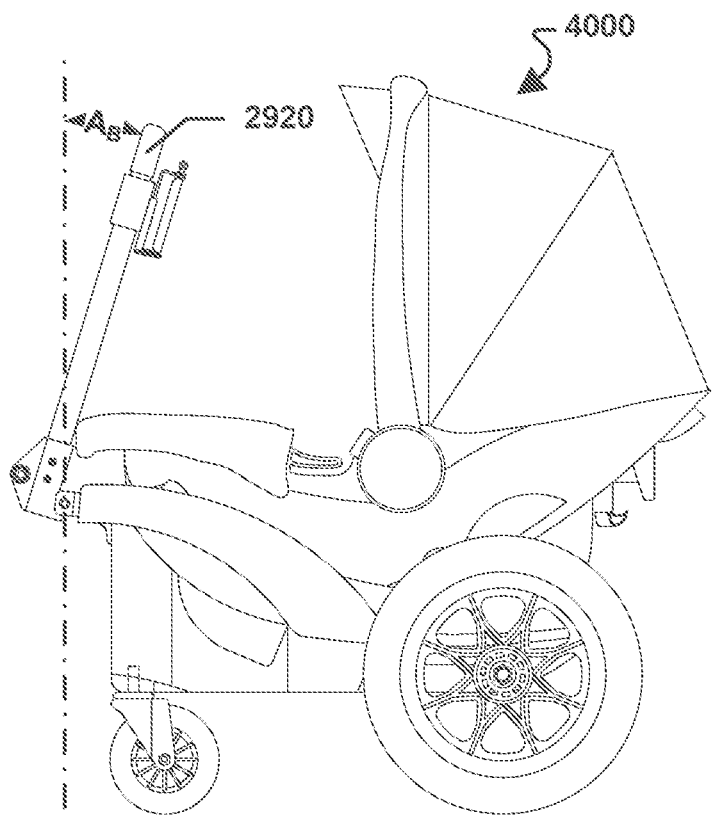

FIG. 42 show s that a smartphone 4200, or other portable electronic device, may be installed in the smartphone bracket 3100 and the pivoting/telescoping handle 2920 may be rotated to a broadcast position so that a child inside the infant car seat 3900 can view or listen to whatever is playing on the smartphone 4200. For example, nursery rhyme song videos can be streamed from a data network, e.g., a local area network (LAN) connected via a Wi-Fi connection, or a mobile telephone network connected via CDMA, GSM, LTE, etc., to the smartphone 4200 and the child inside the infant car seat 3900 can listen and/or view the nursery rhyme song videos.

Further, smartphone applications have been developed that provide child oriented content, e.g., nursery rhyme song videos, that can be broadcast via the smartphone 4200 whether or not the smartphone 4200 is connected to a data network. Other smartphone applications have been developed that provide white noise that can be soothing, to a fussy baby or a sleeping baby and can mask other noises that may otherwise wake a sleeping baby. It can be appreciated that the smartphone 4200 can be placed within the smartphone bracket 3100 so that the screen of the smartphone 4200 faces away from the pivoting/telescoping handle 2920 and toward the infant car seat 3900. Conversely, the smartphone 4200 can be placed within the smartphone bracket 3100 so that the screen of the smartphone 4200 faces toward the pivoting/telescoping handle 2920 and away from the infant car set 3900. It can also be appreciated that the pivoting/telescoping handle 2920 may be rotated to the broadcast positron whether or not the pivoting/telescoping handle 2920 is in the collapsed configuration, as shown in FIG. 42, or the extended configuration, previously described.

As illustrated in FIG. 42, in the broadcast position, the pivoting/telescoping handle 2920 can form a broadcast angle, $A_B$, with respect or an axis that extends vertically through the handle fasteners 2922, 2924. In a particular aspect, $A_B$ is formed by rotating the pivoting/telescoping handle 2920 so that it is vertical or behind the axis that extends vertically through the handle fasteners 2922, 2924.

In particular, $A_B$ can be greater than or equal to 0 degrees. Further, $A_B$ can be greater than or equal to 5 degrees, such as greater than or equal to 10 degrees, greater than or equal to 15 degrees, or greater than or equal to 20 degrees. In another aspect, $A_B$ can be less than or equal to 45 degrees. Moreover, $A_B$ can be less than or equal to 40 degrees, such as less than or equal to 35 degrees, less than or equal to 30 degrees, or less than or equal to 25 degrees. In still another aspect, $A_B$ can be within a range between, and including, any of the minimum or maximum values of $A_B$ described herein.

Figure 43:
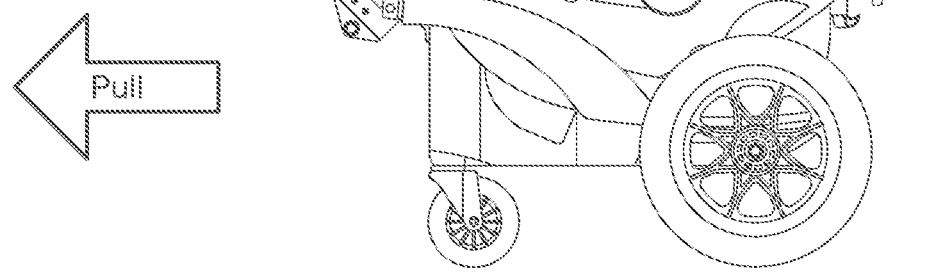
Figure 44:
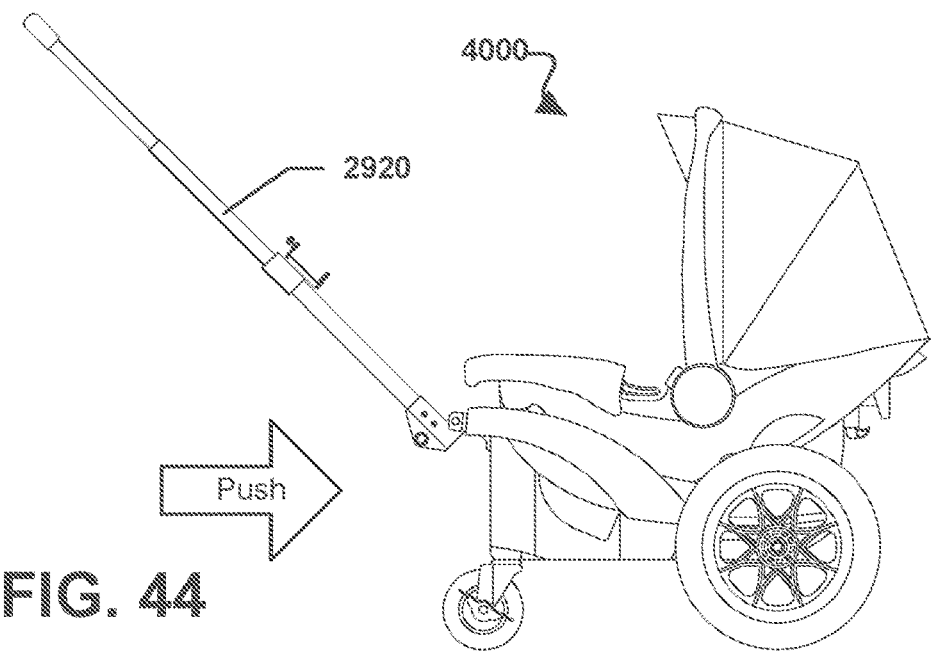
Figure 45:
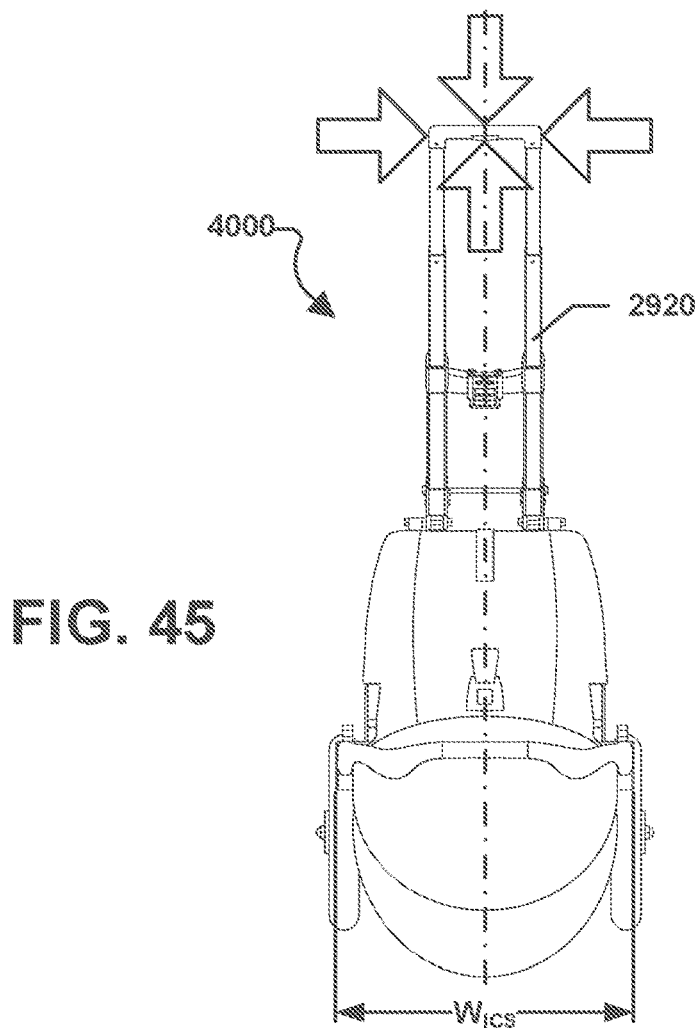
FIG. 45 includes a top plan view of a car seat carrier and a car seat in accordance with an embodiment.

FIG. 43 through 45 illustrates the infant car seat carrier assembly 4000 with the pivoting/telescoping handle 2920 in the front push/pull position. As shown in FIG. 43 and FIG. 45, with the pivoting/telescoping handle 2920 in the front push/pull position, a user can easily, with one hand on the upper handgrip 3040, pull the infant car seat carrier assembly 4000 behind him or her while walking face forward, i.e., away from the infant car seat carrier assembly 4000. Further, as shown in FIG. 44 and FIG. 45, with the pivoting/telescoping handle 2920 in the front push/pull position, a user can easily, with one on the upper handgrip 3040, push the car seat carrier assembly 4000 in front of him or her while walking facing forward, i.e., toward the infant car seat carrier assembly 4000.

Moreover, as indicated in FIG. 45 the upper handgrip 3040 can be centered along a central axis 4500. In addition, the upper handgrip 3040 can be narrower than $T_F$ and $T_R$. A user can provide all the inputs to push, pull, and steer the infant car seat carrier assembly 4000 from the upper handgrip 3040. For example, while grasping the upper handgrip 3040 with a single hand, the user can push and steer the infant car seat carrier assembly 4000 in font of him or her while facing the infant car seat carrier assembly 4000 with the car seat assembly 4000 facing the user. On the other hand, while grasping the upper handgrip 3040 with a single hand, the user can pull and steer the infant car seat carrier assembly 4000 behind him or her while facing away from the infant car seat carrier assembly 4000 with the infant car seat assembly 4000 facing the user. The ability to easily push and pull the infant car seat carrier assembly 4000 provides the user with the ability to push the infant car seat carrier assembly 4000 or pull the infant car seat carrier assembly 4000.

FIG. 45 also indicates that the infant car seat 3900 can have an overall width, $W_{ICS}$, that is measured through the widest point of the infant car seat 3900. In a particular aspect, $W_{ICS}$ can be less than or equal to 20 inches. Further, $W_{ICS}$ can be less than or equal to 19.5 inches, such as less than or equal to 19.0 inches, less than or equal to 18.5 inches, less than or equal to 18.0 inches, or less than or equal to 17.5 inches. In another aspect, $W_{ICS}$ can be greater than or equal or 15.0 inches. Moreover, $W_{ICS}$ can be greater than or equal to 15.5 inches, such as greater than or equal to 16.0 inches, greater than or equal to 16.5 inches, or greater than or equal to 17.0 inches. Further, $W_{ICS}$ can be within a range between, and including, any of the maximum and minimum values of $W_{ICS}$ described herein.

In another aspect, a ratio of $W_O$ to $W_{ICS}$, $W_O/W_{ICS}$ can be less than or equal to 1.4. Further, $W_O/W_{ICS}$ can be less than or equal to 1.35, such as less than or equal to 1.30, less than or equal to 1.25, less than or equal to 1.20, or less than or equal to 1.15. In yet another aspect, $W_O/W_{ICS}$ can be greater than or equal to 0.70. Moreover, $W_O/W_{ICS}$ can be greater than or equal to 0.75, such as greater than or equal to 0.80, greater than or equal to 0.85, greater than or equal to 0.90, greater than or equal to 0.95, greater than or equal to 1.00, greater than or equal to 1.05, or greater than or equal to 1.10. In yet another aspect, $W_O/W_{ICS}$ can be within a range between, and including, any of the maximum and minimum values of $W_O/W_{ICS}$ described herein.

In another aspect, a ratio of $T_F$ to $W_{ICS}$, $T_F/W_{ICS}$ can be less than or equal to 0.65. Further, $T_F/W_{ICS}$ can be less than or equal to 0.60, such as less than or equal to 0.55, less than or equal to 0.50, or less than or equal to 0.45. In another aspect, $T_F/W_{ICS}$ can be greater than, or equal to 0.25 Moreover, $T_F/W_{ICS}$ can be greater than or equal to 0.30, such as greater than or equal to 0.35, or greater than or equal to 0.40. In still another aspect, $T_F/W_{ICS}$ can be within a range between and including, any of the maximum or minimum values of $T_F/W_{ICS}$ described herein.

In yet another aspect, a ratio of $T_R$ to $W_{ICS}$, $T_R/W_{ICS}$ can be less than or equal to 1.25. Further, $T_R/W_{ICS}$ can be such as less than or equal to 1.15, less than or equal to 1.10, less than or equal to 1.05, or less than or equal to 1.00. In another aspect, $T_R/W_{ICS}$ can be greater than or equal to 0.75. Moreover, $T_R/W_{ICS}$ can be greater than or equal to 0.80, such as greater than or equal to 0.85 greater than or equal to 0.90, or greater than or equal to 0.95. In still another aspect, $T_R/W_{ICS}$ can be within a range between, and including, any of the maximum or minimum values of $T_R/W_{ICS}$ described herein.

FIG. 46 further indicates that the pivoting/telescoping handle 2920 can be further moved to a rear push position. In the rear push position, the pivoting/telescoping handle 2920 can be rotated toward the rear end 2508 of the car seat wagon 2500, e.g., until the pivoting/telescoping handle 2920 is adjacent to, or in contact with, a portion of the infant car seat 3900. Specifically, the pivoting/telescoping handle 2920 will be rotated so that the pivoting/telescoping handle 2920 is behind the axis that extends vertically through the handle fasteners 2922, 2924 about which the pivoting/telescoping handle 2920 pivots or rotates. Further, the pivoting/telescoping handle 2920 can form an angle, $A_{RP}$, with respect to the axis that extends vertically through the handle fasteners 2922, 2924. Moreover, in the rear push position the upper handgrip 3040 is behind the axis that extends vertically through the handle fasteners 2922, 2924 and the upper handgrip 3040 is directly above the carrier body 2502.

In a particular aspect, $A_{RP}$ can be greater or equal to than 10 degrees. Further, $A_{RP}$ can be greater or equal to than 15 degrees, such as greater than or equal to 20 degrees, greater than or equal to 25 degrees, greater than or equal to 30 degrees, or greater than or equal to 35 degrees. In another aspect, $A_{RP}$ can be less than or equal to 65 degrees. Moreover, $A_{RP}$ can be less than or equal to 60 degrees, such as less than or equal to 55 degrees, less than or equal to 50 degrees, less than or equal to 45 degrees, or less than or equal to 40 degrees. In yet another aspect, $A_{RP}$ can be within a range between, and including, any of the minimum and maximum values of $A_{RP}$ described herein.

With the pivoting/telescoping handle 2920 in the rear push position, illustrated in FIG. 46 a use can grasp the upper handgrip 3040 with one hand and push the infant car seat carrier assembly 4000 in the direction as indicated by arrow 4600, i.e., forward with the infant car seat 1500 facing in the same direction as the user is walking. The user can walk behind the infant car seat carrier assembly 4000 as he or she pushes the infant car seat carrier assembly 4000 by the pivoting/telescoping handle 2920. Alternatively, the user can walk beside the infant car seat carrier assembly 4000 as her or he pushes the infant car seat carrier assembly 4000 by the pivoting/telescoping handle 2920.

Accordingly, as shown in the various figures, the pivoting/telescoping handle 2920 of the car seat carrier 2500 can be rotated around the handle fasteners 2922, 2924 to one of many different positions relative to the carrier body 2502. Specifically, for storing the car seat carrier 2500, the pivoting/telescoping handle 2920 can be rotated to the first stowage position or the second stowage position. To push the car seat carrier 2500 with the infant car seat 3900 facing the user, the pivoting/telescoping handle 2920 can be rotated to the front push/pull position. Further, to pull the car seat carrier 2500 with the infant car seat 3900 facing the user, the pivoting/telescoping handle 2920 can be also be rotated to the front push/pull position. To push the car seat carrier 2500 with the infant car seat 3900 facing away from the user, the pivoting/telescoping handle 2920 can be rotated to the rear push position. Further, to provide entertainment, or white noise, to an infant within the infant car seat 3900, the pivoting/telescoping handle 2920 can be rotated to the broadest position and the smartphone 4200 can be placed within the smartphone bracket 3100.

Referring now to FIG. 47, with the pivoting/telescoping handle 2920 in a vertical position, the car seat carrier 2500 can have a footprint, $FP_{CSC}$, that includes all parts of the car seat carrier 2500 as indicated by the cross-hatched area of FIG. 47. In a particular aspect, $FP_{CSC}$ can be greater than or equal to 300 in$^2$. Further, $FP_{CSC}$ can be greater than or equal to 305 in$^2$, such as greater than or equal to 310 in$^2$, greater than or equal to 315 in$^2$, greater than or equal to 320 in$^2$, greater than or equal to 325 in$^2$, greater than or equal to 330 in$^2$, greater than or equal to 335 in$^2$, greater than or equal to 340 in², or greater than or equal to 345 in². In another aspect, $FP_{CSC}$ can be less than or equal to 400 in². Moreover, $FP_{CSC}$ can be less than or equal to 395 in², such as less than or equal to 390 in², less than or equal to 385 in², less than or equal to 380 in², less than or equal to 385 in², less than or equal to 380 in², less than or equal to 375 in², less than or equal to 370 in², less than or equal to 365 in², less than or equal to 360 in², less than or equal to 355 in², or less than or equal to 350 in². In another aspect, $FP_{CSC}$ can be within a range between, and including, any of the minimum and maximum values of $FP_{CSC}$ described herein.

FIG. 48 shows that the infant car seat 3000 can also have a footprint, $FP_{ICS}$, as indicated by the cross-hatched area of FIG. 48. It is to be understood that the footprint of the infant car seat 3900, as shown, is the footprint of the infant car seat 3900 with the handle 3904 in the upright position and the canopy 3906 fully raised, as shown in side plan view in FIG. 40.

In a particular aspect, $FP_{ICS}$ can be greater than or equal to 300 in². Further, $FP_{ICS}$ can be greater than or equal to 305 in², such as greater than or equal to 310 in², greater than or equal to 315 in², greater than or equal to 320 in², greater than or equal to 325 in², greater than or equal to 330 in², greater than or equal to 335 in², greater than or equal to 340 in², greater than or equal to 345 in², greater than or equal to 350 in², or greater than or equal to 355 in². In another aspect, $FP_{ICS}$ can be less than or equal to 400 in². Moreover, $FP_{ICS}$ can be less than or equal to 395 in², such as less than or equal to 390 in², less than or equal to 385 in², less than or equal to 380 in², less than or equal to 375 in², less than or equal to 370 in², less than or equal to 375 in², or less than or equal to 365 in². In another aspect, $FP_{ICS}$ can be within a range between, and including, any of the minimum and maximum values of $FP_{ICS}$ described herein.

In a particular aspect, $FP_{CSC}$ is nearly equal to $FP_{ICS}$. Further, a ratio of $FP_{CSC}$ to $FP_{ICS}$, $FP_{CSC}/FP_{ICS}$, can be greater than or equal to 0.75. Further, $FP_{CSC}/FP_{ICS}$ can be greater than or equal to 0.80, such as greater than or equal to 0.85, greater than or equal to 0.90, greater than or equal to 0.95 greater than or equal to 0.96, greater than or equal to 0.97, greater than or equal to 0.98, greater than or equal to 0.99, greater than or equal to 1.00, or greater than or equal to 1.01. In another aspect, $FP_{CSC}/FP_{ICS}$ can be less than or equal to 1.25. Moreover, $FP_{CSC}/FP_{ICS}$ can be less than or equal to 1.20, such as less than or equal to 1.15, less than or equal to 1.10, less than or equal to 1.09, less than or equal to 1.08, less than or equal to 1.07, less than or equal to 1.06, less than or equal to 1.05, less than or equal to 1.04, less than or equal to 1.03, or less than, or equal to 1.02. In another particular aspect, $FP_{CSC}/FP_{ICS}$ can be within a range between, or including, any of the minimum or maximum values of $FP_{CSC}/FP_{ICS}$ described herein.

FIG. 48 also shows that the footprint of the infant car seat 3900 overlies a majority of the footprint of the car seat wagon 2500. As indicated by the dashed lines, the infant car seat 3900 overlies at least 75% of $FP_{CSC}$ of the car seat carrier 2500. Further, the infant car seat 3900 can overlie at least 76% of $FP_{CSC}$, such as at least 77% of $FP_{CS}$, at least 78% of $FP_{CSC}$, at least 79% of $FP_{CSC}$, at least 80% of $FP_{CSC}$, at least 81% of $FP_{CSC}$, at least 82% of $FP_{CSC}$, at least 83% of $FP_{CSC}$, at least 84% of $FP_{CSC}$, at least 85% of $FP_{CSC}$ or at least 86% of $FP_{CSC}$. In another aspect, the infant car seat 3900 can overlie less than 100% of $FP_{CSC}$. Moreover, the infant car seat 3900 can overlie less than 99% of $FP_{CSC}$, such as less than 98% $FP_{CSC}$, less than 97% $FP_{CSC}$, less than 96% $FP_{CSC}$, less than 95% $FP_{CSC}$, less than 94% $FP_{CSC}$, less than 93% $FP_{CSC}$, less than 92% $FP_{CSC}$, less than 91% $FP_{CSC}$, less than 90% $FP_{CSC}$, less than 89% $FP_{CSC}$, less than 88% $FP_{CSC}$, or less than 87% $FP_{CSC}$. In another aspect, the % of overlie of the infant car seat 3900 relative to the car seat wagon 2500 can be within a range between, and including, any of the % values of overlie described herein.

Figure 49:
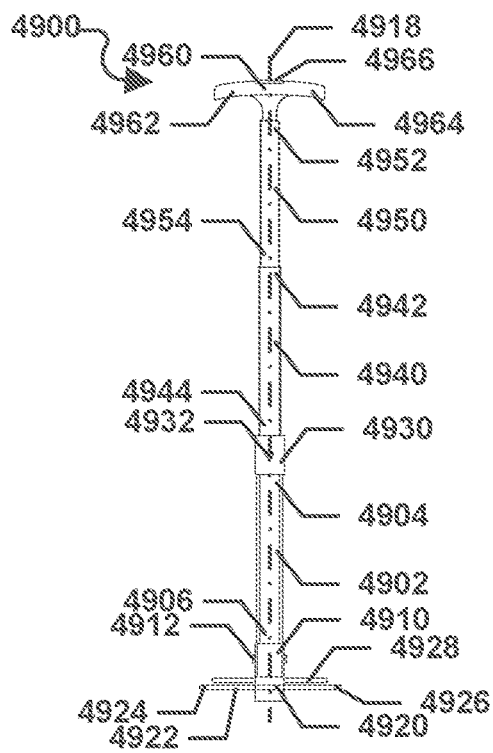
FIG. 49 includes an illustration of a rear plan view of a handle for a car seat carrier at accordance with an embodiment.
Figure 50:
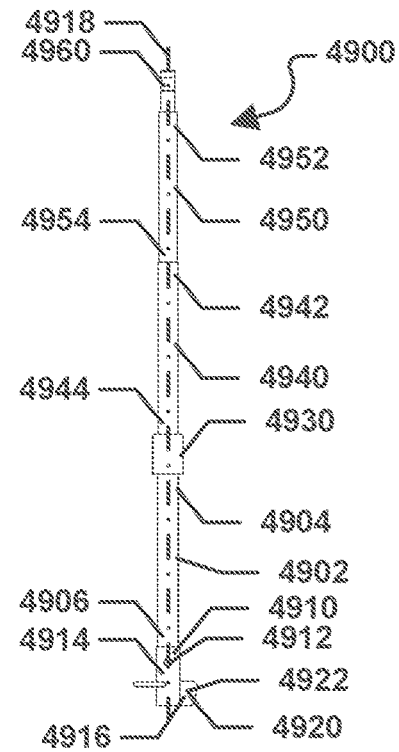
FIG. 50 includes an illustration of a side plan view of a handle for a car seat carrier in accordance with an embodiment.

FIG. 49 and FIG. 50 show another pivoting/telescoping handle 4900 that can be used with the car seat carrier 100, 2500 in lieu of the pivoting/telescoping handle 2920 previously described. As shown in FIG. 49 and FIG. 50, the pivoting/telescoping handle 4900 can include a lower handle portion 4902 having a proximal end 4904 and a distal end 4906. A lower bracket 4910 may be connected, or otherwise coupled, to the distal end 1906 of the lower handle portion 4902 by at least one fastener 4912. As depicted in FIG. 50, the lower bracket 4910 is generally L shaped and can include a stem 4914 and a lower arm 4916 that can extend from the stem 4914 away from a central longitudinal axis 4918 of the pivoting/telescoping handle 4900. The lower arm 4916 can be generally perpendicular to the stem 4914 of the lower bracket 4910.

FIG. 49 also shows that the arm 4916 may be formed with a lateral bore 4920 that can be sized to receive a mounting rod 4922 in an interference fit. As such, the mounting rod 4922 may not rotate within the arm 4916. Further, the mounting, rod 4922 may not translate linearly within the arm 4916, i.e., along a longitudinal axis of the mounting rod 4922.

FIG. 49 indicates that the mounting rod 4922 can include a first end 4924 and a second end 4926. In a particular aspect, the ends 4924, 4926 can be threaded and can be configure to extend through one or more handle mounting brackets on a car seat carrier, e.g., the car seat carrier 100, 2500 described herein. On or more threaded nuts can be installed on the ends 4924, 4926 of the mounting rod 4922 to secure the mounting rod 4922 on the one or more handle mounting brackets and secure the pivoting/telescoping handle 4900 to the car seat carrier.

As shown in FIG. 49 and FIG. 50, the pivoting/telescoping handle 520 can include a lower handgrip 4928 extending from the stem 4914 of the lower bracket 4910 in a direction opposite the arm 4916. In a particular aspect, the lower handgrip 4928 can be substantially perpendicular to the central longitudinal axis 4918 of the pivoting/telescoping handle 4900.

In a particular aspect, the lower handgrip 4928 can be used to facilitate picking up a car seat carrier, to which the pivoting/telescoping handle 5100 is attached, in order to place the car seat carrier in a car, e.g., in the trunk of the car. In another aspect, the lower handgrip 4928 can be used as an attachment point for a name plate, a storage pouch, a leash or some other attachment.

As shown in FIG. 49 and FIG. 50, the pivoting/telescoping handle 4900 can further include an intermediate collar 4930 installed on the proximal end 4904 of the lower handle portion 4902 of the pivoting/telescoping handle 4900. It can be appreciated that smartphone bracket, e.g., the smartphone bracket 700, 3100, described herein, can be attached to the intermediate collar 4930. In another aspect, a cup holder, a bottle holder, or some other bracket can be attached to the intermediate collar 4930. FIG. 49 further shows that the intermediate collar 4930 can be held in place on the proximal end 4902 of the lower handle portion 4902 of the pivoting/telescoping handle 4900 via a fastener 4932.

FIG. 49 and FIG. 50 further illustrate that the pivoting/telescoping handle 4900 can include an intermediate handle portion 4940 having a proximal end 4902 and a distal end 4904. The intermediate handle portion 4940 can fit into, and side within, the lower handle portion 4902. The pivoting/telescoping handle 4900 can also include an upper handle portion 4950 having a proximal end 4902 and a distal end 4904. The upper handle portion 4950 can fit into, and slide within, the intermediate handle portion 4940.

As shown in FIG. 49 and FIG. 50, the pivoting/telescoping handle 4900 can further include a handgrip 4960 coupled to the proximal end 4952 of the upper handle portion 4950. Specifically, the handgrip 4960 can be T-shaped and can include a first arm 4962 extending away from the central axis 4918 and a second arm 4964 extending away from the central axis 4918 opposite the first arm 4962.

FIG. 49 and FIG. 50 also indicate that the handgrip 4960 can include a release button 4964 that is coupled to an internal locking mechanism (not shown). The pivoting/telescoping handle 4900 can be locked in a collapsed configuration (not shown) and locked in an extended configuration, as illustrated in FIG. 49 and FIG. 50. By depressing the release button 4960, the pivoting/telescoping handle 4960 can be unlocked and moved between the collapsed configuration and the extended configuration.

For example, when the pivoting/telescoping handle 4900 is fully collapsed it can automatically lock in the collapsed configuration. Pressing the release button 4960 will unlock the pivoting/telescoping handle 4900 and allow the user to move the pivoting/telescoping handle 4900 to the extended configuration. When the pivoting/telescoping handle 4900 is fully extended it will automatically lock in the extended configuration until the user presses the release button 4960 to unlock the pivoting/telescoping handle 4900 and return it to the collapsed configuration.

Figure 51:
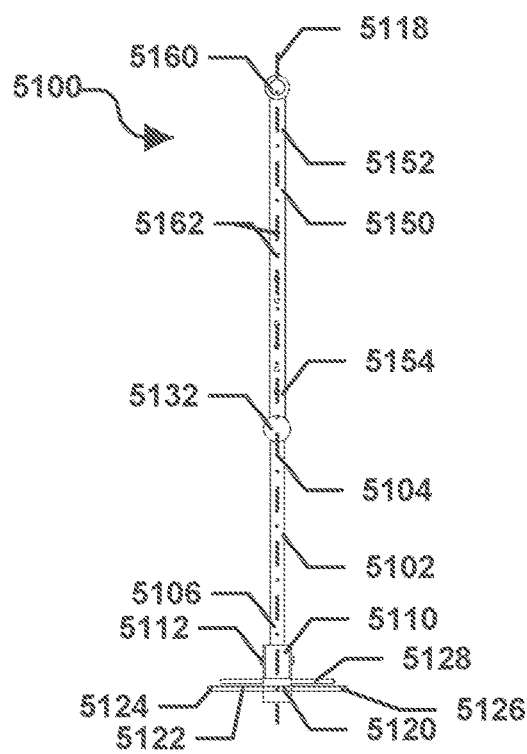
FIG. 51 includes an illustration of a rear plan view of a handle for a car seat carrier in accordance with an embodiment.
Figure 52:
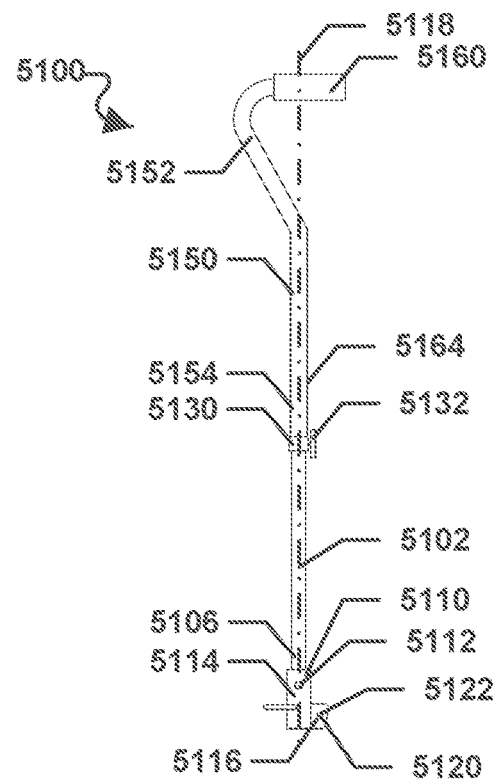
FIG. 52 includes an illustration of a side plan view of a handle for a car seat carrier in accordance with an embodiment.

FIG. 51 and FIG. 52 show another pivoting/telescoping handle 5100 that can be used with the car seat carrier 100, 2500 in lieu of the pivoting/telescoping handle 520, 2920 previously described. As shown in FIG. 51 and FIG. 52, the pivoting/telescoping handle 5100 can include a lower handle portion 5102 having a proximal end 5104 and a distal end 5106. A lower bracket 5110 may be connected, or otherwise coupled, to the distal end 5106 of the lower handle portion 5102 by at least one fastener 5112. As depicted in FIG. 52 the lower bracket 5110 is generally L shaped and can include a stem 5114 and a lower arm 5116 that can extend from the stem 5114 away from a central longitudinal axis 5118 of the pivoting/telescoping handle 5100. The lower arm 5116 can be generally perpendicular to the stem 5114 of the lower bracket 5110.

FIG. 51 also shows that the arm 5116 may be formed with a lateral bore 5120 that can be sized to receive, a mounting rod 5122 in an interference fit. As such, the mounting rod 5122 may not rotate within the arm 5116. Further, the mounting rod 5122 may not translate linearly within the arm 5116, i.e., along a longitudinal axis of the mounting rod 5122.

FIG. 51 indicates that the mounting rod 5122 can include a first end 5124 and a second end 5126. In a particular aspect, the ends 5124, 5126 can be threaded and can be configured to extend through one or more handle mounting brackets on a car seat carrier, e.g., the car seat carrier 100, 2500 described herein. On or more threaded nuts can be installed on the ends 5124, 5126 of the mounting rod 5122 to secure the mounting rod 5122 on the one or more handle mounting brackets and secure the pivoting/telescoping handle 5100 to the car seat carrier.

As shown in FIG. 51 and FIG. 52, the pivoting/telescoping handle 520 can include a lower handgrip 5128 extending from the stem 5114 of the lower bracket 5110 in a direction opposite the arm 5116. In a particular aspect, the lower handgrip 5128 can be substantially perpendicular to the central longitudinal axis 5118 of the pivoting/telescoping handle 5100.

In a particular aspect, the lower handgrip 5128 can be used to facilitate picking up a car seat carrier, to which the pivoting/telescoping handle 5100 is attached, in order to place the car seat carrier in a car, e.g., in the trunk of the car. In another aspect, the lower handgrip 5128 can be used as an attachment point for a name plate, a storage pouch, a leash, or some other attachment.

As shown in FIG. 51 and FIG. 52, the pivoting/telescoping handle 5100 can further include an intermediate collar 5130 installed on the proximal end 5104 of the lower handle portion 5102 of the pivoting/telescoping handle 5100. It can be appreciated that a smartphone bracket, e.g., the smartphone bracket 700, 3100, described herein, can be attached to the intermediate collar 5130. In another aspect, a cup holder, a bottle holder, or some other bracket can be attached to the intermediate collar 5130. In a particular aspect, the intermediate collar 5130 can be press fitted onto the proximal end 5104 of the lower handle portion 5102. FIG. 52 further shows that the intermediate collar 5320 can include a locking knob 5132 that is threadably engaged with the intermediate collar 5320. The locking knob 5132 can extend through the intermediate collar 5320 and a portion of the locking knob 5132 can be engage the lower handle portion 5102 and lock the lower handle portion 5102 in place when the locking knob 5132 is rotated and tightened.

FIG. 51 and FIG. 52 also show that the pivoting/telescoping handle 5100 can include an upper handle portion 5150 having a proximal end 5102 and a distal end 5104. The upper handle portion 5150 can fit over the lower handle portion 5102. The lower handle portion 5102 can glide within the upper handle portion 5150.

It can be appreciated that any of the pivoting/telescoping handles 520, 4900, 5100 can be attached to the carrier body 102, 2502 of the car seat carrier 100, 2500 near the rear end 108, 2508 of the carrier body 102, 2502.

With the configuration of structure described herein the car seat carrier according to any of the aspects, can provide a car seat carrier that is relatively low to the ground with a relatively low center of gravity. This can provide a car seat carrier that is difficult to tip over. Further, this can provide a car seat carrier that a user can see into and keep an eye on an infant wherein while sitting in a chair, couch, or other low seating element. Moreover, while seated, a user can gently roll the car seat carrier back and forth to provide soothing motion for an infant placed in an infant car seat engaged with the car seat carrier. Additionally, the configuration of structure described herein, can provide a car seat carrier that is relatively compact and can fit in areas that, traditional strollers, or car seat carriers, cannot fit. For example, the car seat carrier according to one or more aspects herein can fit in the aisle on a bus, a train, an airplane, or other narrow aisle. Further, the car seat earlier can fit on a subway car without taking up much more space than a car seat that may be carried by a user. In another aspect, the car seat carrier can fit into the overhead compartment on most passenger airplanes. The car seat carrier according to one or more embodiments described herein can provide a car seat carrier that is human powered and non-motorized. Further, the placement of the wheels and handle results in a car seat carrier that is very agile, nimble, and relatively easy to maneuver around obstacles and in locations that may be difficult to maneuver a typical stroller. For example, the car seat carrier is relatively easy to push or pull on a sidewalk, around light posts, around mailboxes, around clothing racks in a store, inside a house, or at other locations that are filled with obstacles that hinder the use of a conventional stroller. Further, the bi-directional usability of the car beat carrier provides a car seat carrier that can be easily pushed or pulled. In addition, the placement of the wheel assemblies relative to each other on the carrier body of the car seat carrier provides a car seat carrier that can quickly be rotated from the push position to the pull position. As such, if a user is pushing his child in an infant car seat lockably installed within the car seat carrier and the sunlight is shining in the child's face, the user can quickly rotate the car seat carrier, and the infant car seat therein, one-hundred and eighty degrees (180°) from the push position to the pull position so that the sunlight is no longer shining in the child's face.

Additionally the car seat carrier, according to one or more aspects described herein, provides a relatively easy way to transport an infant car seat to an automobile or other vehicle. At the vehicle, the user can disengage the infant car seat from the car seat carrier and engage the infant car seat with a detachable car seat base properly installed within the vehicle. To stow the car seat carrier in the vehicle trunk, or other space, the user can simply move the pivoting/telescoping handle to the collapsed configuration and rotate the pivoting/telescoping handle to the first stowage position, i.e., so that the pivoting/telescoping handle is folded back over the top of the carrier body. The user may then easily lift the car seat carrier and place it in the trunk of the vehicle for storage. To prevent the car seat carrier from rolling, around within the truck of the vehicle, the front wheel assemblies can be locked. When the user arrives at his or her destination, he or she can easily lift the car seat carrier from the trunk of the vehicle, rotate and extend the handle to the push/pull position, release the infant car seat from the detachable car seat base in the vehicle, and engage the infant car seat with the car seat carrier. Using the car seat carrier is quite easy. There is no need to collapse or expand a mechanically complex framework that is typically associated with a folding stroller. Many folks will leave their conventional folding stroller at home because it can be relatively difficult to fold and unfold. Also a conventional folding stroller can be relatively bulky, heavy, and difficult for some smaller users to pick up and easily place the folded stroller in the trunk of a vehicle.

Moreover, since the car seat carrier is specifically designed to receive the infant car seat in a manner similar to that of the detachable car seat base, the infant car seat is securely locked within the car seat carrier and the risk of the infant car seat from falling out of the car seat carrier is minimized. Further, using the car seat carrier, according to one or more of the aspects described herein, in conjunction with an infant car seat carrier provides a very safe way to transport an infant child that is properly buckled in the infant car seat. Most infant car seats are crash tested and are designed to withstand car crashes white protecting the infant therein, if a user is pushing bis or her child around the neighborhood, in a parking lot, or other location, and the infant car seat carrier assembly is impacted by a motor vehicle, a bicycle, or other vehicle, the child is less likely to get injured when compared with a conventional stroller or conventional wagon which is not as rigorously tested as a car seat and is not designed to survive an automobile accident. It can be appreciated that the car seat carrier can be integrally formed with the infant car seat.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

EMBODIMENTS

Embodiment 1. A car seat carrier includes a carrier body sized and shaped to receive a complementary sized and shaped car seat, at least one rear wheel assembly attached to the carrier body, wherein the at least one rear wheel assembly includes a fixed wheel; at least one front wheel assembly attached to the carrier body wherein the at least one front wheel assembly includes a swiveled wheel; and at least one pivoting handle extending from the carrier body.

Embodiment 2. A car seat carrier includes a carrier body shaped to receive at least a portion of a complementary shaped car seat, at least one rear wheel assembly attached to the carrier body, wherein the at least one rear wheel assembly includes a fixed wheel that rotates around a single axis, at least one front wheel assembly attached to the carrier body, wherein the at least one front wheel assembly includes a swiveled wheel that rotates around two axes; and a pivoting handle affixed to the carrier body near the at least one front wheel, wherein the car seat wagon is configured to be pushed by a user with one hand with the at least one front wheel trailing the at least one rear wheel or pulled by the user with one hand with the at least one rear wheel trailing the at least one front wheel.

Embodiment 3. A car seat carrier includes a carrier body sized and shaped to receive a complementary sized and shaped child car seat, the carrier body defining a front end and a rear end; at least one front wheel assembly attached to the carrier body near the front end, wherein the front wheel rotates about two axes; at least one rear wheel attached to the carrier body near the rear end, wherein the rear wheel assembly rotates about the one axis; and a pivoting handle attached to the carrier body near the front end of the carrier body, wherein the pivoting handle pivots between multiple positions relative to the carrier body and wherein the pivoting handle is expandable and collapsible between different lengths.

Embodiment 4. The car seat carrier according to any of embodiments 1, 2 or 3, wherein the body includes a first outer side wall, a first inner side wall, and a first cavity formed between the first outer side wall and the first inner side wall, wherein the first cavity is sized and shaped to receive a complimentary shaped portion of a body of an infant car seat.

Embodiment 5. The car seat carrier according to embodiment 4, wherein the body includes a second outer side wall opposite the first outer side wall, a second inner side wall opposite the first inner side, and a second cavity formed between the second outer side wall and the second inner side wall, wherein the second cavity is sized and shaped to receive a complementary shaped portion of a body of an infant car seat.

Embodiment 6. The car seat carrier according to any of embodiments 1, 2 or 3, wherein the pivoting handle is movable to a front push/pull position in which the pivoting handle is extended and rotated in front of a vertical axis extending through a handle fastener about which the pivoting handle rotates.

Embodiment 7. The car seat carrier according to embodiment 6, wherein in the front push/pull position the pivoting handle forms an angle, $A_{FPP}$, with respect to the vertical axis and $A_{FPP}$ is greater than or equal to 0 degrees.

Embodiment 8. The car seat carrier according to embodiment 7, wherein $A_{FPP}$ is greater than or equal 5 degrees, such as greater than or equal to 10 degrees, greater than or equal to 15 degrees, greater than or equal to 20 degrees, greater than or equal to 25 degrees, greater than or equal to 30 degrees, greater than or equal to 35 degrees, greater than or equal to 40 degrees, or greater than or equal to 45 degrees.

Embodiment 9. The car seat carrier according to embodiment 8, wherein $A_{FPP}$ is be less than or equal 90 degrees.

Embodiment 10. The car seat carrier according to embodiment 9, wherein $A_{FPP}$ is be less than or equal 85 degrees, such as less than or equal to 80 degrees, less than or equal to 75 degrees, less than or equal to 70 degrees, less than or equal to 65 degrees, less than or equal to 60 degrees, less than or equal to 55 degrees, or less than or equal to 50 degrees.

Embodiment 11. The car seat carrier according to embodiment 6, wherein when the pivoting handle is in the front push/pull position, the car seat carrier is configured to the pushed by a user while the user is facing toward the car seat carrier.

Embodiment 12. The car seat carrier according to embodiment 11, wherein when the pivoting handle is in the front push/pull position, the car seat carrier is configured to be pulled by a user while the user is facing away from the car seat carrier.

Embodiment 13. The car seat earlier according to any of embodiments 6, wherein the pivoting handle is movable to a first stowage position, wherein the pivoting handle is collapsed and rotated over the carrier body of the car seat carrier behind a vertical axis extending through a handle fastener about which the pivoting handle rotates.

Embodiment 14. The car seat carrier according to embodiment 13, wherein in the first stowage position, the pivoting handle an angle, $A_{S1}$, with respect to the vertical axis and $A_{S1}$ is greater than or equal to 60 degrees.

Embodiment 15. The car seat carrier according to embodiment 14, wherein $A_{S1}$ is greater than or equal 65 degrees, such as greater than or equal to 70 degrees, greater than or equal to 75 degrees, greater than or equal to 80 degrees, or greater than or equal to 85 degrees.

Embodiment 16. The car seat carrier according to embodiment 15, wherein $A_{S1}$ is less than or equal to 120 degrees.

Embodiment 17. The car seat carrier according to embodiment 16, wherein $A_{S1}$ is less than or equal 115 degrees, such as less than or equal to 110 degrees, less than or equal to 105 degrees less than or equal to 100 degrees, less than or equal to 65 degrees, or less than or equal to 60 degrees.

Embodiment 18. The car seat carrier according to embodiment 13, wherein the pivoting handle is movable to a second stowage position, wherein the pivoting handle collapsed and rotated away from the carrier body of the car seat carrier in from a vertical axis extending through a handle fastener about which the pivoting handle rotates.

Embodiment 19. The car seat carrier according to embodiment 18, wherein in the second stowage position, the pivoting handle an angle, $A_{S2}$, with respect to the vertical axis and $A_{S2}$ greater than or equal to 60 degrees.

Embodiment 20. The car seat carrier according to embodiment 19, wherein $A_{S2}$ is greater than or equal 65 degrees, such as greater than or equal to 70 degrees, greater than or equal to 75 degrees, greater than or equal to 80 degrees, or greater than or equal to 85 degrees.

Embodiment 21. The car seat carrier according to embodiment 20, wherein $A_{S2}$ is less than or equal to 120 degrees.

Embodiment 22. The car seat carrier according to embodiment 21, wherein $A_{S2}$ is less than or equal 115 degrees, such as less than or equal to 110 degrees, less than or equal to 105 degrees, less than or equal to 100 degrees, less than or equal to 95 degrees, or less than or equal to 90 degrees.

Embodiment 23. The car seat carrier according to embodiment 18, wherein the pivoting handle is further moveable to a rear push position, the pivoting handle is extended and totaled behind the vertical axis.

Embodiment 24. The car seat carrier according to embodiment 23, wherein in the rear push position the pivoting handle forms an angle, $A_{RP}$, with respect to the vertical axis and $A_{FPP}$ is greater than or equal to 10 degrees.

Embodiment 25. The car seat carrier according to embodiment 24, wherein $A_{RP}$ is greater or equal to than 15 degrees, such as greater than or equal to 20 degrees, greater than or equal to 25 degrees, greater than or equal to 30 degrees or greater than or equal to 35 degrees.

Embodiment 26. The car seat carrier according to embodiment 25, wherein $A_{RP}$ is less than or equal to 65 degrees.

Embodiment 27. The car seat carrier according to embodiment 26, wherein $A_{RP}$ is less than or equal to 60 degrees, such as less than or equal to 55 degrees, less than or equal to 50 degrees, less than or equal to 45 degrees, or less than or equal to 40 degrees.

Embodiment 28. The car seat carrier according to embodiment 23, wherein when the pivoting handle is in the rear push position, the car seat carrier is configured to be pushed by a user while the user is facing toward the car seat carrier.

Embodiment 29. The car seat carrier according to embodiment 23, wherein the pivoting handle is further movable to a broadcast position in which the pivoting handle is vertical.

Embodiment 30. The car seat carrier according to embodiment 29, wherein in the broadcast position, the pivoting handle forms an angle, $A_B$, with respect to the vertical axis and $A_B$ is greater than or equal to 0 degrees.

Embodiment 31. The car seat carrier according to embodiment 30, wherein $A_B$ is greater than or equal to 5 degrees, such as greater than or equal to 20 degrees.

Embodiment 32. The car seat carrier according to embodiment 31, wherein $A_B$ is less than or equal to 45 degrees.

Embodiment 33. The car seat carrier according to embodiment 32, wherein $A_B$ is less than or equal to 40 degrees, such as less than or equal to 35 degrees, less than or equal to 30 degrees, or less than or equal to 25 degrees.

Embodiment 34. The car seat carrier according to embodiment 29, wherein when the pivoting handle is in the broadcast position, the car seat carrier is configured to allow a child inside an infant car seat engaged with the car seat carrier to view and/or listen to content is playing or a portable electronic device attached to the pivoting handle.

Embodiment 35. The car seat carrier according to any of embodiments 1, 2 or 3, wherein the car seat carrier comprises a zero turn radius.

Embodiment 36. The car seat carrier according to embodiment 35, wherein the entire car seat carrier rotates three-bundled and sixty degrees within a circle having a diameter, $D_R$, and $D_R$ is less than or equal to 44.0 inches.

Embodiment 37. The car seat carrier according to embodiment 36, wherein $D_R$ is less than or equal to 43.5 inches, such as less than or equal to 43.0 inches, less than or equal to 42.5 inches, less than or equal to 42.0 inches, less than or equal to 41.5 inches, less than or equal to 41.0 inches, less than or equal to 40.5 inches, less than or equal to 40 inches, or less than or equal to 39.5 inches.

Embodiment 38. The car seat carrier according to embodiment 37, wherein is greater than or equal to 36.0 inches.

Embodiment 39. The car seat carrier according to embodiment 38, wherein $D_B$ is greater than or equal to 36.5 inches, such as greater than or equal to 37.0 inches, greater than or equal to 37.5 inches, greater than or equal to 38.0 inches, greater than or equal to 38.5 inches or greater than or equal to 39.0 inches.

Embodiment 40. The car seat carrier according to any of embodiments 1, 2, or 3, wherein the car seat carrier comprises a zero turn radius and as the car seat carrier rotates three-hundred and sixty degrees, the at least one front wheel traces a circle fitting a diameter, $D_{FW}$, and $D_{FW}$ is less than or equal to 36.0 inches.

Embodiment 41. The car seat carrier according to embodiment 40, wherein $D_{FW}$ is less than or equal to 35.5 inches, such as less than or equal to 35.0 inches, less than or equal to 34.5 inches, less than or equal to 34.0 inches, less than or equal to 33.5 inches, less than or equal to 33.0 inches, less than or equal to 32.5 inches, less than or equal to 32.0 inches, less than or equal to 31.5 inches, less than or equal to 31.0 inches, less than or equal to 30.5 inches, less than or equal to 30.0 inches, less than or equal to 29.5 inches, or less than or equal or 29.0 inches.

Embodiment 42. The car seat carrier according to embodiment 41, wherein $D_{FW}$ is greater than or equal to 26.0 inches.

Embodiment 43. The car seat carrier according to embodiment 42, wherein $D_{FW}$ is greater than or equal to 26.5 inches, such as greater than or equal to 27.0 inches, greater than or equal to 27.5 inches, greater than or equal to 28.0 inches, greater than or equal to 28.5 inches or greater than or equal to 29.0 inches.

Embodiment 44. The car seat carrier according to any of embodiments 1, 2, or 3 wherein the car seat carrier comprises a wheel base when the car seat carrier is pulled, $WB_{PULL}$, that is measured from a center of an axle of the at least one front wheel to a center of the at least one rear wheel and $WB_{PULL}$ is greater than or equal to 10.0 inches.

Embodiment 45. The car seat carrier according to embodiment 44, wherein $WB_{PULL}$ is greater than or equal to 10.5 inches, such as greater than or equal to 11.0 inches, greater than or equal to 11.5 inches, greater than or equal to 12.0 inches, greater than or equal to 12.5 inches, greater than or equal to 13.0 inches, greater than or equal to 13.5 inches, or greater than or equal to 14.0 inches.

Embodiment 46. The car seat carrier according to embodiment 45, wherein $WB_{PULL}$ is less than or equal to 19.0 inches.

Embodiment 47. The car seat carrier according to embodiment 46, wherein $WB_{PULL}$ is less than or equal to 18.5 inches, such as less than or equal to 18.0 inches, less than or equal to 17.5 inches, less than or equal to 17.0 inches, less than or equal to 16.5 inches, less than or equal to 16.0 inches, less than or equal to 15.5 inches, less than or equal to 15.0 inches, or less than or equal to 54.5 inches.

Embodiment 48. The car seat carrier according to any of embodiments 1, 2, or 3 wherein the car seat carrier comprises a wheel base when the car seat carrier is pulled, $WB_{PULL}$, that is measured from a center of an axle of the at least one front wheel to a center of the at least one rear wheel and $WB_{PULL}$ is less than an overall length of the carrier body, $L_{CB}$.

Embodiment 49. The car seat carrier according to embodiment 48, wherein a ratio of $WB_{PULL}$ to $L_{CB}$, $WB_{PULL}/L_{CB}$ is greater than or equal to 0.500.

Embodiment 50. The car seat carrier according to embodiment 49, wherein $WB_{PULL}/L_{CB}$ is greater than or equal to 0.525, such as greater than or equal to 0.550, greater than or equal to 0.575, greater than or equal to 0.600, or greater than or equal to 0.625.

Embodiment 51. The car seat carrier according to embodiment 50, wherein $WB_{PULL}/L_{CB}$ is less than or equal to 0.750.

Embodiment 52. The car seat carrier according to embodiment 51, wherein $WB_{PULL}/L_{CB}$ is less than or equal to 0.725, such as less than or equal to 0.700, less than or equal to 0.675, or less than or equal to 0.650.

Embodiment 53. The car seat carrier according to any of embodiments 1, 2, or 3 wherein the car seat carrier includes an overall width, $W_O$, that is less than or equal to 22.0 inches.

Embodiment 54. The car seat carrier according to embodiment 53, wherein $W_O$ is less than or equal to 21.5 inches, such as less than or equal to 21.0 inches, less than or equal to 20.5 inches, less than or equal to 20.0 inches, or less than or equal to 19.5 inches.

Embodiment 55. The car seat carrier according to embodiment 54, wherein $W_O$ is greater than 13.5 inches.

Embodiment 56. The car seat carrier according to embodiment 55, wherein $W_O$ is greater than or equal to 14.0 inches, such as greater than or equal to 11.5 inches, greater than or equal to 15.0 inches, greater than or equal to 15.5 inches, greater than or equal to 16.0 inches, greater than or equal to 16.5 inches, greater than or equal to 17.0 inches, greater than or equal to 17.5 inches, greater than or equal to 18.0 inches, greater than or equal to 18.5 inches, or greater than or equal to 19.0 inches.

Embodiment 57. The car seat carrier according to any of embodiments 1, 2, or 3, wherein the car seat carrier includes an overall width, $W_O$, and an infant car seat that is configured to fit into and engage the car seat carrier has an overall width, $W_{ICS}$, and a ratio of $W_O$ to $W_{ICS}$, $W_O/W_{ICS}$ is less than or equal to 1.4.

Embodiment 58. The car seat carrier according to embodiment 57, wherein $W_O/W_{ICS}$ is less than or equal to 1.35, such as less than or equal to 1.30, less than or equal to 1.25, less than or equal to 1.20, or less than or equal to 1.15.

Embodiment 59. The car seat cannier according to embodiment 58, wherein $W_O/W_{ICS}$ is greater than or equal to 0.70.

Embodiment 60. The car seat carrier according to embodiment 59, wherein $W_O/W_{ICS}$ is greater than or equal to 0.75, such as greater than or equal to 0.80, greater than or equal to 0.85, greater than or equal to 0.90, greater than or equal to 0.95, greater than or equal to 1.00, greater than or equal to 1.05 or greater than or equal to 1.10.

Embodiment 61. The car seat carrier according to any of embodiments 1, 2, or 3 wherein the pivoting handle pivots to multiple positions and telescopes between a collapsed configuration and an extended configuration.

Embodiment 62. The car seat carrier according to any of embodiments 1, 2, or 3 wherein when an infant car seat is engaged with the car seat carrier to establish an infant car seat carrier assembly, the infant car seat carrier assembly comprises an overall height. $H_{OA}$, measured from a surface on which the car seat carrier is placed to a top of a pivoting handle on the infant car seat position in an upright position and $H_{OA}$ is less than or equal to 36 inches.

Embodiment 63. The car seat carrier according to embodiment 62, wherein $H_{OA}$ is less than or equal to 35.5 inches, such as less than or equal to 35.0 inches, less than or equal to 34.5 inches, less than or equal to 34.0 inches, less than or equal to 33.5 inches, less than or equal to 33.0 inches, less than or equal to 32.5 inches, less than or equal to 32.0 inches, less than or equal to 31.5 inches, less than or equal to 31.0 inches, less than or equal to 30.5 inches, or less than or equal to 30.0 inches.

Embodiment 64. The car seat carrier according to embodiment 63, wherein $H_{OA}$ is greater than or equal to 25.0 inches.

Embodiment 65. The car seat carrier according to embodiment 64, wherein $H_{OA}$ is greater than or equal to 25.5 inches, such as greater than or equal to 26.0 inches, greater than or equal to 26.5 inches, greater than or equal to 27.0 inches, greater than or equal to 27.5 inches, greater than or equal to 28.0 inches, greater than or equal to 28.5 inches, greater than or equal to 29.0 inches, or greater than or equal to 29.5 inches.

Embodiment 66. The car seat carrier according to embodiment 62, wherein the infant car seat carrier assembly includes an overall length, $L_{OA}$, measured from a front of the pivoting handle of the car seat carrier when pivoting handle is rotated to a vertical position to a rear of a canopy of the infant car seat when the canopy 1506 is fully raised and $L_{OA}$ is less than or equal to 35.0 inches.

Embodiment 67. The car seat carrier according to embodiment 66, wherein $L_{OA}$ is less than or equal to 34.5 inches, such as less than or equal to 34.0 inches, less than or equal to 33.5 inches, less than or equal to 33.0 inches, less than or equal to 32.5 inches, less than or equal to 32.0 inches, less than or equal to 31.5 inches, less than or equal to 31.0 inches, less than or equal to 30.5 inches, or less than or equal to 30.0 inches.

Embodiment 68. The car seat carrier according to embodiment 67, wherein $L_{OA}$ is greater than or equal 26 inches.

Embodiment 69. The car seat carrier according to embodiment 68, wherein $L_{OA}$ is greater than or equal to 26.5 inches, such as greater than or equal to 27.0 inches, greater than or equal to 27.5 inches, greater than or equal to 28.0 inches, greater than 28.5 inches, greater than or equal to 29.0 inches, or greater than or equal to 29.5 inches.

Embodiment 70. The car seat carrier according to embodiment 66, wherein a ratio of $L_{OA}$ to $L_{ICS}$, $L_{OA}/L_{ICS}$ is less than r equal to 1.50.

Embodiment 71. The car seat carrier according to embodiment 70, wherein $L_{ICS}$, $L_{OA}/L_{ICS}$ is less than or equal to 1.45, such as less than or equal to 1.40, less than or equal to 1.35, less than or equal to 1.30, less than or equal to 1.25, or less than or equal to 1.20.

Embodiment 72. The car seat carrier according to embodiment 71, wherein $L_{OA}/L_{ICS}$ is greater than or equal to 1.00.

Embodiment 73. The car seat carrier according to embodiment 72, wherein $L_{OA}/L_{ICS}$ is greater than or equal to 1.05, such as greater than or equal to 1.06, greater than or equal to 1.07, greater than or equal to 1.08, greater than or equal to 1.09, greater than or equal to 1.10, greater than or equal to 1.11, greater than or equal to 1.12, greater than or equal to 1.13, greater than or equal to 1.14, or greater than or equal to 1.15.

Embodiment 74. The car seat carrier according to embodiment 62, wherein the pivoting handle includes a collapsed height, $H_{HC}$, measured from a surface on which the car seat carrier is resting to a top of the pivoting handle when the pivoting handle is in a collapsed configuration and in a vertical position and $H_{HC}$ is substantially equal to $H_{OA}$.

Embodiment 75. The car seat carrier according to embodiment 74, wherein $H_{HC}$ is less than or equal to 99.5% $H_{OA}$.

Embodiment 76. The car seat carrier according to embodiment 75, wherein $H_{HC}$ is less than or equal to 99.0% $H_{OA}$, such as less than or equal to 98.5% $H_{OA}$, less than or equal to 98.0% $H_{OA}$, less than or equal to 97.5% $H_{OA}$, less than or equal to 97.0% $H_{OA}$, less than or equal to 96.5%, less than or equal to 96.0% $H_{OA}$, less than or equal to 95.5% $H_{OA}$, or less than or equal to 95.0% $H_{OA}$.

Embodiment 77. The car seat carrier of embodiment 76, wherein $H_{HC}$ is greater than or equal to 90.0% $H_{OA}$.

Embodiment 78. The car seat carrier of embodiment 77, wherein $H_{HC}$ is greater than or equal to 90.5% $H_{OA}$, such as greater than or equal to 91.0% $H_{OA}$, greater than or equal to 91.5% $H_{OA}$, greater than or equal to 92.0% $H_{OA}$, greater than or equal to 92.5% $H_{OA}$, greater than or equal to 93.0% $H_{OA}$, greater than or equal to 93.5% $H_{OA}$, greater than or equal to 94.0% $H_{OA}$, or greater than or equal to 94.5% $H_{OA}$.

Embodiment 79. The car seat carrier according to embodiment 62, wherein the pivoting handle includes an extended height, $H_{HC}$, measured from a surface on which the car seat carrier is resting to a top of the pivoting handle when the pivoting handle is in an extended configuration and in a vertical position and $H_{HC}$ is greater than or equal to $H_{OA}$.

Embodiment 80. The car seat carrier of embodiment 79, wherein $H_{HF}/H_{OA}$ is greater than or equal to 1.05, such as greater than or equal to 1.10, greater than or equal to 1.15, greater than or equal to 1.20, greater than or equal to 1.25, greater than or equal to 1.30, greater than or equal to 1.35, greater than or equal to 1.40, greater than or equal to 1.45, greater than or equal to 1.50, greater than or equal to 1.55, or greater than or equal to 1.6.

Embodiment 81. The car seat carrier of embodiment 80, wherein $H_{HF}/H_{OA}$, is less than or equal to 2.00.

Embodiment 82. The car seat carrier of embodiment 81, wherein $H_{HF}/H_{OA}$ is less than or equal to 1.95, such as less than or equal to 1.90, less than or equal to 1.85, less than or equal to 1.80, less than or equal to 1.75, less than or equal to 1.70, or less than or equal to 1.65.

Embodiment 83. The car seat carrier according to any of the embodiments 1, 2, or 3, wherein the car seat carrier includes a footprint, $FP_{CSC}$, and $FP_{CSC}$ less than or equal to 400 inch$^2$.

Embodiment 84. The car seat carrier according to embodiment 83, wherein $FP_{CSC}$ is less than or equal to 395 in$^2$, such as less than or equal to 390 in$^2$, less than or equal to 385 in$^2$, less than or equal to 380 in$^2$, less than or equal to 385 in$^2$, less than or equal to 380 in$^2$, less than or equal to 375 in$^2$, less than or equal to 370 in$^2$, less than or equal to 365 in$^2$, less than or equal to 360 in$^2$, less than or equal to 355 in$^2$, or less than or equal to 350 in$^2$.

Embodiment 85. The car seat carrier according to embodiment 84, wherein $FP_{CSC}$ is greater than or equal to 300 in$^2$.

Embodiment 86. The car seat carrier according to embodiment 85, wherein $FP_{CSC}$ is greater than or equal to 305 in$^2$, such as greater than or equal to 310 in$^2$, greater than or equal to 315 in$^2$, greater than or equal to 320 in$^2$, greater than or equal to 325 in$^2$, greater than or equal to 330 in$^2$, greater than or equal to 335 in$^2$, greater than or equal to 340 in$^2$, or greater than or equal to 345 in$^2$.

Embodiment 87. The car seat carrier according to any of embodiments 1, 2, or 3, wherein the car seat carrier includes a footprint, $FP_{CSC}$, and an infant car seat configured to engage the car seat carrier includes a footprint, $FP_{ICS}$, and a ratio of $FP_{CSC}$ to $FP_{ICS}$, $FP_{CSC}/FP_{ICS}$, is less than or equal to 1.25.

Embodiment 88. The car seat carrier according to embodiment 87, wherein $FP_{CSC}/FP_{ICS}$ is less than or equal to 1.20, such as less than or equal to 1.15, less than or equal to 1.10, less than or equal to 1.09, less than or equal to 1.08, less than or equal to 1.07, less than or equal to 1.06, less than or equal to 1.05, less than or equal to 1.04, less than or equal to 1.06, or less than or equal to 1.02.

Embodiment 89. The car seat carrier according to embodiment 88, wherein $FP_{CSC}/FP_{ICS}$ is greater than or equal to 0.75.

Embodiment 90. The car seat carrier according to embodiment 89, wherein $FP_{CSC}/FP_{ICS}$ is greater than or equal to 0.80, such as greater than or equal to 0.85, greater than or equal to 0.90, greater than or equal to 0.95, greater than or equal to 0.96, greater than or equal to 0.97, greater than or equal to 0.98, greater than or equal to 0.99, greater than or equal to 1.00, or greater than or equal to 1.01.

Embodiment 91. The car seat carrier according to any of embodiments 1, 2, or 3, wherein the car sear carrier comprises a weight, $W_{CSC}$, and $W_{CSC}$ is less than or equal to 20 pounds.

Embodiment 92. The car seat carrier according to embodiment 91, wherein $W_{CSC}$ is less than or equal to 19 pounds, such as less than or equal to 18 pounds, less than or equal to 17 pounds, less than or equal to 16 pounds, less than or equal to 15 pounds, or less than or equal to 14 pounds.

Embodiment 93. The car seat carrier according to embodiment 92, wherein $W_{CSC}$ is greater than or equal to 8 pounds.

Embodiment 94. The car seat carrier according to embodiment 93, wherein $W_{CSC}$ is greater than or equal to 9 pounds, such as greater than or equal to 10 pounds, greater than or equal to 11 pounds, greater than or equal to 12 pounds, or greater than or equal to 13 pounds.

Embodiment 95. The car seat carrier according to any of embodiments 1, 2, or 3, wherein the car seat carrier includes a weight, $W_{CSC}$ and an infant car seat configured to be engaged with the car seat carrier includes a weight, $WW_{ICS}$, and a ratio of $W_{CSC}$ to $WW_{ICS}$, $W_{CSC}/WW_{ICS}$ is less than or equal to 2.0.

Embodiment 96. The car seat carrier according to embodiment 95, wherein $W_{CSC}/WW_{ICS}$ is less than or equal to 1.9, such as less than or equal to 1.8, less than or equal to 1.7, less than or equal to 1.6, or less than or equal to 1.5.

Embodiment 97. The car seat carrier according to embodiment 96, wherein $W_{CSC}/WW_{ICS}$ is greater than or equal to 1.0.

Embodiment 98. The car seat carrier according to embodiment 97, wherein $W_{CSC}/WW_{ICS}$ is be greater than or equal to 1.1, such as greater than or equal to 1.2, greater than or equal to 1.3, or greater than or equal to 1.4.

Embodiment 99. The car seat carrier according to any of embodiments 1, 2, or 3, wherein the at least one front wheel assembly composes, two front wheels hove a track $T_F$, and the at least one rear wheel assembly comprises two rear wheels having a track, $T_R$, and a ratio of $T_F$ to $T_R$, $T_F/T_R$, is less than or equal to 0.85.

Embodiment 100. The car seat carrier according to embodiment 99, wherein $T_F/T_R$ is less than or equal to 0.80, such as less than or equal to 0.75, less than or equal to 0.70, less than or equal to 0.65, less than or equal to 0.60, less than or equal to 0.55, less than or equal to 0.50, or less than or equal to 0.45.

Embodiment 101. The car seat carrier according to embodiment 100, wherein $T_F/T_R$ is greater than or equal to 0.25.

Embodiment 102. The car seat carrier according to embodiment 101, wherein $T_F/T_R$ is greater than or equal 0.30, such as greater than or equal to 0.35, or greater than 0.40.

Embodiment 103. The car seat carrier according to any of embodiments 1, 2, or 3, wherein the at least one front wheel assembly includes two front wheel assemblies having a track, $T_F$, and an infant car seat configured to fit into and engage the car seat carrier has an overall width, $W_{ICS}$, and a ratio of $T_F$ to $W_{ICS}$, $T_F/W_{ICS}$, is less than or equal to 0.65.

Embodiment 104. The car seat carrier according to embodiment 103, wherein $T_F/W_{ICS}$ is less than or equal to 0.60, such as less than or equal to 0.55, less than or equal to 0.50, or less than or equal to 0.45.

Embodiment 105. The car seat carrier according to embodiment 104, wherein $T_F/W_{ICS}$ is greater than or equal to 0.25.

Embodiment 106. The car seat carrier according to embodiment 105, wherein $T_F/W_{ICS}$ is greater than or equal 0.30, such as greater than or equal to 0.35, or greater than 0.40.

Embodiment 107. The car seat carrier according to any of embodiments 1, 2, or 3, wherein the at least one rear wheel assembly includes two rear w heel assemblies having a track, $T_R$, and an infant car seat configured to fit into and engage the car seat carrier has an overall width, $W_{ICS}$, and a ratio of $T_R$ to $W_{ICS}$, $T_R/W_{ICS}$, is less than or equal to 1.25.

Embodiment 108. The car seat carrier according to embodiment 107, wherein $T_R/W_{ICS}$ is less than or equal to 1.20, such as less than or equal to 1.15, less than or equal to 1.10, less than or equal to 1.05, or less than or equal to 1.00.

Embodiment 109. The car seat carrier according to embodiment 108, wherein $T_R/W_{ICS}$ is greater than or equal to 0.75.

Embodiment 110. The car seat carrier according to embodiment 109, wherein $T_R/W_{ICS}$ is greater than or equal 0.80, such as greater than or equal to 0.85, greater than or equal to 0.90, or greater than or equal to 0.95.

Embodiment 111. The car seat carrier according to any of embodiments 1, 2, or 3, wherein the pivoting handle comprises a lower handgrip and an upper handgrip spaced a distance from the lower handgrip.

Embodiment 112. The car seat carrier according to any of embodiments 1, 2, or 3, wherein the carrier body has an overall height, $H_{CB}$, and the at least one rear wheel assembly comprises a rear wheel having a diameter, $D_R$, and a ratio of $D_R$ to $H_{CB}$, $D_R/H_{CB}$ is greater than or equal to 0.65.

Embodiment 113. The car seat carrier according to embodiment 112, wherein $D_R/H_{CB}$, is greater than or equal to 0.70, such as greater than or equal to 0.75 greater than or equal to 0.80, greater than or equal to 0.85, greater than or equal to 0.90, greater than or equal to 0.95, greater than or equal to 1.00, greater than or equal to 1.10, greater than or equal to 1.15, greater than or equal to 1.20, greater than or equal to 1.25, or greater than or equal to 1.30.

Embodiment 114. The car seat carrier according to embodiment 113, wherein $D_R/H_{CB}$ is less than or equal to 2.00.

Embodiment 115. The car seat carrier according to embodiment 114, wherein $D_R/H_{CB}$ is less than or equal to 1.95, such as less than or equal to 1.90, less, than or equal to 1.85, less than or equal to 1.30, less than or equal to 1.75, less than or equal to 1.70, less than or equal to 1.65, less than or equal to 1.60 less than or equal to 1.55, less than or equal to 1.50, less than or equal to 1.45, less than or equal to 1.40, less than or equal to 1.35.

Embodiment 116. The car seat carrier according to any of embodiments 1, 2, or 3, further comprising a vertically oriented control axis that extends through at least one handle fastener and vertically oriented swivel axis that extends through at least one stem around which the front wheel assembly rotates and the vertically oriented control axis is spaced a distance, D, from the vertically oriented swivel axis and D is less than or equal to 6 inches.

Embodiment 117. The car seat carrier according to embodiment 116, wherein D is less than or equal to 5.5 inches, such as less than or equal to 5.0 inches, less than or equal to 4.5 inches, less than or equal to 4.0 inches, less than or equal to 3.5 inches, or less, than or equal to 3.0 inches.

Embodiment 118. The car seat carrier according to embodiment 117, wherein D is greater than or equal to 0.5 inches, such as greater than or equal to 1.0 inches, greater than or equal to 1.5 inches, greater than or equal to 2.0 inches, or greater than or equal to 2.5 inches.

Embodiment 119. The car seat carrier according to any of embodiments 1, 2, or 3, further comprising a smartphone bracket, connected to the pivoting handle.

Embodiment 120. The car seat carrier according to any of embodiments 1, 2, or 3, wherein the carrier body is a detachable car seat base.

The specification and illustrations of the embodiments described herein are intended to provide a general understanding of the structure of the various embodiments. The specification and illustrations are not intended to wave as an exhaustive and comprehensive description of all of the elements and features of apparatus and systems that use the structures or methods described herein. Separate embodiments may also be provided in combination in a single embodiment and conversely, various features that are, for brevity, described in the context of a single embodiment, may also be provided separately or in an subcombination. Further, reference to values suited in ranges includes each and every value within that range. Many other embodiments may be apparent to skilled artisans only after reading this specification. Other embodiments may be used and derived from the disclosure, such that a structural substitution, logical substitution, or another change may be made without departing from the scope of line disclosure. Accordingly, the disclosure is to be regarded as illustrative rather than restrictive. Benefits other advantages and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a nonexclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following. A is true for present) and B is false (or not present), A is false (or not present) and B is true (or present), and both A and B am true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A car seat carrier, comprising:
  a carrier body, wherein the carrier body is a car seat base for a rear facing infant car seat;
  at least one rear wheel assembly attached to the carrier body;
  at least one front wheel assembly attached to the carrier body; and
  at least one handle affixed to the carrier body.

2. The car seat carrier according to claim 1, wherein the carrier body includes a first outer side wall, a first inner side wall, and a first cavity formed between the first outer side wall and the first inner side wall, wherein the first cavity is sized and shaped to receive a complementary shaped portion of a body of an infant car seat.

3. The car seat carrier according to claim 2, wherein the carrier body includes a second outer side wall opposite the first outer side wall, a second inner side wall opposite the first inner side, and a second cavity formed between the second outer side wall and the second inner side wall, wherein the second cavity is sized and shaped to receive a complementary shaped portion of a body of an infant car seat.

4. The car seat carrier of claim 1, wherein the handle pivots between:
  a first stowage position in which the handle is laid back over a top of the carrier body;
  a front push/pull position in which the handle is rotated in front of a vertical axis extending through a handle fastener about which the handle rotates; and
  a rear push position in which the handle is rotated behind the vertical axis extending through the handle fastener about which the handle rotates.

5. The car seat carrier according to claim 1, further comprising a smartphone bracket connected to the handle.

6. The car seat carrier according to claim 1, wherein the carrier body further comprises at least one rear locking notch configured to receive a retractable securing projection on an infant car seat, at least one hook configured to engage an attachment point on an underside of an infant car seat, or a combination thereof.

7. A car seat carrier, comprising:
  a carrier body, wherein the carrier body is a car seat base for a rear facing infant car seat that is configured to receive and lockably engage an infant car seat therein;
  at least one rear wheel assembly attached to the carrier body, wherein the at least one rear wheel assembly includes a fixed wheel that rotates around a single axis;
  at least one front wheel assembly attached to the carrier body, wherein the at least one front wheel assembly includes a swiveled wheel that rotates around two axes; and
  at least one handle bracket attached to a front face of the carrier body.

8. The car seat carrier according to claim 7, wherein the carrier body further comprises at least one rear locking notch configured to receive a retractable securing projection on an infant car seat, at least one hook configured to engage an attachment point on an underside of an infant car seat, or a combination thereof.

9. The car seat carrier of claim 7, wherein the handle pivots between:
- a first stowage position in which the pivoting/telescoping is laid back across the carrier body;
- a front push/pull position in which the handle is rotated in front of a vertical axis extending through a handle fastener about which the handle rotates; and
- a rear push position in which the handle is rotated behind the vertical axis extending through the handle fastener about which the handle rotates.

10. The car seat carrier according to claim 9, wherein when the handle is in the front push/pull position, the car seat carrier is configured to be pushed by a user while the user is facing toward the car seat carrier.

11. The car seat carrier according to claim 9, wherein when the handle is in the front push/pull position, the car seat carrier is configured to be pulled by a user while the user is facing away from the car seat carrier.

12. The car seat carrier according to claim 9, wherein the handle is movable to a second stowage position, wherein the handle is rotated away from the carrier body of the car seat carrier in front of the vertical axis extending through the handle fastener about which the handle rotates.

13. The car seat carrier according to claim 9, wherein the handle is further movable to a broadcast position wherein the handle is vertical or slightly behind the vertical axis.

14. The car seat carrier according to claim 13, wherein when the handle is in the broadcast position, the car seat carrier is configured to allow a child inside an infant car seat engaged with the car seat carrier to view and/or listen to content is playing on a portable electronic device attached to the handle.

15. A car seat carrier, comprising:
- a carrier body, wherein the carrier body is a car seat base for a rear facing infant car seat;
- at least one front wheel assembly attached to the carrier body near the front end;
- at least one rear wheel attached to the carrier body near the rear end;
- at least one handle bracket attached to a front face of the carrier body; and
- a handle attached to the at least one handle bracket.

16. The car seat carrier of claim 15, wherein the handle pivots to a front push/pull position in which the handle is rotated in front of a vertical axis extending through a handle fastener about which the handle rotates and in which the car seat carrier is pushed in a first direction or pulled in a second direction opposite the first direction.

17. The car seat carrier of claim 16, wherein the handle further pivots to a rear push position in which the handle is rotated behind the vertical axis extending through the handle fastener about which the handle rotates and in which the carrier is pushed in the same direction as the second direction.

18. The car seat carrier of claim 17, wherein the handle further pivots to a stowage position in which the handle is laid across the carrier body.

19. The car seat carrier according to claim 15, wherein the car seat carrier comprises a zero turn radius.

20. The car seat carrier according to claim 15, wherein the carrier body further comprises at least one rear locking notch configured to receive a retractable securing projection on an infant car seat, at least one hook configured to engage an attachment point on an underside of an infant car seat, or a combination thereof.

* * * * *